(12) United States Patent
Flake

(10) Patent No.: US 8,923,444 B1
(45) Date of Patent: *Dec. 30, 2014

(54) DECODING A COMMUNICATION SIGNAL THAT CONTAINS ANALOG PULSES WITH EXPONENTIALLY-SHAPED LEADING EDGES

(71) Applicant: Board of Regents of the University of Texas System, Austin, TX (US)

(72) Inventor: Robert H. Flake, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/319,356

(22) Filed: Jun. 30, 2014

Related U.S. Application Data

(63) Continuation of application No. 14/182,082, filed on Feb. 17, 2014.

(51) Int. Cl.
  *H03D 1/24* (2006.01)
  *H04L 27/06* (2006.01)

(52) U.S. Cl.
  CPC .................................. *H04L 27/06* (2013.01)
  USPC ........... 375/320; 375/242; 375/260; 375/237; 375/238; 375/239; 375/241; 375/256; 375/295; 375/316; 375/340; 375/342; 375/354; 327/10; 327/22; 327/23; 327/26; 327/31; 327/36; 327/164; 327/170; 327/171; 327/173; 327/174; 327/178; 327/291

(58) Field of Classification Search
  USPC ......... 375/242, 260, 237, 238, 239, 241, 256, 375/295, 316, 340, 342, 320, 354; 327/10, 327/22, 23, 26, 31, 36, 164, 170, 171, 173, 327/174, 178, 291
  See application file for complete search history.

(56) References Cited

U.S. PATENT DOCUMENTS

| | | | |
|---|---|---|---|
| 3,668,415 A | 6/1972 | Marilleau | |
| 4,176,285 A | 11/1979 | Norris | |

(Continued)

FOREIGN PATENT DOCUMENTS

| | | |
|---|---|---|
| GB | 1455712 B1 | 11/1976 |
| WO | WO 01/67628 A2 | 9/2001 |
| WO | WO 2004/019501 A2 | 3/2004 |

OTHER PUBLICATIONS

Brillouin, "The Group Velocity", Wave Propagation and Group Velocity, Chapter IV, Article 4, p. 96, 1960 Academic Press Inc., New York (6 pages).

(Continued)

*Primary Examiner* — Rahel Guarino
(74) *Attorney, Agent, or Firm* — Meyertons Hood Kivlin Kowert & Goetzel, P.C.; Jeffrey C. Hood; Mark K. Brightwell

(57) ABSTRACT

A receiver for decoding a communication signal is disclosed. The receiver includes an input port and a filter. The input port receives the communication signal from a communication medium. The communication signal comprises a sequence of symbols. Each symbol of the symbol sequence is an analog pulse that has a leading edge of exponential shape. The exponential shape has an exponential growth parameter value that has been selected from values $\alpha_0$ and $\alpha_1$, which are distinct positive values. For each symbol of the symbol sequence, the exponential growth parameter value for the leading edge of the symbol has been selected based on a corresponding bit from a stream of information bits. The filter receives the communication signal from the input port and filters the communication signal to obtain an output signal. The transfer function of the filter has one or more zeros at $\alpha_0$.

30 Claims, 23 Drawing Sheets

(56) References Cited

U.S. PATENT DOCUMENTS

| | | | |
|---|---|---|---|
| 4,559,602 | A | 12/1985 | Bates, Jr. |
| 4,566,084 | A | 1/1986 | Laine |
| 4,630,938 | A | 12/1986 | Piorkowska-Palczewska et al. |
| 5,005,189 | A * | 4/1991 | Hackett, Jr. ............... 375/348 |
| 5,051,595 | A | 9/1991 | Kern et al. |
| 5,142,861 | A | 9/1992 | Schlicher et al. |
| 5,319,311 | A | 6/1994 | Kawashima et al. |
| 5,321,632 | A | 6/1994 | Otsuji et al. |
| 5,452,222 | A | 9/1995 | Gray et al. |
| 5,461,318 | A | 10/1995 | Borchert et al. |
| 5,641,318 | A | 6/1997 | Vetter |
| 5,650,728 | A | 7/1997 | Rhein et al. |
| 5,686,872 | A | 11/1997 | Fried et al. |
| 5,713,665 | A | 2/1998 | Kato et al. |
| 5,857,001 | A | 1/1999 | Preuss et al. |
| 5,877,997 | A | 3/1999 | Fell |
| 6,097,755 | A | 8/2000 | Guenther, Jr. et al. |
| 6,441,695 | B1 | 8/2002 | Flake |
| 6,531,879 | B1 | 3/2003 | Nero, Jr. |
| 6,614,323 | B2 | 9/2003 | Wagh et al. |
| 6,678,321 | B1 * | 1/2004 | Graham et al. ............... 375/238 |
| 6,847,267 | B2 | 1/2005 | Flake et al. |
| 7,200,434 | B2 | 4/2007 | Havel et al. |
| 7,822,098 | B2 * | 10/2010 | Sahinoglu ............... 375/130 |
| 8,269,647 | B2 | 9/2012 | Solis |

OTHER PUBLICATIONS

Davidson, et al., "Long Lossy Lines (L.sup.3) and Their Impact Upon Large Chip Performance", IEEE Transactions on Componets, Packaging, and Manufacturing Technology—Part B, vol. 20, No. 4, Nov. 1997 (15 pages).

Deutsch, et al., "High Speed Signal Propagation on Lossy Transmission Lines", IBM J Res Develop, vol. 34, No. 4, pp. 601-615, Jul. 1990 (15 pages).

Flake, et al., "Advances in Test Technology for High-Performance System Interconnects", Proceedings of the 12.sup.th International Conference on Mixed Design of Integrated Circuits and Systems, Mixdes 2005; Krakow, Poland; Jun. 22-25, 2005 (5 pages).

Flake, "Part I (Theory) Signal Propagation Without Distortion on Lossy Transmission Lines Having Frequency Dependent Parameters", Proceedings of the Ninth IEEE Workshop on Signal Propagation on Interconnects, May 10-13, 2005; pp. 43-45; Garmish-Partenkirchen, Germany (3 pages).

Flake, "Part II (Experiments) Signal Propagation Without Distortion on Lossy Transmission Lines Having Frequency Dependent Parameters", Proceedings of the Ninth IEEE Workshop on Signal Propagation on Interconnects, May 10-13, 2005; pp. 51-54, Garmish-Partenkirchen, Germany (3 pages).

Flake, et al., "Signal Propagation Without Distortion in Dispersive Lossy Media", Proceedings of the Eleventh IEEE International Conference on Electronics, Circuits and System; Dec. 2004; pp. 407-410; Tel-Aviv, Israel (4 pages).

Gruodis, et al., "Coupled Lossy Transmission Line Characterization and Simulation", IBM J. Res Develop, vol. 25, No. 1, Jan. 1981 (17 pages).

Ismail et al., "Repeater Insertion in Tree Structured Inductive Interconnect", IEEE Transactions on Circuits and Systems II: Analog and Digital Signal Processing, vol. 48, No. 5; pp. 471-481; May 2001 (11 pages).

Johns, et al., "Analog Integrated Circuit Design", pp. 317-326, 1997; Wiley & Sons, Inc., New York (12 pages).

Kalluri, In: Electromagnetics of Complex Media, Chapter 1, 1.3; pp. 3-4, 1998; CRC Press, Boca Raton, Florida (10 pages).

Pozar, In: Microwave Engineering (XP-002186190); pp. 67-70 and 126-128, 1990; Addison-Wesley (7 pages).

Proakis, In: Digital Communications (Third Edition), Chapter 4, pp. 167-173, 1995, McGraw-Hill, Inc. (16 pages).

Ramo, et al., In: Fields and Wages in Modern Radio (Second Edition); 1953, pp. 23-26, 272-273; John Wiley & Sons, Inc., New York (8 pages).

Razavi, et al. "Design Techniques for High-Speed, High-Resolution Comparators", IEEE Journal of Solid-State Circuits, vol. 27, No. 12, pp. 1916-1992, Dec. 1992 (11 pages).

Sauter, In: Nonlinear Optics, p. 127, 1996; John Wiley & Sons, Inc., New York (7 pages).

Sommerfeld, In: Mechanics of Deformable Bodies—Lectures on Theoretical Physics, vol. II, pp. 96-98, 1950; Academic Press, Inc., New York (8 pages).

Szabo, et al., "The Hartree-Fock Approximation" In: Modern Quantum Chemistry—Introduction to Advanced Electronic Structure Theory (First Edition), pp. 142-145, 1989, McGraw-Hill Publishing Company, New York (4 pages).

Weber, "Distortionless Line Concept" In: Linear Transient Analysis, vol. II, p. 273, 1956; John Wiley & Sons, Inc., New York (5 pages).

Wheeler, et al., "The Vibrating String Controversy", Am. J. Phys., vol. 55, No. 1, pp. 33-37, Jan. 1987 (5 pages).

Wikipedia Website, "All-Pass Filter", retrieved Feb. 16, 2014 from <http://en.wikipedia.org/wiki/All-pass_filter> (4 pages).

Wikipedia Website, "Digital Signal", retrieved Feb. 10, 2014 from <http://en.wikipedia.org/wiki/Digital_signal> (3 pages).

* cited by examiner

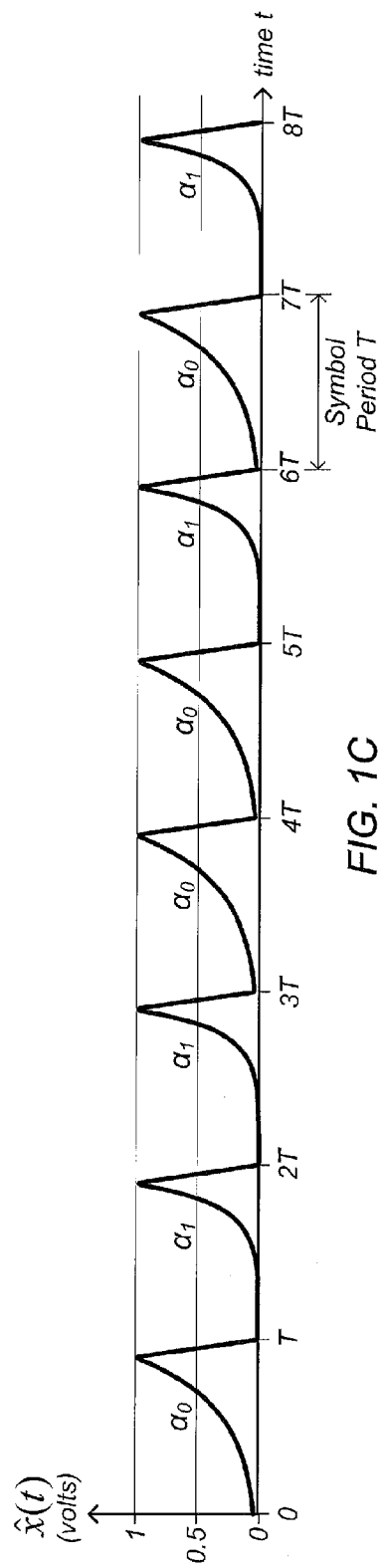
FIG. 1C
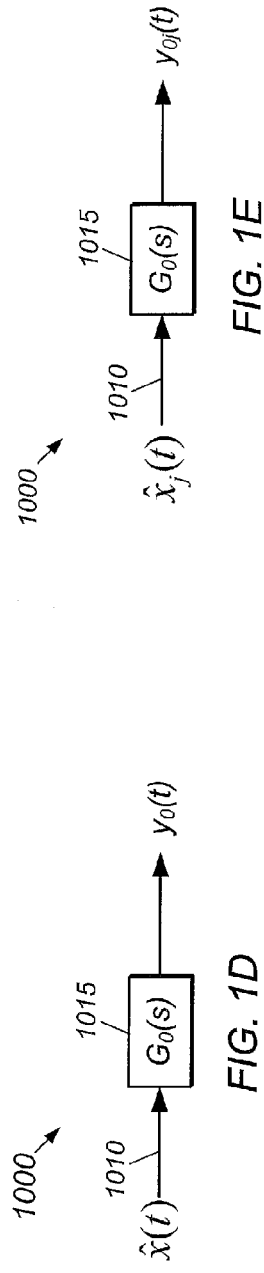
FIG. 1D
FIG. 1E

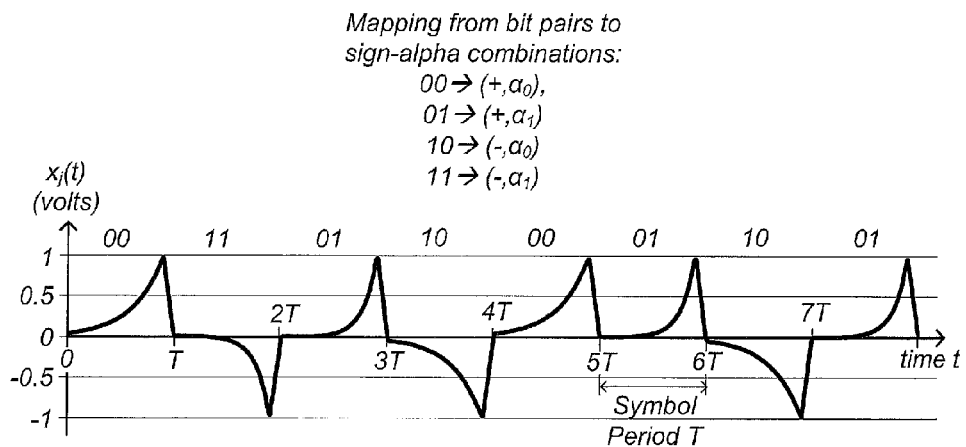
FIG. 5B
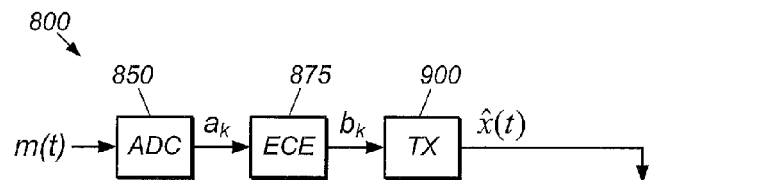
FIG. 5C
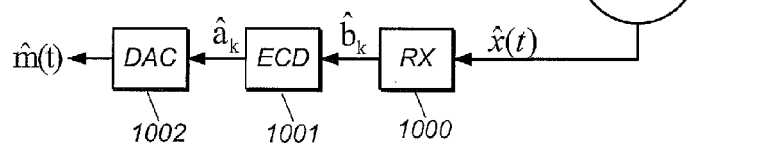
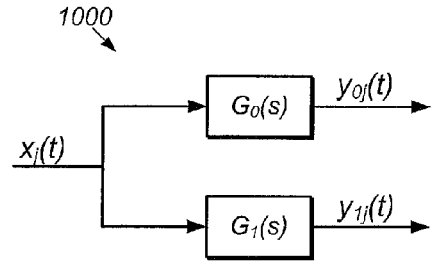
FIG. 6
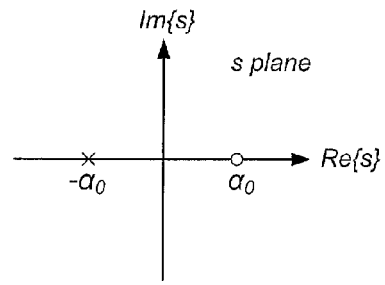
FIG. 7

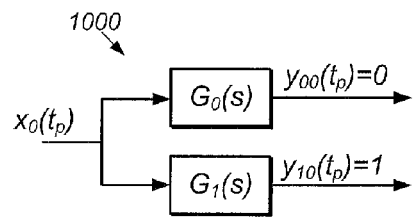
FIG. 8
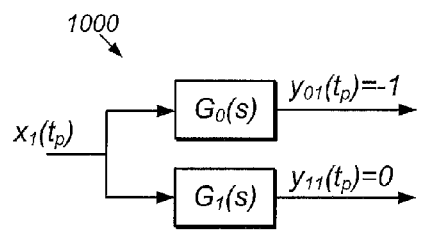
FIG. 9
| Input Bit of Bit Stream | $\alpha_j$ of Current Symbol | Output of Filter $G_0$ at Time $t_p$ | Output of Filter $G_1$ at Time $t_p$ | Sum of Outputs at Time $t_p$ |
|---|---|---|---|---|
| 0 | $\alpha_0$ | 0 | 1 | 1 |
| 1 | $\alpha_1$ | -1 | 0 | -1 |
| 1 | $\alpha_1$ | -1 | 0 | -1 |
| 0 | $\alpha_0$ | 0 | 1 | 1 |
| 0 | $\alpha_0$ | 0 | 1 | 1 |
| 1 | $\alpha_1$ | -1 | 0 | -1 |
| 0 | $\alpha_0$ | 0 | 1 | 1 |
| 1 | $\alpha_1$ | -1 | 0 | -1 |
FIG. 10

| Input Bit of Bit Stream | $\alpha_j$ of Current Symbol | Output of Filter $G_0$ at Time $t_p$ | Output of Filter $G_1$ at Time $t_p$ |
|---|---|---|---|
| 0 | $\alpha_0$ | 0 | 1 |
| 1 | $\alpha_1$ | 1 | 0 |
| 1 | $\alpha_1$ | 1 | 0 |
| 0 | $\alpha_0$ | 0 | 1 |
| 0 | $\alpha_0$ | 0 | 1 |
| 1 | $\alpha_1$ | 1 | 0 |
| 0 | $\alpha_0$ | 0 | 1 |
| 1 | $\alpha_1$ | 1 | 0 |

| j | $\hat{a}_j t_p$ | $y_{0j}(t_p)/K_0$ | $y_{1j}(t_p)/K_1$ | $y_{2j}(t_p)/K_2$ | $y_{3j}(t_p)/K_3$ |
|---|---|---|---|---|---|
| 0 | 4 | 0 | 1/9 | 2/10 | 3/11 |
| 1 | 5 | -1/9 | 0 | 1/11 | 2/12 |
| 2 | 6 | -2/10 | -1/11 | 0 | 1/13 |
| 3 | 7 | -3/11 | -2/12 | -1/13 | 0 |

*FIG. 19*

| j | $\hat{a}_j t_p$ | $y_{0j}(t_p)$ | $y_{1j}(t_p)$ | $y_{2j}(t_p)$ | $y_{3j}(t_p)$ |
|---|---|---|---|---|---|
| 0 | 4 | 0 | 13/9 | 26/10 | 39/11 |
| 1 | 5 | -13/9 | 0 | 13/11 | 26/12 |
| 2 | 6 | -26/10 | -13/11 | 0 | 1 |
| 3 | 7 | -39/11 | -26/12 | -1 | 0 |

*FIG. 20*

| j | $\hat{a}_j t_p$ | $y_{0j}(t_p)$ | $y_{1j}(t_p)$ | $y_{2j}(t_p)$ | $y_{3j}(t_p)$ |
|---|---|---|---|---|---|
| 0 | 4 | 0 | 1 | 1 | 1 |
| 1 | 5 | -1 | 0 | 1 | 1 |
| 2 | 6 | -1 | -1 | 0 | 1 |
| 3 | 7 | -1 | -1 | -1 | 0 |

*FIG. 21*

| 2 Bit Word | j | $\hat{a}_j t_p$ | Output of Filter $G_0$ at Time $t_p$ | Output of Filter $G_1$ at Time $t_p$ | Output of Filter $G_2$ at Time $t_p$ | Output of Filter $G_3$ at Time $t_p$ | $S(t_p)$ = Sum of Outputs at Time $t_p$ | $(3-S(t_p))/2$ |
|---|---|---|---|---|---|---|---|---|
| 00 | 0 | 4 | 0 | 1 | 1 | 1 | 3 | 0 |
| 01 | 1 | 5 | -1 | 0 | 1 | 1 | 1 | 1 |
| 10 | 2 | 6 | -1 | -1 | 0 | 1 | -1 | 2 |
| 11 | 3 | 7 | -1 | -1 | -1 | 0 | -3 | 3 |

FIG. 22

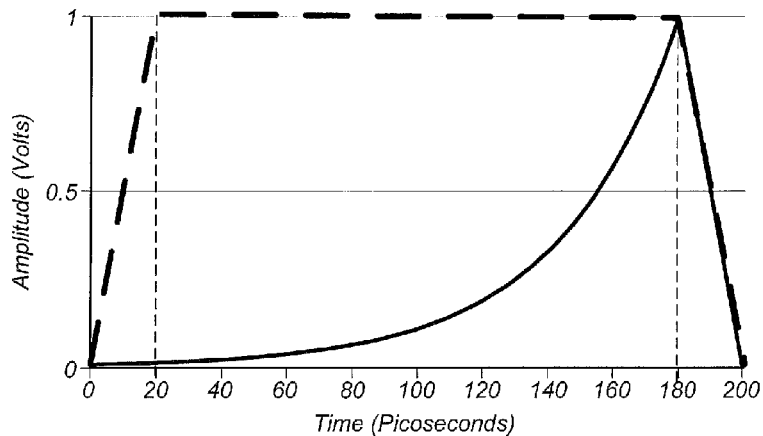

Receive a signal $y(t)$ from a communication medium in response to a transmission of a communication signal $x(t)$ onto the communication medium by a transmitter, wherein the communication signal $x(t)$ includes a sequence of symbols $\{S_k\}$, wherein each symbol $S_k$ of the sequence of symbols has the same symbol duration $T$ and has been selected from a symbol set based on the value of a respective bit $b_k$ of a sequence of bits $\{b_k\}$, wherein the symbol set includes a zero symbol and an exponential symbol, wherein the zero symbol has zero voltage over the symbol duration $T$, wherein the exponential symbol is a pulse whose leading edge is exponentially shaped
2810

For each symbol $S_k$ of the sequence of symbols $\{S_k\}$, apply threshold detection to the received signal $y(t)$ in order to obtain an estimate of the respective bit $b_k$
2815

FIG. 28

DECODING A COMMUNICATION SIGNAL THAT CONTAINS ANALOG PULSES WITH EXPONENTIALLY-SHAPED LEADING EDGES

PRIORITY CLAIM INFORMATION

This application is a continuation of U.S. patent application Ser. No. 14/182,082, filed Feb. 17, 2014, entitled "Communication Using Analog Pulses Having Exponentially-Shaped Leading Edges", invented by Robert H. Flake, which is hereby incorporated by reference in its entirety as though fully and completely set forth herein.

FIELD OF THE INVENTION

The present invention relates to the field of telecommunication and more particularly, to systems and methods for communicating information by means of analog pulses whose leading edges are exponentially shaped.

DESCRIPTION OF THE RELATED ART

An analog pulse p(t) with leading edge of the form p(t)=D*exp($\alpha$t) and with a being a positive constant is distinctive because the leading edge propagates in a lossy transmission medium without shape distortion. The leading edge extends over a finite interval of time t, e.g., over the interval $[0,t_p]$, where $t_p$ is a positive constant. (A transmission medium is said to be lossy if it dissipates energy from the pulse as it propagates through the medium.) For example, if one transmits the pulse p(t) onto a lossy electrical cable, the signal q(t) at any particular point along the cable will also have a leading edge of the same form, i.e., $$q(t)=D^*\exp(\alpha(t-t_d)),$$

with t being in the interval $[t_d, t_p+t_d]$, where $t_d$ is a propagation delay time that depends on the propagation distance within the cable between the point of application of the pulse p(t) and the point of measurement of the signal q(t). The same observation could be made for a wide variety of lossy transmission media. In contrast, the rectangular pulses often used to transmit digital data experience significant dispersion in lossy media, and thus, very quickly loose their shape, compromising the efficacy of applications such as communication and timing measurement. (Rectangular pulses are often used in PCM systems. PCM is an acronym for Pulse Code Modulation. For more information on PCM, please refer to pages 172-180 of "Digital Communications" by Simon Haykin, ©1988, John Wiley & Sons.)

The above-described property of shape preservation makes the pulse p(t) ideal for applications such as communication and timing measurement (e.g., time-domain reflectometry and time-domain transmission). The pulse p(t), its shape preservation property and a wide variety of applications related to that property were disclosed in the following U.S. Patents, all of which are incorporated by reference herein in their entireties:

U.S. Pat. No. 6,441,695, filed on Mar. 7, 2000, entitled "Methods for Transmitting a Waveform Having a Controllable Attenuation and Propagation Velocity", invented by Robert H. Flake;

U.S. Pat. No. 6,847,267, filed on Aug. 20, 2002, "Methods for Transmitting a Waveform Having a Controllable Attenuation and Propagation Velocity", invented by Robert H. Flake and John F. Biskup;

U.S. Pat. No. 7,375,602, filed on Dec. 10, 2004, entitled "Methods for Propagating a Non Sinusoidal Signal Without Distortion in Dispersive Lossy Media", invented by Robert H. Flake, John F. Biskup, and Su-liang Liao;

U.S. Pat. No. 7,859,271, filed on Mar. 26, 2008, entitled "Methods for Propagating a Non Sinusoidal Signal Without Distortion in Dispersive Lossy Media", invented by Robert H. Flake and John F. Biskup; and U.S. Pat. No. 8,093,911, filed on Oct. 26, 2010, entitled "Time-of-Flight Measurement Based on Transfer Function and Simulated Exponential Stimulus", invented by Robert H. Flake, John F. Biskup, and Su-liang Liao.

U.S. Pat. No. 6,441,695 (the '695 patent) teaches among other things that information may be transmitted through a medium by modulating the coefficient $\alpha$. (See Col. 16, line 45 through Col. 17, line 4 of the '695 patent.) A receiver may decode the transmitted coefficient $\alpha$ by measuring the propagation velocity and/or attenuation of the signal, and then computing the coefficient $\alpha$ using an equation that relates a to the velocity and/or the attenuation.

U.S. Pat. No. 6,847,267 (hereinafter referred to as the '267 patent) teaches among other things two fundamental methods for communicating information:

(1) In the first communication method, information is transmitted using symbols of the form $D_j\exp(\alpha_1 t)$, where the amplitude $D_j$ and value $\alpha_1$ for any given symbol are determined by the information bits to be transmitted. (See the section of the '267 patent starting at Col. 24, line 40.) The receiver may detect the value $\alpha_1$ using "a set of matched filters". Alternatively, the receiver may compute the logarithm of the received signal, perform a least squares fit on the log values to determine a slope value, and map the slope value to a decision value for $\alpha$. (See Col. 25, lines 32 through 40 of the '267 patent.)

(2) In the second communication method, the information is used to modulate the amplitudes of a set of pulses $\{S_1\}$. (See the section starting at Col. 25, line 52 of the '267 patent.) The transmitter transmits the superposition of the amplitude-modulated pulses. Thus, symbols are of the form:

$$Q=A_1S_1+A_2S_2+\ldots+A_nS_n,$$

where $A_1, A_2, \ldots, A_n$ are information-bearing amplitude factors. (See Col. 28, line 45 of the '267 patent.) The pulses $\{S_1\}$ are designed to be orthogonal at the receiver. Each of the pulses comprises a distinct linear combination of the signals $$\{\exp(\alpha_1 t): i=1,2,3,\ldots,N\},$$

where $\alpha_1=\alpha_0+i^*\Delta\alpha$. The receiver may decode the transmitted symbol Q by computing the inner product of Q with each pulse $S_j$: $<Q,S_j>$. (See Col. 28, lines 46-60 of the '267 patent.) Each inner product value may be normalized to produce an estimate for the corresponding amplitude $A_1$. The amplitude estimates are then used to estimate the transmitted bits.

U.S. Pat. No. 7,375,602 (hereinafter, the '602 patent) discloses a method in which the transmitter segments the leading edge of an analog pulse into two or more subintervals, and selects the $\alpha$ value for each subinterval based on corresponding information bit(s). (See the section starting at Col. 41, line 25 of the '602 patent.) The receiver decodes each subinterval separately, to obtain estimates for the corresponding $\alpha$ values. The receiver may detect (e.g., decode) the $\alpha$ values using techniques similar to those described in connection with method (1) above. (See the '602 patent at Col. 42, line 23-25.)

There exists a need for improved mechanisms for transmitting and receiving information using communication signals comprising pulses of the form p(t) described above. It would be especially desirable if such mechanisms could operate in real time at high pulse rate.

Another problem in the prior art is that of measuring the distance and/or velocity of moving objects. In the fields of radar and sonar, it is well understood that a measurement of distance to a remote object may be obtained by transmitting a pulse, receiving the return pulse reflected by the remote object, and computing the time-of-flight between transmission and reception. The time-of-flight value may be used to determine the radial distance to the object given the velocity of pulse propagation within the transmission medium. Furthermore, the radial velocity of a moving object may be determined by transmitting a sinusoidal signal and observing the frequency shift (i.e., the Doppler shift) of the signal reflected from the moving object. However, Doppler-based systems may be costly and/or limited in range and/or limited in accuracy. Thus, there exists a need for improved mechanisms for measuring the radial velocity of moving objects.

SUMMARY

Various embodiments described herein use a unique signal that is non-sinusoidal and non-periodic, referred to herein as the speedy delivery signal. The speedy delivery signal includes an exponential portion of the form $D^*\exp(\alpha t)$, where D is a non-zero constant, where $\alpha$ is positive, and t is time. The exponential portion of the speedy delivery signal is non-dispersive and propagates with constant velocity in a lossy medium. In one of its realizations, the speedy delivery signal is a closed pulse, where the exponential portion is the leading edge of the closed pulse.

In one set of embodiments, a receiver system for decoding a communication signal may include an input port and a filter.

The input port may be configured to receive the communication signal from a communication medium. The communication signal comprises a sequence of symbols. A transmitter is configured to generate and transmit the communication signal onto the communication medium. In particular, the transmitter is configured to generate the communication signal so that each symbol of the symbol sequence is an analog pulse that has a leading edge of the form $D_j \exp\{\hat{\alpha}_j t\}$, where t represents intrasymbol time, where $D_j$ is a non-zero real amplitude, where $\hat{\alpha}_j = \alpha_j + \Delta\alpha$, where $\Delta\alpha$ is a noise value associated with the symbol, where $\alpha_j$ is an element of the finite set $A = \{\alpha_0, \alpha_1\}$. The elements $\alpha_0$ and $\alpha_1$ of the finite set A are distinct positive real numbers. The transmitter selects the value $\alpha_j$ for each symbol based on a corresponding bit from a stream of information bits.

The filter $G_0$ may be configured to receive the communication signal from the input port and to filter the communication signal to obtain a output signal $y_0(t)$. The transfer function $G_0(s)$ of the filter has one or more zeros at $\alpha_0$. In some embodiments, the transfer function $G_0(s)$ also has a number of poles in the left half of the s plane that is greater than or equal to the number of zeros of the transfer function at $\alpha_0$. The output signal $y_0(t)$ represents the stream of information bits. At the end of the leading edge of each symbol, the symbol amplitude indicates the information bit that was used (by the transmitter) to select the symbol.

In some embodiments, the receiver system may also include a filter $G_1$ configured to receive the communication signal from the input port and to filter the communication signal to obtain an output signal $y_1(t)$. The transfer function $G_1(s)$ of the filter $G_1$ has one or more zeros at $\alpha_1$. In some embodiments, the transfer function $G_1(s)$ also has a number of poles in the left half of the s plane that is greater than or equal to the number of zeros at $\alpha_1$. The output signal $y_1(t)$ also represents the stream of information bits. At the end of the leading edge of each symbol, the symbol amplitude indicates the information bit that was used (by the transmitter) to select the symbol. In some embodiments, the output signals $y_0(t)$ and $y_1(t)$ may be processed to obtain a better estimate of the information bits than could be achieved using only one of the output signals.

In one set of embodiments, a receiver system for decoding a communication signal may include an input port, a set of N−1 filters $G_0, G_1, \ldots, G_{N-1}$ and a decision unit.

The input port may be configured to receive the communication signal from a communication medium. The communication signal comprises a sequence of symbols. A transmitter is configured to generate and transmit the communication signal onto the communication medium. In particular, the transmitter may be configured to generate the communication signal so that each symbol of the symbol sequence is an analog pulse that has a leading edge of the form $D_j \exp\{\hat{\alpha}_j t\}$, where t represents intrasymbol time, where $D_j$ is a non-zero real amplitude, where $\hat{\alpha}_j = \alpha_j + \Delta\alpha$, where $\Delta\alpha$ is a noise value associated with the symbol. The coefficient $\alpha_j$ is an element of the finite set $A = \{\alpha_0, \alpha_1, \ldots, \alpha_{N-1}\}$. The elements $\alpha_0, \alpha_1, \ldots, \alpha_{N-1}$ of the finite set A are distinct positive real numbers, where $N=2^n$, where n is greater than or equal to two. The transmitter selects the value $\alpha_j$ for each symbol based on a corresponding group of n bits from a stream of information bits.

Each filter $G_k$, $k=0, 1, \ldots, N-1$, may be configured to receive the communication signal from the input port and to filter the communication signal to obtain a respective output signal $y_k(t)$. The transfer function $G_k(s)$ of filter $G_k$ has one or more zeros at $\alpha_k$. In some embodiments, the transfer function $G_k(s)$ has a number $n_p(k)$ of poles in the left half of the s plane that is greater than or equal to the number $n_z(k)$ of zeros at $\alpha_k$.

The decision unit may be configured to generate for each symbol an estimate of the corresponding group of n bits using the N output signals. In some embodiments, the decision unit may be configured to generate for each symbol the estimate of the corresponding group of n bits by: summing the N output signals to obtain a sum signal; applying a linear transformation to the sum signal to obtain a transformed signal; and sampling the transformed signal at a time $t=t_S$ within the leading edge of the symbol to obtain the estimate for the corresponding group of n bits.

In one set of embodiments, a method for transmitting information may include: receiving a sequence of bits $\{b_k\}$; generating a communication signal including a sequence of transmit symbols $\{S_k\}$, where each transmit symbol $S_k$ of the sequence of transmit symbols has the same symbol duration T and is selected from a symbol set based on the value of a respective bit $b_k$ of the sequence of bits, where the symbol set includes a zero symbol and an exponential symbol, where the zero symbol has zero voltage over the symbol duration T, where the exponential symbol is an analog pulse whose leading edge is exponentially shaped, where said generating is performed by a signal generator circuit; and transmitting the communication signal onto a communication medium, where said transmitting is performed by a transmitter.

In one set of embodiments, a method for receiving information may include: receiving a signal y(t) from a communication medium in response to a transmission of a communication signal x(t) onto the communication medium by a transmitter, wherein the communication signal x(t) includes a sequence of symbols $\{S_k\}$, wherein each symbol $S_k$ of the sequence of symbols has the same symbol duration T and has been selected from a symbol set based on the value of a respective bit $b_k$ of a sequence of bits $\{b_k\}$, wherein the symbol set includes a zero symbol and an exponential symbol, wherein the zero symbol has zero voltage over the symbol duration T, wherein the exponential symbol is an analog pulse whose leading edge is exponentially shaped; and for each symbol $S_k$ of the sequence of symbols $\{S_k\}$, applying threshold detection to the received signal y(t) in order to obtain an estimate of the respective bit $b_k$.

In one set of embodiments, a velocity measurement system may be configured to include a transmitter, a receiver and a control unit. The transmitter may generate an output signal comprising a temporal sequence of two or more analog pulses. Each of the analog pulses of the output signal has a leading edge of the form $D*\exp(\alpha t)$. All of the analog pulses of the transmit signal may use the same value of the coefficient α and the same value of amplitude factor D. One or more of the interpulse time separations between the analog pulses of the output signal are known. (In one embodiment, the one or more time separations are known by measurement of the output signal. In another embodiment, the one or more time separations are known by virtue of having intentionally generated the analog pulses to have those one or more time separations.) The transmitter transmits the output signal onto a transmission medium. The receiver receives a return signal comprising a temporal sequence of two or more reflected analog pulses from the transmission medium. The return signal is generated by reflection of the transmitted output signal from a moving object. The control unit may determine one or more interpulse time separations between the analog pulses of the return signal. The control unit may compute a radial velocity u of the moving object based on data including the one or more interpulse time separations of the output signal, the one or more interpulse time separations of the return signal, and a velocity v of signal propagation in the transmission medium.

BRIEF DESCRIPTION OF THE DRAWINGS

A better understanding of the present invention can be obtained when the following detailed description of the preferred embodiments is considered in conjunction with the following drawings.

FIG. 1C gives an example of the communication signal over eight symbol periods, where information has been modulated onto the communication signal by varying the exponential coefficient α from symbol to symbol based on the information.

FIG. 1D illustrates one embodiment of a receiver for processing a communication signal to facilitate the recovery of information from the communication signal, where the communication includes a sequence of symbols whose leading edges are growing exponential functions.

FIG. 1E illustrates the generic symbol $\hat{x}_j(t)$ of the communication signal x(t) being supplied as input to the filter 1015, and the corresponding output $y_{0,j}(t)$ being generated by the filter 1015 in response to the symbol $\hat{x}_j(t)$.

FIG. 5B illustrates one embodiment of the communication signal where modulation of the exponential coefficient α and modulation of sign (plus or minus) are used in conjunction.

FIG. 5C illustrates an embodiment of system 800 that is configured to communicate an analog signal through a communication medium 950.

FIG. 6 illustrates one embodiment of the receiver system 1000 including two filters $G_0$ and $G_1$. The filters generate output signal $y_{0,j}(t)$ and $y_{1,j}(t)$ in response to the generic symbol $x_j(t)$ as input.

FIG. 7 illustrates a pole-zero plot of the transfer function of filter $G_0$, according to one embodiment.

FIG. 8 illustrates the output of the filters $G_0$ and $G_1$ at time $t=t_p$ in response to the symbol $x_0(t)$.

FIG. 9 illustrates the output of the filters $G_0$ and $G_1$ at time $t=t_p$ in response to the symbol $x_1(t)$.

FIG. 10 is a table showing the output of the filters $G_0$ and $G_1$ at time $t=t_p$ for each symbol in an example sequence of eight symbols.

FIG. 19 is a table showing the scaled output values $y_{0j}(t_p)/K_0$, $y_{1j}(t_p)/K_1$, $y_{2j}(t_p)/K_2$ and $y_{3j}(t_p)/K_3$ as function of index j of the symbol being supplied as input to the filters $G_0$, $G_1$, $G_2$ and $G_3$ of FIG. 14D or FIG. 18.

FIG. 20 is a table showing the output values $y_{0j}(t_p)$, $y_{1j}(t_p)$, $y_{2j}(t_p)$ and $y_{3j}(t_p)$ as a function of index j being supplied as input to the filters $G_0$, $G_1$, $G_2$ and $G_3$.

FIG. 21 is a table showing the output values $y_{0j}(t_p)$, $y_{1j}(t_p)$, $y_{2j}(t_p)$ and $y_{3j}(t_p)$ as a function of index j under the assumption that the filter $G_0$, $G_1$, $G_2$ and $G_3$ have upper and lower saturation levels at −1 and 1 respectively.

FIG. 22 is a table showing the outputs of the filters $G_0$, $G_1$, $G_2$ and $G_3$ at time $t=t_p$ in response to each of four symbols of the form $D_j \exp(\hat{\alpha}_j t)$. The table also shows the sum of the filter outputs and an affine transformation of the sum.

FIG. 27D show the superposition of an exponential symbol and a rectangular pulse, according to one particular embodiment.

FIG. 28 shows one embodiment of a method for receiving information using exponential symbols and zero symbols.

Figure 1A:
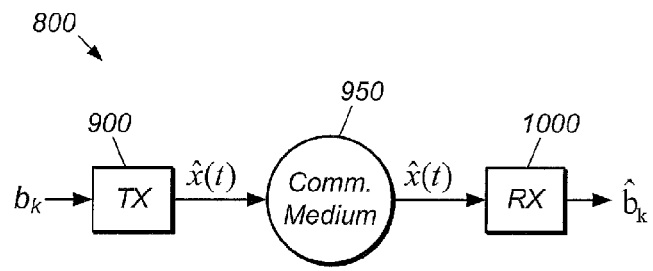
FIG. 1A illustrates one embodiment of a communication system 800 for communicating information between a transmitter 900 and receiver 1000.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network. In some embodiments, a memory medium may be a flash memory A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), tablet computers, computer-based television systems, grid computing systems, wearable computers, computers implanted in living organisms, computers embedded in head-mounted displays, computers embedded in sensors forming a distributed network, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

Communication System 800

In one set of embodiments, a communication system 800 may be configured as shown in FIG. 1A. The communication system includes a transmitter 900, a communication medium 950 and a receiver 1000.

The transmitter 900 may receive a sequence $\{b_k\}$ of bits from an information source, generate a communication signal $\hat{x}(t)$ based on the bit sequence $\{b_k\}$, and transmit the communication signal $\hat{x}(t)$ onto the communication medium 950. The communication signal $\hat{x}(t)$ includes a sequence of symbols, with each symbol occupying a time interval of duration T. The duration T is referred to as the symbol period. The rate 1/T is referred to as the symbol rate. Each symbol of the symbol sequence is determined by a corresponding group of one or more bits from the bit sequence $\{b_k\}$. The receiver 1000 receives the communication signal $\hat{x}(t)$ from the communication medium 950 in response to the transmitter's action of transmitting the communication signal $\hat{x}(t)$ onto the communication medium. The receiver may operate on the communication signal to recover an estimate $\hat{b}_k$ of each bit $b_k$ of the original bit sequence $\{b_k\}$. The estimated bit sequence $\{\hat{b}_k\}$ may be provided as an output of the receiver 1000.

Figure 1B:
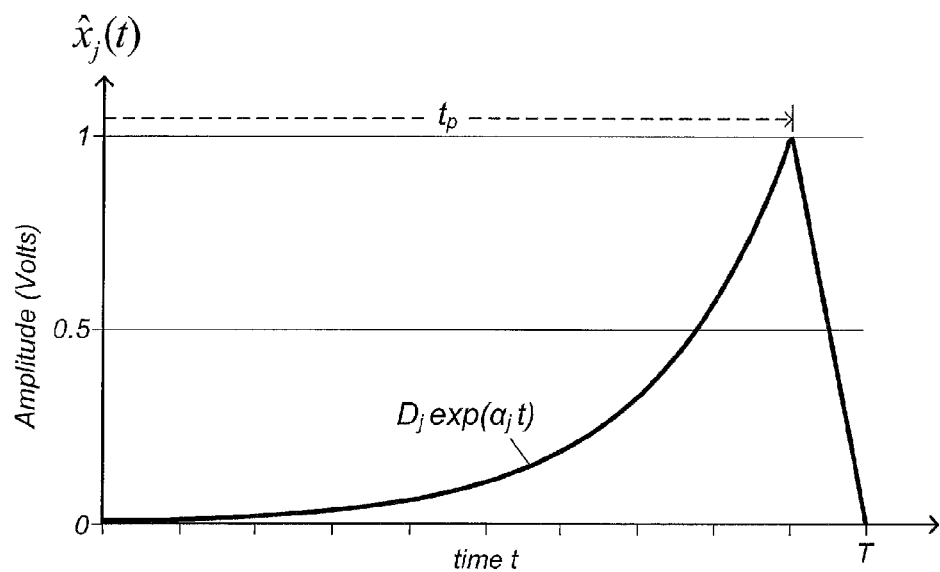
FIG. 1B illustrates the leading edge of a generic symbol of the communication signal, according to one embodiment.

The transmitter 900 may generate the communication signal $\hat{x}(t)$ so that each symbol $\hat{x}_j(t)$ of the symbol sequence is an analog pulse that has a leading edge of the form $\hat{x}_j = D_j \exp\{\hat{\alpha}_j t\}$. The variable t represents intrasymbol time. The factor $D_j$ is a non-zero real amplitude. The value $\hat{\alpha}_j$ associated with the current symbol $\hat{x}_j(t)$ is meant to be equal to a value $\alpha_j$ selected from the set $$A_2 = \{\alpha_0, \alpha_1\},$$

where the selection is based on a corresponding bit from the bit stream $\{b_k\}$. (The elements $\alpha_0$ and $\alpha_1$ of the finite set $A_2$ are distinct positive real numbers.) However, due to noise in the transmitter (e.g., random noise and/or systematic noise), the actually-realized value $\hat{\alpha}_j$ associated with the current symbol may depart from the intended value $\alpha_j$:

$$\hat{\alpha}_j = \alpha_j + \Delta\alpha,$$

where $\Delta\alpha$ is the noise value associated with the current symbol. (The noise value $\Delta\alpha$ is preferably small compared to $|\alpha_1 - \alpha_0|/2$.) For example, the transmitter 900 may include two analog circuits, the first being designed to nominally produce an exponential signal of the form $\exp(\alpha_0 t)$, and the second being designed to nominally produce an exponential signal of the form $\exp(\alpha_1 t)$. However, the parameter values of circuit elements in the analog circuit may depart slightly from nominal values required by design. Thus, the signals actually generated by the analog circuits are respectively $\exp\{\hat{\alpha}_0 t\}$ and $\exp\{\hat{\alpha}_1 t\}$. The transmitter 900 may include a selection circuit to select one of the two actually generated signals based on a current bit $b_k$ of the bit stream $\{b_k\}$ FIG. 1B shows an example of the generic symbol $\hat{x}_j(t)$ with ideal leading edge of the form $D_j \exp\{\alpha_j t\}$, i.e., noise $\Delta\alpha = 0$, and with trailing edge being a linear ramp. (While FIG. 1B implies that the communication signal is a voltage signal, in other embodiments, the communication signal may be a current signal.) The transmitter may select the amplitude $D_j$ so that the leading edge reaches 1 volt at time $t_p$ at the input of the receiver 1000. (In some embodiments, time $t_p$ may be interpreted as the time at which the leading edge reaches its maximum value.) The value $t_p$ is greater than zero and less than T. In various embodiments, the ratio $t_p/T$ may be, respectively, in the interval (0,0.1], in the interval [0.1,0.2], in the interval [0.3,0.4], in the interval [0.4,0.5], in the interval [0.5,0.6], in the interval [0.6,0.7], in the interval [0.8,0.9], in the interval [0.9,0.95], and in the interval [0.95,1.0).

It should be noted that any of various existing communication standards may be extended and/or modified to use symbol sequences of the kind described above, e.g., communication standards such as the Ethernet standards (e.g., 10BASE-T, 10BASE2, 10BASE5, 100BASE-TX, 100BASE-FX, 100BASE-T, 1000BASE-T, 1000BASE-SX, etc.), USB 1.0, USB 2.0, USB 3.0, Firewire, Bluetooth, WiFi, DSL, ISDN, T1, SONET, GSM, IEEE 1394, LTE and UMTS.

FIG. 1C shows an example of the communication signal $\hat{x}(t)$ including a sequence of eight symbols corresponding to the bit sequence 0 1 1 0 0 1 0 1. The symbols corresponding to the bit value 0 have leading edge of the form $D_0 \exp\{\alpha_0 t\}$, while the symbols corresponding to the bit value 1 have leading edge of the form $D_1 \exp\{\alpha_1 t\}$, where $0 < \alpha_0 < \alpha_1$. For ease of illustration, the noise term $\Delta\alpha$ is assumed to be zero for each symbol. The constants $D_0$ and $D_1$ have been selected (by the transmitter) so that the amplitude of each symbol reaches 1.0 volts at the end of the leading edge. It should be noted that the specific bit sequence and the specific parameter values used in this example are not meant to be limiting. The bit sequence is completely arbitrary.

As noted above, the receiver 1000 decodes the communication signal $\hat{x}(t)$ to generate the estimated bit sequence $\{\hat{b}_k\}$. The receiver 1000 may include an input port 1010 and a filter 1015 as shown in FIG. 1D. The input port 1010 may be configured to receive the communication signal $\hat{x}(t)$ from the communication medium 950. In some embodiments, the communication medium may be an electrical cable, or a set of wires, or more generally, an electrically conductive medium. For example, the communication medium may be a coax cable or a twisted wire pair or a bundle of twisted wire pairs (such as a Cat 5 cable, a Cat 5e cable or a Cat 6 cable) or a USB cable (such as a USB 2.0 cable or a USB 3.0 cable) or a twinaxial cable or an electromagnetic core (EMC) cable or a logging cable (such as those deployed in wells for petroleum exploration and/or production). In one embodiment, the communication medium is a 10 Gigabit Ethernet cable. The input port 1010 may include an electrical connector (or a set of electrical connectors) configured for coupling to the electrical cable or the set of wires. In some embodiments, the input port may include an amplifier to amplify the communication signal so that the filter 1015 operates on the amplified communication signal.

More generally, the communication medium 950 may be any desired physical medium or combination of physical media, and the communication signal may be any desired type of signal. For example, the communication medium may be a solid medium such as a portion of the earth's subsurface, a liquid medium such as a body of water, a plasma medium, a gaseous medium such as a portion of the atmosphere, a layered medium (such as a solid medium with two or more layers of solid material, a liquid medium with two or more liquid layers, or a mixed solid-and-liquid medium with one or more solid layers and one or more liquid layers). The communication signal may be an electrical or electromagnetic signal, an acoustic signal, a seismic signal, a thermal signal, chemical (or particle) density signal, etc.

In one embodiment, the communication signal is an electromagnetic signal, and the communication medium is an electrical cable, or a twisted wire pair, or an untwisted wire pair, or a conductive trace on a circuit board, or a conductive path in an integrated circuit, or a series combination of the foregoing types of conductive element.

In one embodiment, the communication signal is an optical signal and the communication medium is an optical fiber. (The term "optical signal" is meant to encompass any electromagnetic signal whose spectrum resides in the wavelength range $[\lambda_L,\lambda_U]$, where the wavelength range $[\lambda_L,\lambda_U]$ includes the infrared spectrum, the visible light spectrum and the ultraviolet spectrum.) In another embodiment, the communication signal is an optical signal (e.g., a laser-generated signal), and the communication medium is the atmosphere, or a body of liquid such as water, or a slab of transparent material such as glass. In these embodiments, the receiver may include an optical-to-electrical conversion device such as a photodiode. The optical-to-electrical conversion device converts the optical signal into an electrical signal, and supplies the electrical signal to the input port 1010.

In some embodiments, the communication signal is an acoustic signal and the communication medium is a body of water such as a river, a lake or a body of seawater. In another embodiment, the communication signal is an acoustic signal and the communication medium is a metallic medium. (For example, the metallic medium may be a steel cable.) In these embodiments, the receiver may include an acoustic-to-electrical conversion device that converts the acoustic signal to an electrical signal and supplies the electrical signal to the input port 1010.

In some embodiments, the acoustic signal is an ultrasound signal or a sound signal or an infrasound signal.

In some embodiments, the acoustic signal is a sonar signal, and the communication medium is a body of water. In this embodiment, the transmitter 900 may include a transducer (e.g., a piezoelectric transducer) to convert the communication signal from an electrical signal into a sonar signal, and the receiver may include a transducer (e.g., a hydrophone) to convert the communication signal from a sonar signal into an electrical signal.

In the petroleum industry, commercial telemetry systems based on wired pipe are used to transmit measurements while drilling for petroleum. (See IEEE Instrumentation and Measurement Magazine, Vol. 16, No. 6, December 2013, page 14. Wired pipe is a technology researched and developed under a U.S. Department of Energy grant.) Such systems have been introduced in the last ten years. They allow an increase in the rate of data transmission to and/or from devices in the drill hole, i.e., an increase relative to previous generations of telemetry systems. Thus, in some embodiments, the communication medium is a channel as used in wired pipe telemetry. The channel may be formed from sections of drill pipe. Each section includes a wire (or cable) running along its length, and inductive couplers at its ends (e.g., one inductive coupler at each end of the section). When two sections are joined together, the inductive couplers establish an inductive electrical connection between the sections so that a signal propagating along the wire of one section is transferred to the wire of the other section. When multiple sections are joined together, signals may be transmitted through the channel formed by the multiple sections. (Repeaters may be included among the sections to regenerate the signal every 200 to 300 meters.) For example, signals may be transmitted from measurement devices located in the drill hole to a controller at the drill head or other surface location. As another example, signals may be transmitted from the controller to actuators located in the drill hole. The increase in data transmission rate afforded by wired pipe telemetry enables real-time visualization of the drilling operation, so that operators can monitor and control the drilling interactively.

It should be understood that an analog pulse whose leading edge is of the form $D^*\exp(\alpha t)$ (with $\alpha$ being a positive constant) will preserve its shape when propagating through the wired pipe channel. In particular, note that the inductive coupling at the junction between a successive pair of pipe sections appears as a real-valued impedance to the exponential leading edge of the analog pulse. The voltage v(t) across an inductor is L times the derivative of the current i(t) through the inductor, where L is the inductance value of the inductor. The derivative of an exponential signal $\exp(\alpha t)$ is $\alpha^*\exp(\alpha t)$. Thus, the impedance of the inductor as seen by the exponential leading edge is $L^*\alpha$. Therefore, the leading edge propagates through the inductive coupling without disturbance of shape.

In one embodiment, a transceiver may be configured using the above-described transmitter 900 and receiver 1000. The transceiver includes a local transmitter that transmits over the communication medium to a remote receiver. The transceiver also includes a local receiver that receives from a remote transmitter via the communication medium (or perhaps, via a separate communication medium). The local transmitter and remote transmitter are instances of the above-described transmitter 900. The local receiver and remote receiver are instances of the above-described receiver 1000.

In some embodiments, the transmitter 900 and/or the receiver 1000 and/or the above-described transceiver may be incorporated in a memory device such as a memory stick or a flash drive or memory card or memory chip, to facilitate the communication of digital information to and/or from the memory device. In one embodiment, the memory device has a connector interface as specified in one of the USB standards (e.g., USB 2.0 or USB 3.0). The memory device may couple to the communication medium 950 through the connector interface.

In some embodiments, the transmitter 900 and/or the receiver 1000 and/or the above-described transceiver may be incorporated in a computer system such as a server computer or a desktop computer or a laptop computer or a tablet computer, to facilitate the communication of digital information to and/or from the computer system.

In some embodiments, the transmitter 900 and/or the receiver 1000 and/or the above-described transceiver may be used to communicate between nodes in a server farm or server cluster. The nodes may be coupled by electrical cables (e.g., differential twinaxial cables), and/or, optical fibers.

In some embodiments, the communication signal $\hat{x}(t)$ is an envelope that has been applied (by modulation) to a sinusoidal carrier signal. For example, where the communication medium is the atmosphere or an optical fiber, a sinusoidal carrier may be necessary to effectively transmit the communication signal through the communication medium. In these contexts, the receiver 1000 may include a demodulator (or envelope detector) that recovers the envelope from the modulated carrier signal. The demodulator supplies the envelope signal, i.e., the communication signal $\hat{x}(t)$, the input port 1010.

The filter 1015 may be configured to receive the communication signal $\hat{x}(t)$ from the input port 1010 and to filter the communication signal to obtain an output signal $y_0(t)$. The transfer function $G_0(s)$ of the filter 1015 has one or more zeros at $\alpha_0$. (The variable s is a complex variable.) In some embodiments, the transfer function $G_0(s)$ also has one or more poles in the left half of the s plane. The number of poles in the left half plane is greater than or equal to the number of zeros at $\alpha_0$. In one embodiment, the filter 1015 is a first order all-pass filter, i.e., the transfer function $G_0(s)$ has the form $$G_0(s)=K_0(\alpha_0-s)/(\alpha_0+s),$$

where $K_0$ is a non-zero real constant.

The output signal $y_0(t)$ may be interpreted as an estimate of the stream of information bits $\{b_k\}$. When the output signal $y_0(t)$ is sampled at an appropriate sampling time $t_S$ within each symbol period, the resulting amplitudes represent estimates of the respective bits of the bit stream $\{b_k\}$. (For example, the sample time $t_S$ may be at or near time $t_p$, or in one embodiment, no later than time $t_p$.) In some embodiments, the output signal $y_0(t)$ may be further processed, e.g., as variously described below.

During a given symbol period, the communication signal $\hat{x}(t)$ equals symbol $\hat{x}_j(t)$, and the response $y_0(t)$ of the filter 1015 specializes to $y_{0j}(t)$. In other words, $y_{0j}(t)$ is the filter response to symbol $\hat{x}_j(t)$, as shown in FIG. 1E.

In some embodiments, the transmitter 900 is configured to employ differential signaling to transmit the communication signal $\hat{x}(t)$ through the communication medium 950. In this case, the communication medium 950 may include a pair of electrical conductors, and the signal $\hat{x}(t)$ is transmitted onto one of the conductors while the signal $-\hat{x}(t)$ is transmitted onto the other conductor. The receiver 1000 then includes a differential amplifier that couples to the two electrical conductors and senses the difference of the two signals received respectively from the two electrical conductors. The output of the differential amplifier is coupled to the above-described input port 1010.

Figure 2:
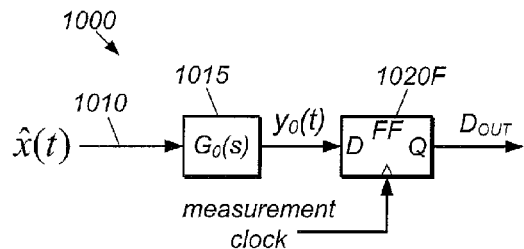
FIG. 2 illustrates the use of a D flip flop to generate a digital output signal representing an estimate of the original bit stream that was used to generate the communication signal.

In some embodiments, the receiver 1000 may also include a flip flop circuit 1020F, e.g., as shown in FIG. 2. The flip flop circuit may be an edge-triggered D flip flop. The flip flop circuit may be configured to receive the signal $y_0(t)$ at its D input, and to receive a measurement clock signal at its clock input. (The clock input is denoted by the wedge-shaped notch.) The measurement clock has the same frequency 1/T as the symbol clock. The flip flop circuit may capture the value of the signal $y_0(t)$ at a definite point within the measurement clock cycle (e.g., at the rising edge). The captured value becomes the Q output of the flip flop. The measurement clock may be tuned so that the flip flop circuit captures a sample of the signal $y_0(t)$ at time $t=t_S$ within the leading edge of each symbol $\hat{x}_j(t)$. The time $t_S$ may be at or near the time $t_p$ where the exponential leading edge reaches its maximum. (See FIG. 1B.) For example, in some embodiments, $t_S=t_p-\epsilon$, where $\epsilon$ is a small positive constant. (The tuning of the measurement clock may need to account for the delay inherent in the flip flop circuit.) In one embodiment, the leading edge of the measurement clock may be synchronized so that it occurs at time $t_p$ or slightly before time $t_p$. The digital output signal $D_{OUT}$ produced at the Q output of the flip flop circuit may be interpreted as representing an estimate of the original stream of information bits $\{b_k\}$. For information on the construction and operation of flip flops, see, e.g., Wikipedia under the heading "Flip-flop (electronics)".

While the discussion above suggested the rising edges of the measurement clock as the edges that control the capture of samples by the flip flop circuit, the falling edges may be used just as well. The controlling edges are referred to herein as the active edges.

In some embodiments, the time $t_p$ is selected so that $\alpha_{min}t_p$ is greater than or equal to three, where $\alpha_{min}$ is the minimum of $\alpha_0$ and $\alpha_1$.

In some embodiments, the sampling time $t_S$ is within the last 2% or the last 5% or the last 10% or the last 20% (in terms of time) of the leading edge of the symbol.

In some embodiments, the peak time $t_p$ is within the last 10% or the last 20% or the last 30% (in terms of time) of the symbol period T.

Figure 3:
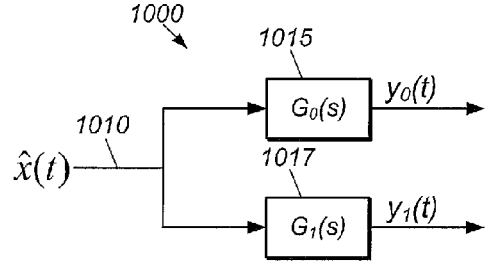
FIG. 3 illustrates one embodiment of the receiver system 1000 including two filters, $G_0$ and $G_1$.

In some embodiments, the receiver 1000 may also include a filter 1017 in addition to the filter 1015, e.g., as shown in FIG. 3. The filter 1017 may be configured to receive the communication signal $\hat{x}(t)$ from the input port 1010 and to filter the communication signal to obtain an output signal $y_1(t)$. The transfer function $G_1(s)$ of the filter 1017 has one or more zeros at $\alpha_1$. Furthermore, the transfer function $G_1(s)$ may have one or more poles in the left half of the s plane. The number of poles of $G_1(s)$ in the left half plane may be greater than or equal to the number of zeros of $G_1(s)$ at $\alpha_1$. In one embodiment, the filters 1015 and 1017 are first order all-pass filters, i.e., $$G_0(s)=K_0(\alpha_0-s)/(\alpha_0+s),$$

$$G_1(s)=K_1(\alpha_1-s)/(\alpha_1+s),$$

where $K_0$ and $K_1$ are non-zero real constants.

In some embodiments, an inverter circuit may intervene between the input port and the filter 1015. The inverter circuit may be configured to negate the communication signal $\hat{x}(t)$. Thus, the filter 1015 may receive the negative of the communication signal instead of the communication signal itself. Inverter circuits are well known in the art of circuit design, and thus, need not be elaborated here. In one embodiment, the inverter circuit is a conventional inverter circuit employing an operational amplifier.

Figure 4:
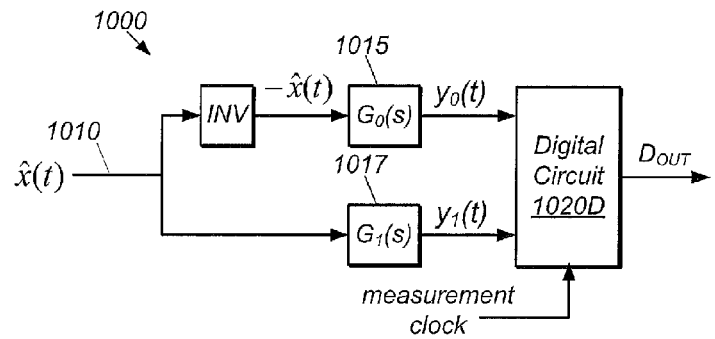
FIG. 4 illustrates one embodiment of the receiver system 1000 including two filters, and a digital circuit to process the output of the two filters in order to generate a digital output signal representing an estimate of the original bit stream that was used to generate the communication signal.

In some embodiments, the receiver 1000 may include an inverter circuit INV and a digital circuit 1020D, e.g., as shown in FIG. 4. The inverter circuit INV negates the communication signal as described above. The digital circuit 1020D may be configured to receive the output signal $y_0(t)$ and the output signal $y_1(t)$, and generate a digital output signal $D_{OUT}$. The digital circuit may be triggered by a measurement clock signal. The active edge (e.g., the rising edge) of the measurement clock may be tuned so that the digital circuit 1020D samples the output signals $y_0(t)$ and $y_1(t)$ at time $t_S$ within the leading edge of the symbol $\hat{x}_j(t)$. The sampling time $t_S$ may be at or near time $t_p$ as described above. The digital output signal $D_{OUT}$ represents the estimated bit stream $\{\hat{b}_k\}$. In other words, each bit of the digital output signal $D_{OUT}$ represents an estimate of a corresponding one of the bits of the transmitted bit sequence $\{b_k\}$.

Figure 5:
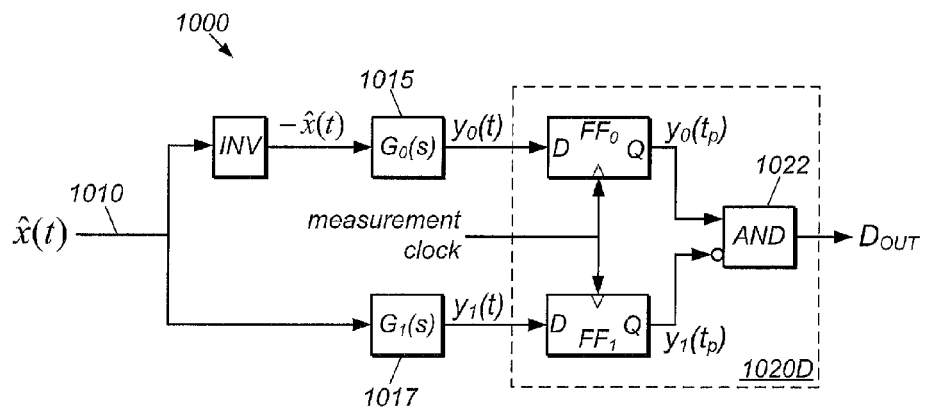
FIG. 5 illustrates one embodiment of the digital circuit 1020D of FIG. 4, where the digital circuit include two flip flops and an AND gate.

In one embodiment, the digital circuit 1020D may be configured as shown in FIG. 5. The digital circuit 1020D may include two edge-triggered D flip flops $FF_0$ and $FF_1$, and an AND gate 1022. The flip flop $FF_0$ may be configured to receive the output signal $y_0(t)$. The flip flop $FF_1$ may be configured to receive the output signal $y_1(t)$. Both flip flops may be triggered by the above-described measurement clock. The output of the flip flop $FF_0$, i.e., the value $y_0(t_p)$, may be supplied to a first input of the AND gate. The output of the flip flop $FF_1$, i.e., the value $y_1(t_p)$, may be inverted. (Here the sampling time $t_S$ is assumed to be equal to the peak time $t_p$.) The inverted output is supplied to a second input of the AND gate. The inversion is indicated by the small circle at the second input of the AND gate. The above-described digital output signal $D_{OUT}$ may be the output of the AND gate.

In some embodiments, the digital circuit 1020D includes a lookup table. One or both of the output signals $y_0(t)$ and $y_1(t)$ may be sampled at time $t_S$, where $t_S$ is at or near time $t_p$ as described above, and the sampled value(s) may be used to access the lookup table for the bit value corresponding to the current symbol. The time $t_p$ may be selected so that $\alpha_{min}t_p$ is greater than or equal to three, where $\alpha_{min}$ is the minimum of $\alpha_0$ and $\alpha_1$.

In some embodiments, the transmitter is configured to generate the communication signal so that for each symbol $$D_j \exp\{\alpha_j t_p\} = C,$$

where C is a non-zero constant that is the same for all symbols of the sequence of symbols, where $t_p$ is a value of the intrasymbol time t that is the same for all symbols of the sequence of symbols. (See, e.g., FIG. 1C and observe that each symbol reaches 1.0 volts at the end of its leading edge, i.e., at intrasymbol time $t_p$.) Thus, when the current bit to be transmitted is zero, the transmitter transmits the symbol $\hat{x}_0(t) = D_0 \exp\{\alpha_0 t\}$ with $D_0 = C \exp\{-\alpha_0 t_p\}$. However, when the current bit is one, the transmitter transmits the symbol $\hat{x}_1(t) = D_1 \exp\{\alpha_1 t\}$ with $D_1 = C \exp\{-\alpha_1 t_p\}$. The values $D_0$ and $D_1$ may be programmable by an external agent such as a host computer system. For example, the transmitter may include a pair of programmable registers and a respective pair of digital-to-analog converters (DACs) to convert the digital values stored in the registers into corresponding analog voltages that represent $D_0$ and $D_1$ respectively.

In some embodiments, the transmitter is configured to generate the communication signal so that for each symbol $\hat{x}_j(t)$.

$$D_j \exp\{\alpha_j t_p\} = C,$$

where C is a value selected from a finite set of non-zero values $\{C_0, C_1\}$, where each successive pair of bits from the stream $\{b_k\}$ of information bits determines the selection of C and the selection of $\alpha_j$ for a corresponding one of the symbols. The value $t_p$ is a value of the intrasymbol time t that is the same for all symbols of the sequence of symbols. FIG. 5B illustrates the case where $C_0 = 1$ and $C_1 = -1$. The eight symbols correspond respectively to the following 2-bit groups: 00, 11, 01, 10, 00, 01, 10, 01. In each 2-bit group $b_0 b_1$, the first bit $b_0$ controls the selection between $C_0$ and $C_1$, while the second bit $b_1$ control the selection between $\alpha_0$ and $\alpha_1$.

In some embodiments, the transmitter is configured to generate the communication signal so that for each symbol $\hat{x}_j(t)$, $$D_j \exp\{\alpha_j t_p\} = C,$$

where C is a value selected from a finite set of non-zero values $\{C_0, C_1, \ldots, C_M\}$, where $M = 2^m$, where m is greater than or equal to one, where each successive group of m+1 bits from the stream $\{b_k\}$ of information bits determines the selection of C and the selection of $\alpha_j$ for a corresponding one of the symbols, where $t_p$ is a value of the intrasymbol time t that is the same for all symbols of the sequence of symbols.

As described above in connection with FIGS. 1A and 1D, the receiver 1000 receives an input signal $\hat{x}(t)$ from the communication medium 950, i.e., an input signal that has been transmitted onto the communication medium by the transmitter 900. Assuming that noise $\Delta\alpha$ is negligible, the leading edge of each symbol of the input signal may be modeled by the expression $x_j(t) = D_j \exp\{\alpha_j t\}$, where $\alpha_j$ is a value that has been selected (by the transmitter) from the set $\{\alpha_0, \alpha_1\}$ based on a current information bit. In some embodiments, it is assumed that $\alpha_0 t_p = 5$ and $\alpha_0 t_p = 6$, where $t_p$ corresponds to the end of the exponential leading edge of the symbol. The scalar value $D_j$ may be used to normalize the symbol so that its amplitude is equal to a desired constant value at time $t = t_p$, e.g., so that $$x_j(t_p) = D_j \exp\{\alpha_j t_p\} = 1.$$

The transmitter may implement this normalization. In one embodiment, the communication system may have a training phase where the receiver provides feedback to the transmitter regarding the amplitude of each symbol at the end of each symbol period. The transmitter may use the feedback to adjust the amplitudes $D_j$ until the above-stated condition is achieved at the input port 1010 of the receiver.

In some embodiments, the communication system 800 may be configured to communicate digital information representing an analog signal m(t), as shown in FIG. 5C. At the transmitter side, an analog-to-digital converter 850 converts an analog signal m(t) into a sequence $\{a_k\}$ of bits. An error correction encoder (ECE) 875 encodes the bit sequence $\{a_k\}$ according to any known error correction code to obtain a bit sequence $\{b_k\}$. (For every m bits into the encoder, the encoder produces more than m bits as output. Thus, the information bits $a_k$ are protected against bit errors that may occur during the communication process, e.g., as a result of noise in the communication channel.) The transmitter 900 generates the communication signal $\hat{x}(t)$ based on the bit sequence $\{b_k\}$ and transmits the communication signal as variously described above. The receiver 1000 recovers the estimated bit sequence $\{\hat{b}_k\}$ from the received communication signal $\hat{x}(t)$ as variously described above. The error correction decoder (ECD) 1001 performs error correction decoding on the estimated bit sequence $\{\hat{b}_k\}$ in order to obtain an estimated bit sequence $\{\hat{a}_k\}$. The estimated bit sequence $\{\hat{a}_k\}$ is an estimate (e.g., a high-quality estimate) of the bit sequence $\{a_k\}$. The digital-to-analog converter (DAC) 1002 converts the estimated bit sequence $\{\hat{a}_k\}$ into an analog signal $\hat{m}(t)$ which is an estimate of the original analog signal m(t). Thus, the communication system 800 may effectively replicate the analog signal m(t) at a remote site.

In some embodiments, the receiver 1000 may be configured as illustrated in FIG. 6. The receiver may include two filters $G_0$ and $G_1$ with respective transfer functions $G_0(s)$ and $G_1(s)$. The output of the filter $G_0$ in response to the symbol $x_j(t)$ is denoted $y_{0j}(t)$. The output of the filter $G_1$ in response to the symbol $x_j(t)$ is denoted $y_{1j}(t)$.

Analysis of the Response of Filter $G_0$

The transfer function $G_0(s)$ of the filter $G_0$ may be modeled by the expression $$G_0(s) = K_0 H_0(s),$$

where $K_0$ is a non-zero constant, where $H_0(s)$ has the form of a first order all-pass filter, i.e., $$H_0(s) = \frac{\alpha_0 - s}{\alpha_0 + s}.$$

As shown in FIG. 7, the transfer function $H_0(s)$ has a zero at $\alpha_0$ and a pole at $-\alpha_0$.

It will be convenient to re-express $H_0(s)$ as follows:

$$H_0(s) = \frac{\alpha_0 - s}{\alpha_0 + s} = \frac{2\alpha_0 - (s + \alpha_0)}{s + \alpha_0} = \frac{2\alpha_0}{s + \alpha_0} - 1.$$

Thus, $$L^{-1}\{H_0(s)\} = L^{-1}\left\{\frac{2\alpha_0}{s + \alpha_0} - 1\right\} = 2\alpha_0 \exp(-\alpha_0 t) - \delta(t),$$

where L denotes the Laplace transform operator, and $L^{-1}$ denotes the inverse Laplace transform operator.

The response $y_{0j}(t)$ of the filter $G_0$ to the leading edge of the symbol $x_j(t)$ is given by:

$$y_{0j}(t) = K_0 \int_0^t [2\alpha_0 e^{-\alpha_0(t-\tau)} - \delta(t-\tau)]D_j \exp(\alpha_j \tau)\, d\tau$$

$$y_{0j}(t) = K_0 2\alpha_0 e^{-\alpha_0 t} D_j \int_0^t e^{(\alpha_0+\alpha_j)\tau}\, d\tau - K_0 D_j e^{\alpha_j t}$$

$$y_{0j}(t) = \frac{K_0 2\alpha_0 D_j e^{-\alpha_0 t}}{\alpha_0 + \alpha_j}\left[e^{(\alpha_0+\alpha_j)\tau}\right]_{\tau=0}^{\tau=t} - K_0 D_j e^{\alpha_j t}$$

$$y_{0j}(t) = \frac{K_0 2\alpha_0 D_j e^{-\alpha_0 t}}{\alpha_0 + \alpha_j}\left[e^{(\alpha_0+\alpha_j)t} - 1\right] - K_0 D_j e^{\alpha_j t}$$

$$y_{0j}(t) = \frac{K_0 2\alpha_0 D_j}{\alpha_0 + \alpha_j}\left[e^{\alpha_j t} - e^{-\alpha_0 t}\right] - K_0 D_j e^{\alpha_j t}.$$

The values $\alpha_0$ and $t_p$ may be selected so that $\alpha_0 t_p = 5$. Thus, $$\exp(-\alpha_0 t_p) = \exp(-5) = 0.0067 \approx 0.$$

Furthermore, when $y_{0j}(t)$ is evaluated at $t=t_p$, one obtains:

$$y_{0j}(t_p) = \frac{K_0 2\alpha_0 D_j}{\alpha_0 + \alpha_j}\left[e^{\alpha_j t_p} - 0\right] - K_0 D_j e^{\alpha_j t_p}$$

$$y_{0j}(t_p) = K_0 D_j \left[\frac{2\alpha_0}{\alpha_0 + \alpha_j} - 1\right]\exp(\alpha_j t_p)$$

$$y_{0j}(t_p) = K_0 D_j \left[\frac{\alpha_0 - \alpha_j}{\alpha_0 + \alpha_j}\right]\exp(\alpha_j t_p).$$

Since $D_j \exp\{\alpha_j t_p\} \approx 1$ by assumption, it follows that $$y_{0j}(t_p) = K_0 \frac{\alpha_0 - \alpha_j}{\alpha_0 + \alpha_j}.$$

Because $\alpha_0 t_p = 5$ by assumption, $$y_{0j}(t_p) = K_0 \frac{(\alpha_0 - \alpha_j)t_p}{(\alpha_0 + \alpha_j)t_p} = K_0 \frac{5 - \alpha_j t_p}{5 + \alpha_j t_p}.$$

Now consider the two cases $j=0$ and $j=1$. When $j=0$, $$y_{0j}(t_p) = y_{00}(t_p) = K_0 \frac{(\alpha_0 - \alpha_0)t_p}{(\alpha_0 + \alpha_0)t_p} = 0.$$

Conversely, when $j=1$, $$y_{0j}(t_p) = y_{01}(t_p) = K_0 \frac{(\alpha_0 - \alpha_1)t_p}{(\alpha_0 + \alpha_1)t_p}$$

$$= K_0 \frac{(5-6)}{(5+6)} = K_0\left(\frac{-1}{11}\right).$$

If $K_0$ is set equal to 11, then $y_{01}(t_p) = -1$, and $$G_0(s) = K_0 H_0(s) = 11\frac{\alpha_0 - s}{\alpha_0 + s}.$$

In summary, the responses $y_{00}(t)$ and $y_{01}(t)$ at time $t_p$ of the filter $G_0$ in response to the symbols $x_0(t)$ and $x_1(t)$, respectively, are:

$$y_{00}(t_p) = 0 \text{ and}$$

$$y_{01}(t_p) = -1.$$

The former expression is shown at the upper filter output of FIG. 8. The latter expression is shown at the upper filter output of FIG. 9.

Analysis of the Response of Filter $G_1$

The response $y_{1j}(t)$ of the filter $G_1$ to the symbol $x_j(t)$, $j=0,1$, may be similarly derived. The transfer function $G_1(s)$ of the filter $G_1$ may be modeled by the expression $$G_1(s) = K_1 H_1(s),$$

where $K_1$ is a non-zero constant, where $H_1(s)$ has the form of a first order all-pass filter, i.e., $$H_1(s) = \frac{\alpha_1 - s}{\alpha_1 + s}.$$

The transfer function $H_1(s)$ has a zero at $\alpha_1$ and a pole at $-\alpha_1$. Note that $$\frac{\alpha_1 - s}{\alpha_1 + s} = \frac{2\alpha_1}{s + \alpha_1} - 1.$$

Applying the inverse Laplace transform, one obtains $$L^{-1}\{H_1(s)\} = L^{-1}\left\{\frac{2\alpha}{s+\alpha_1} - 1\right\} = 2\alpha_1 \exp(-\alpha_1 t) - \delta(t).$$

Assuming that $\alpha_1 t_p = 6$, it follows that $$y_{1j}(t_p) = K_1 \frac{(\alpha_1 - \alpha_j)t_p}{(\alpha_1 + \alpha_j)t_p} = K_1 \frac{6 - \alpha_j t_p}{6 + \alpha_j t_p}.$$

When $j=0$, $y_{1j}(t)$ specializes to $$y_{10}(t_p) = K_1 \frac{(6-5)}{(6+5)} = K_1 \frac{1}{11}.$$

If $K_1$ is set equal to 11, then $$y_{10}(t_p) = 1$$

When $j=1$, $y_{1j}(t)$ specializes to $$y_{11}(t_p) = K_1 \frac{(\alpha_1 - \alpha_1)t_p}{(\alpha_1 + \alpha_1)t_p} = 0.$$

In summary, the outputs $y_{10}(t)$ and $y_{11}(t)$ at time $t_p$ of the filter $G_1$ in response to the symbols $x_0(t)$ and $x_1(t)$, respectively, are:

$$y_{10}(t_p)=1 \text{ and}$$

$$y_{11}(t_p)=0.$$

The former expression is shown at the lower filter output of FIG. 8. The latter expression is shown at the lower filter output of FIG. 9.

In FIG. 10, a table is presented showing the outputs of the filters $G_0$ and $G_1$ at intrasymbol time $t=t_p$ for eight successive symbols of the communication signal. The transmitter generates the symbols based on corresponding bits in a bit stream. If the current bit of the bit stream is 0, the transmitter generates the symbol $x_0(t)$ whose leading edge is given by $x_0(t)=D_0\exp\{\alpha_0 t\}$ as described above. If the current bit of the bit stream is 1, the transmitter generates the symbol $x_1(t)$ whose leading edge is given by $x_1(t)=D_1\exp\{\alpha_1 t\}$ as described above. The stream of bits is shown in the first column of the table. The corresponding values of the exponential coefficient $\alpha_j$ are shown in the second column. The third column shows the corresponding outputs of the filter $G_0$ at time $t_p$. The fourth column shows the corresponding outputs of the filter $G_1$ at time $t_p$. The fifth column shows the sum of the two filter outputs at time $t_p$.

In the third column, note that the outputs of the filter $G_0$ at time $t_p$ (over the successive symbols) exhibit a one-to-one correspondence with the bit values of the bit stream, i.e., the bit 0 maps to 0 volts, and the bit 1 maps to −1 volts. Thus, the output of the filter $G_0$ may be processed to recover the bit stream, e.g., by supplying that output to a digital circuit such as a flip flop (e.g., an edge-triggered D flip flop). The flip flop may be clocked by the measurement clock as described above in connection with FIG. 2. The active edge (e.g., the rising edge) of the measurement clock may be tuned so that the flip flop captures a sample of the $G_0$ filter output at or near time $t_p$ (e.g., slightly before time $t_p$) in each symbol period.

Similarly, as shown in the fourth column, the outputs of the filter $G_1$ at time $t_p$ (over successive symbols) exhibit a one-to-one correspondence with the bit values of the bit stream, i.e., the bit 0 maps to 1 volt, and the bit 1 maps to 0 volts. Thus, the output of the filter $G_1$ may be processed to recover the bit stream, e.g., by supplying that output to a digital circuit such as a flip flop (e.g., an edge-triggered D flip flop) that is clocked by the measurement clock as described above.

In some embodiments, the output signal of the filter $G_0$ and the output signal of the filter $G_1$ may be summed to obtain a sum signal. As shown in the fifth column of the FIG. 10, the values of the sum signal at time $t_p$ (over successive symbols) exhibit a one-to-one correspondence with the bit values of the bit stream, i.e., the bit 0 maps to sum=1 volt, and the bit 1 maps to sum=−1 volts. Thus, the sum signal may be processed to recover the bit stream, e.g., by supplying the sum signal to a digital circuit such as a flip flop (e.g., an edge-triggered D flip flop). The flip flop may be clocked by the measurement clock as described above in connection with FIG. 2. The active edge (e.g., rising edge) of the measurement clock may be tuned so that the digital circuit samples the sum signal at or near time $t_p$ (e.g., slightly before time $t_p$) within the symbol period.

Figures 11A, 11B:
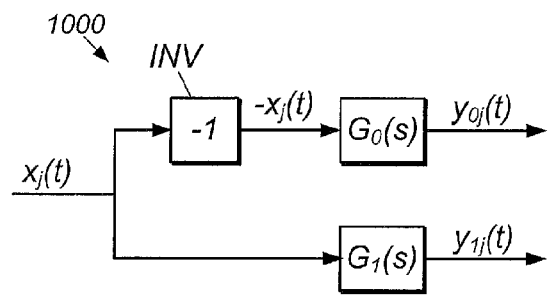
FIG. 11A illustrates an embodiment of the receiver system 1000 where an inverter is used to invert the input to the filter $G_0$.
FIG. 11B is a table corresponding to the system of FIG. 11, and showing the output of the filters $G_0$ and $G_1$ at time $t=t_p$ for each symbol in an example sequence of eight symbols.

In some embodiments, the receiver also includes an inverter INV (i.e., an analog inverter circuit) as shown FIG. 11A. The inverter operates to negate the amplitude of the current symbol $x_j(t)$. So the filter $G_0$ receives the negative of the current symbol. Thus, the output value $y_{01}(t_p)$ of the filter $G_0$ at time $t_p$ in response to the negated symbol $-x_1(t)$ is equal to 1 instead of −1. The output value $y_{00}(t_p)$ of the filter $G_0$ at time $t_p$ in response to the negated symbol $-x_0(t)$ is zero, as it was without the inverter. (The negative of zero is zero.) FIG. 11B presents a table showing the output of the filter $G_0$ (third column) at time $t_p$ and the output of the filter $G_1$ (fourth column) at time $t_p$ for each symbol in the same example sequence of symbols as discussed above. Observe that the output values of the filter $G_0$ at time $t_p$ (over successive symbols) match the values of the corresponding underlying bits. In other words, the third column agrees with the first column. Thus, the output of the filter $G_0$ may be interpreted as a signal representation of the original bit stream $\{b_k\}$.

Figure 12:
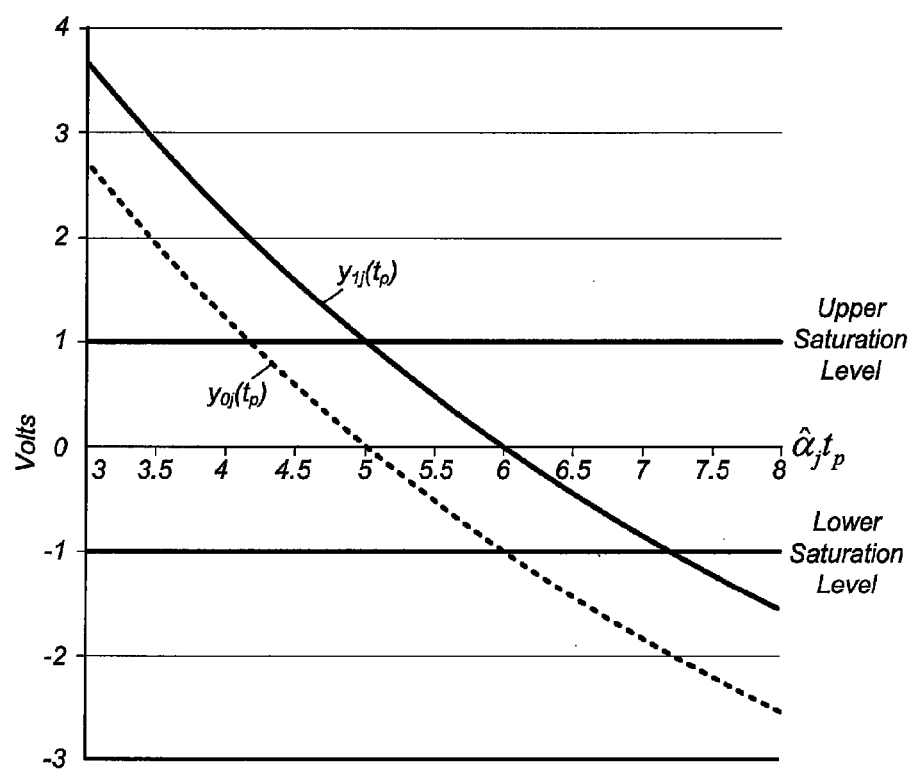
FIG. 12 shows plots of $y_{0,j}(t_p)$ and $y_{1,j}(t_p)$ as a function of $\alpha_j t_p$, where $y_{0,j}(t_p)$ and $y_{1,j}(t_p)$ are respectively the output of the filters $G_0$ and $G_1$ at time $t=t_p$ in response to a symbol whose leading edge is of the form $D_j \exp(\alpha_j t)$.

The transmitter 900 may be designed to nominally transmit a symbol $x_j(t)$ with leading edge given by $x_j(t)=D_j\exp\{\alpha_j t\}$, where $\alpha_j$ is selected from the set $\{\alpha_0, \alpha_1\}$ based on a current bit of a bit stream. However, due to imperfections such as inaccuracies in component parameters of the transmitter, the actually-realized leading edge may conform to the expression $\hat{x}_j(t)=D_j\exp\{\hat{\alpha}_j t\}$, where $\hat{\alpha}_j=\alpha_j+\Delta\alpha$, where $\Delta\alpha$ is noise. FIG. 12 shows graphs of the response $y_{0j}(t)$ of the filter $G_0$ and the response $y_{1j}(t)$ of the filter $G_1$ as a function of $\hat{\alpha}_j t_p$ over the interval [3,8]. The graphs are based on the expressions:

$$y_{0j}(t_p) = \frac{11(5-\hat{\alpha}_j t_p)}{(5+\hat{\alpha}_j t_p)}, \quad y_{1j}(t_p) = \frac{11(6-\hat{\alpha}_j t_p)}{(6+\hat{\alpha}_j t_p)}.$$

FIG. 12 also indicates saturation levels at +1 volt and −1 volt. The filters $G_0$ and $G_1$ and/or the circuitry downstream from the filters may be configured to saturate at those levels.

Figure 13:
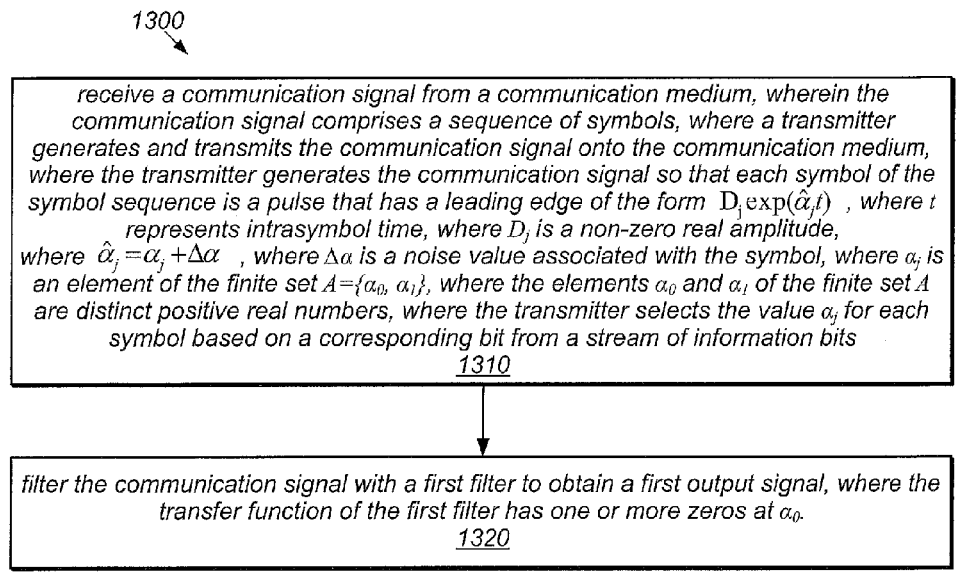
FIG. 13 illustrates one embodiment of a method for operating a receiver to facilitate recovery of information from a communication signal, where the method includes filtering the communication signal with at least one filter.

In one set of embodiments, a method 1300 for operating a receiver may include the operations shown in FIG. 13. The method may be used to facilitate the decoding of a communication signal. (Furthermore, the method may include any subset of the features, elements and embodiments described above in connection with receiver 1000.)

At 1310, the communication signal is received from a communication medium, e.g., as variously described above. The communication signal comprises a sequence of symbols. A transmitter generates the communication signal and transmits the communication signal onto the communication medium. In particular, the transmitter generates the communication signal so that each symbol of the symbol sequence is an analog pulse that has a leading edge of the form $D_j\exp\{\hat{\alpha}_j t\}$, where t represents intrasymbol time, where $D_j$ is a non-zero real amplitude, where $$\hat{\alpha}_j=\alpha_j+\Delta\alpha.$$

$\Delta\alpha$ is a noise value (e.g., systematic noise and/or random noise) associated with the symbol. The value $\alpha_j$ is an element of the finite set $A=\{\alpha_0, \alpha_1\}$, where the elements $\alpha_0$ and $\alpha_1$ of the finite set A are distinct positive real numbers. The transmitter selects the value $\alpha_j$ for each symbol based on a corresponding bit from a stream of information bits, e.g., as described above in connection with FIG. 1A.

At 1320, the communication signal may be filtered with a first filter to obtain a first output signal, where the transfer function of the first filter has one or more zeros at $\alpha_0$.

In some embodiments, the communication medium is an electrically conductive medium such as a cable, e.g., as variously described above. In other embodiments, the communication medium may be another type of medium, e.g., as variously described above.

In some embodiments, the transfer function of the first filter has a number of poles in the left half of the s plane that is greater than or equal to the number of zeros of the transfer function at $\alpha_0$.

In some embodiments, the first filter is a first order all-pass filter.

In some embodiments, the method 1300 also includes sampling the first output signal at a time $t=t_S$ within the leading edge of each symbol. The sampling time $t_S$ may be at or near (e.g., slightly before) peak time $t_p$ as described above. The sampling operation may be performed by a flip flop circuit. Thus, the digital output signal of the flip flop circuit represents an estimate of the stream of information bits.

In some embodiments, the method 1300 also includes filtering the communication signal with a second filter to obtain a second output signal. The transfer function of the second filter has one or more zeros at $\alpha_1$.

In some embodiments, the transfer function of the first filter has a number of poles in the left half of the s plane that is greater than or equal to the number of zeros at $\alpha_0$, and, the transfer function of the second filter has a number of poles in the left half of the s plane that is greater than or equal to the number of zeros at $\alpha_1$.

In some embodiments, the first filter and the second filter are first order all-pass filters.

In some embodiments, the method 1300 also includes: supplying the first output signal and the second output signal to a digital circuit; and triggering the digital circuit with a measurement clock signal, e.g., so that the digital circuit samples the first output signal and the second output signal at time $t=t_p$ within the leading edge of each symbol. The digital output signal generated by the digital circuit represents the stream of information bits.

Communication System 1350

Figure 14A:
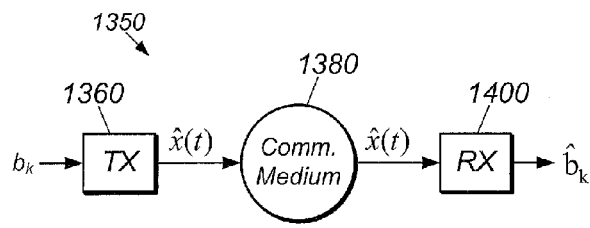
FIG. 14A illustrates one embodiment of a communication system 1350 for communicating information between a transmitter 1360 and a receiver 1400.

In one set of embodiments, a communication system 1350 may be configured as shown in FIG. 14A. The communication system includes a transmitter 1360, a communication medium 1380 and a receiver 1400.

The transmitter 1360 may be configured to receive a sequence $\{b_k\}$ of bits from an information source, generate a communication signal $\hat{x}(t)$ based on the bit sequence $\{b_k\}$, and transmit the communication signal onto the communication medium 1380. The communication medium 1380 may be any desired type of transmission medium, e.g., as variously described above in connection with communication medium 950. The communication signal may be any desired type of signal, e.g., as variously described above in connection with communication system 800.

The communication signal $\hat{x}(t)$ includes a sequence of symbols, with each symbol occupying a time interval of duration T. The duration T is referred to as the symbol period. The rate 1/T is referred to as the symbol rate. Each symbol of the symbol sequence is determined by a corresponding group of bits from the bit sequence $\{b_k\}$. The receiver 1400 receives the communication signal $\hat{x}(t)$ from the communication medium in response to the transmitter's action of transmitting the communication signal $\hat{x}(t)$ onto the communication medium. The receiver may operate on the communication signal to recover an estimate $\hat{b}_k$ of each bit $b_k$ of the original bit sequence $\{b_k\}$. The estimated bit sequence $\{\hat{b}_k\}$ may be provided as an output of the receiver 1400.

The transmitter 1360 may be configured to generate the communication signal so that each symbol $\hat{x}_j(t)$ of the symbol sequence is an analog pulse that has a leading edge of the form $$\hat{x}_j(t) = D_j \exp\{\hat{\alpha}_j t\},$$

where t represents intrasymbol time, and where $D_j$ is a nonzero real amplitude. The exponential coefficient $\hat{\alpha}_j$ equals $\alpha_j + \Delta\alpha$, where $\Delta\alpha$ is a noise value associated with the symbol. The value $\alpha_j$ is an element of the finite set $$A = \{\alpha_0, \alpha_1, \ldots, \alpha_{N-1}\},$$

where the elements $\alpha_0, \alpha_1, \ldots, \alpha_{N-1}$ of the finite set A are distinct positive real numbers. (As described above, due to noise in the transmitter, the actually-realized coefficient $\hat{\alpha}_j$ deviate from the intended coefficient value $\alpha_j$. The noise $\Delta\alpha$ is preferably small compared to $\min\{|\alpha_{i+1} - \alpha_i|/2: i=0, 1, \ldots N-2\}$.) The value $N=2^n$, where n is greater than or equal to two. The transmitter selects the value $\alpha_j$ for each symbol based on a corresponding group $B_j$ of n bits from a stream of information bits.

In one embodiment, the transmitter 1360 may include N analog circuits, each configured to nominally generate a corresponding one of the exponential signals $$\exp(\alpha_0 t), \exp(\alpha_1 t), \ldots, \exp(\alpha_{N-1} t).$$

However, due to imperfections in the parameter values of elements (such as resistors and capacitors) of the analog circuits, the analog circuits may actually generate the exponential signals $$\exp\{\hat{\alpha}_0 t\}, \exp\{\hat{\alpha}_1 t\}, \ldots, \exp\{\hat{\alpha}_{N-1} t\}.$$

The transmitter 1360 may include a selection circuit to select one of the exponential signals per symbol period based on a current group of n bits from the bit sequence $\{b_k\}$.

Figure 14B:
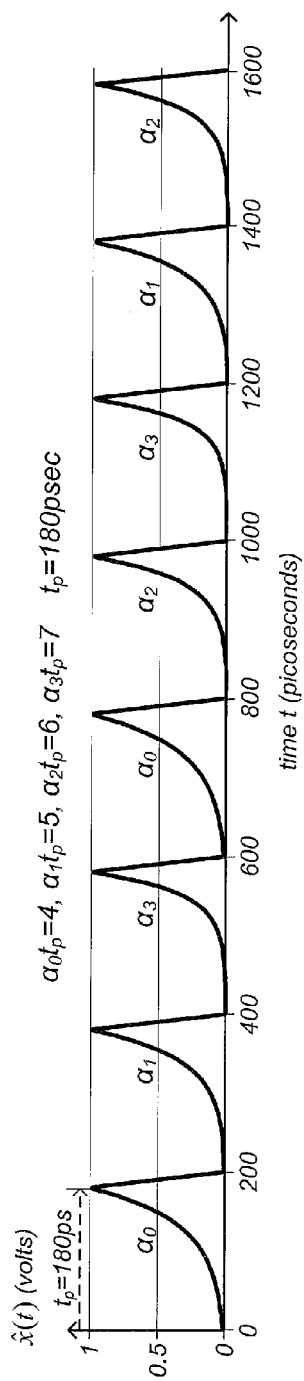
FIG. 14B illustrates one embodiment of the communication signal where the exponential coefficient of each symbol is selected from a set of four possible values, thus, encoding two bits per symbol.

FIG. 14B illustrates an example of the communication signal $\hat{x}(t)$ overr eight successive symbols for the case N=4, n=2, T=200 picoseconds, $t_p=180$ picoseconds, $\alpha_0=4$, $\alpha_1=5$, $\alpha_2=6$, $\alpha_3=7$. The eight symbols correspond respectively to the bit pairs 00, 01, 11, 00, 10, 11, 01, 10. The mapping between bit pairs and values of the shape parameter $\alpha_j$ is given by:

00 → $\alpha_0$
01 → $\alpha_1$
10 → $\alpha_2$
11 → $\alpha_3$.

Figure 14C:
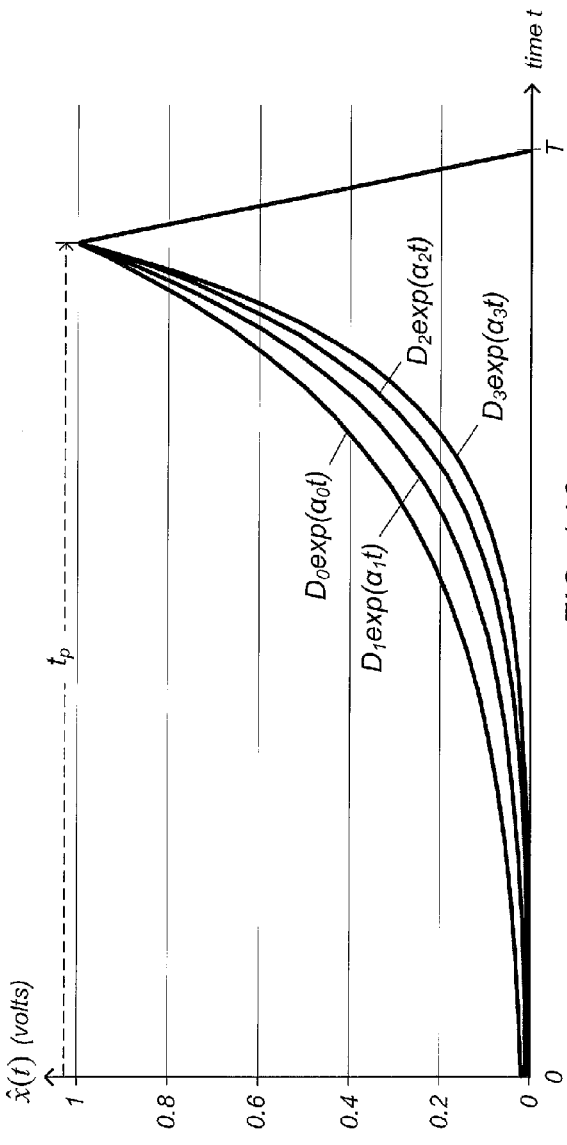
FIG. 14C illustrates the graph of four possible symbols superimposed, where each of the four symbols corresponding to a different value of the exponential coefficient α. Each of the four symbols is normalized so that its amplitude equals 1.0 volts at time $t=t_p$.

FIG. 14C shows in a superimposed fashion the leading edges of the four symbols $\hat{x}_j(t) = D_j \exp\{\alpha_j t\}$, j=0, 1, 2, 3, so that one can easily differentiate the shapes of the leading edges. Since $0 < \alpha_0 < \alpha_1 < \alpha_2 < \alpha_3$, the leading edge $\hat{x}_3(t) = D_3 \exp\{\alpha_3 t\}$ rises most steeply. The factors $D_0, D_1, D_2$ and $D_3$ have been selected so that the leading edges attain 1.0 volts at time $t=t_p$. The value 1.0 volts is not meant to be limiting. Any other fixed voltage may be used. Furthermore, the fact that the communication signal is a voltage signal in this example is not meant to be limiting. The communication signal may just as well be a current signal. These observations are generally applicable wherever 1.0 volts is indicated as the leading edge voltage at time $t_p$ and where volts are indicated as the underlying units of signal amplitude.

Figure 14D:
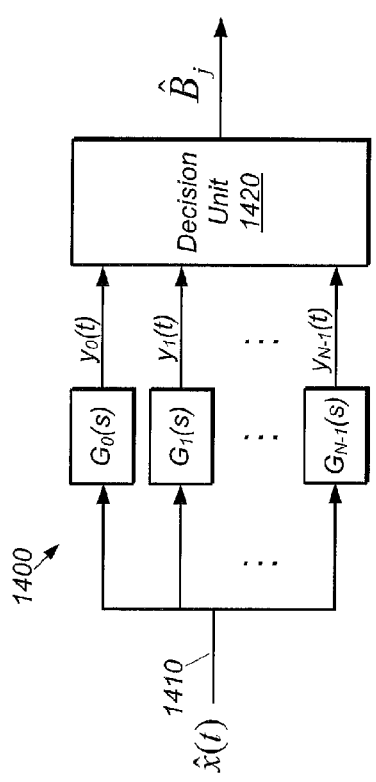
FIG. 14D illustrates one embodiment of the receiver system 1400, including N filters operating in parallel.
Figure 15:
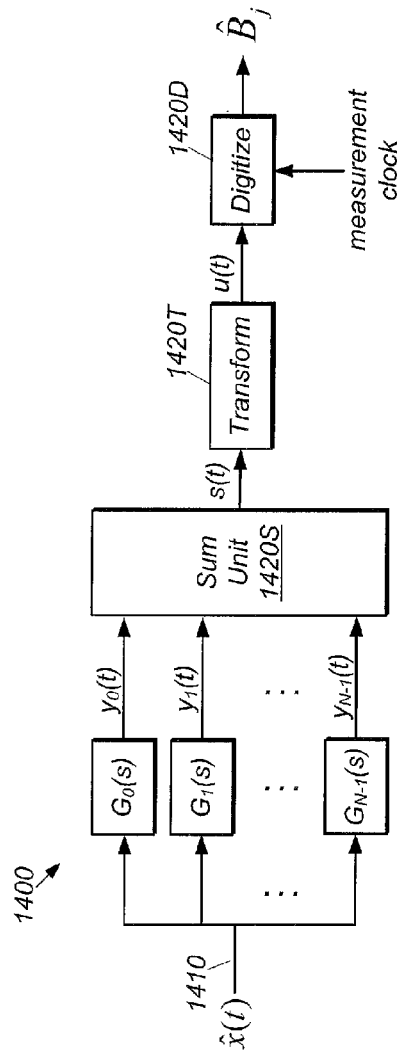
FIG. 15 illustrates one embodiment of the receiver system 1400, where the decision unit 1420 of FIG. 14A is realized using a sum unit 1420S, a transform unit 1420T and a digitizer 1420D.
Figure 16:
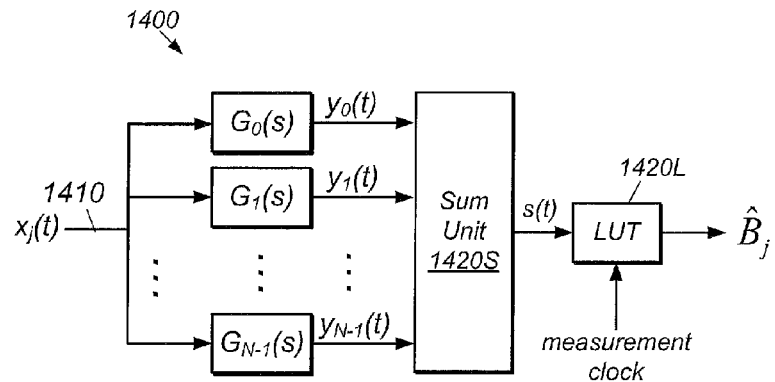
FIG. 16 illustrates one embodiment of the receiver system 1400, where the decision unit 1420 of FIG. 14A is realized using a sum unit 1420S and a lookup table 1420L.
Figure 17:
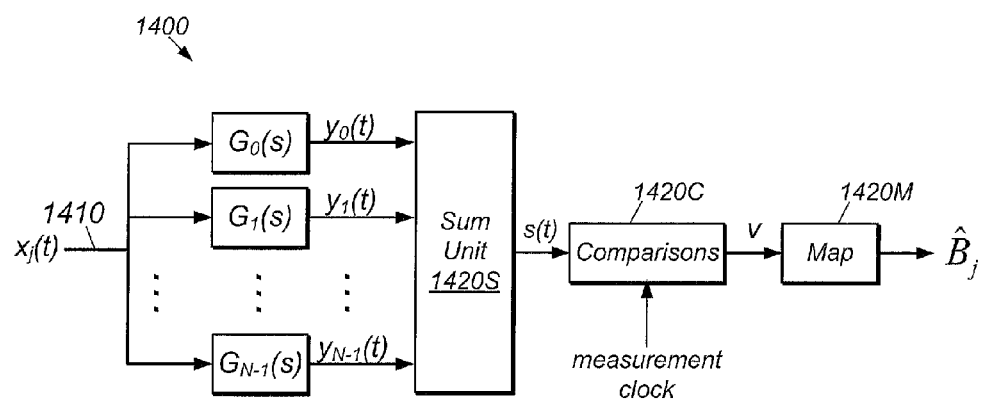
FIG. 17 illustrates one embodiment of the receiver system 1400, where the decision unit 1420 of FIG. 14A is realized using a sum unit 1420S, a comparison unit 1420C and a mapping unit 1420M.

In one set of embodiments, the receiver 1400 may be configured as shown in FIG. 14D. The receiver 1400 may include an input port 1410, a set of N filters $G_0, G_1, \ldots, G_{N-1}$, and a decision unit 1420. Furthermore, the receiver 1400 may include any subset of the features, embodiments and elements described above in connection with receiver 1000. FIGS. 15, 16 and 17, which are to be described below, show various ways of implementing the decision unit 1420.

The input port 1410 may be configured to receive the communication signal $\hat{x}(t)$ from the communication medium 1380. In input port may be configured as described above in connection with input port 1010.

The set of N filters $G_0, G_1, \ldots, G_{N-1}$ are configured to filter the communication signal $\hat{x}(t)$. Each filter $G_k$, k=0, 1, . . . , N−1, may be configured to receive the communication signal from the input port 1410 and to filter the communication signal to obtain a respective output signal $y_k(t)$. The transfer function $G_k(s)$ of filter $G_k$, k=0, 1, ..., N−1, has one or more zeros at $\alpha_k$. In some embodiments, the transfer function $G_k(s)$ has a number $n_p(k)$ of poles in the left half of the s plane that is greater than or equal to the number $n_z(k)$ of zeros at $\alpha_k$. In one embodiment, the N filters are first order all-pass filters.

For each symbol $\hat{x}_j(t)$ of the communication signal $\hat{x}(t)$, the decision unit 1420 is configured to generate an estimate $\hat{B}_j$ of the group $B_j$ of n bits for each symbol using the N output signals $y_0(t), y_1(t), \ldots, y_{N-1}(t)$.

In some embodiments, the decision unit 1420 may be configured to generate for each symbol $\hat{x}_j(t)$ the estimate $\hat{B}_j$ of the corresponding n-bit group $B_j$ by: summing the N output signals of the N respective filters to obtain a sum signal; applying a transformation (e.g., a linear transformation) to the sum signal to obtain a transformed signal; and sampling the transformed signal at a time $t_S$ within the leading edge of the symbol to obtain the estimate $\hat{B}_1$ for the corresponding group of n bits. In some embodiments, the sampling time $t_S$ may be at or near (e.g., slightly before) the peak time $t_p$ of the exponential leading edge. See FIG. 14C.

As shown in FIG. 15, a sum unit 1420S may receive the outputs $y_0(t), y_1(t), \ldots, y_{N-1}(t)$ from the respective filters $G_0, G_1, \ldots, G_{N-1}$, and generate the sum signal s(t). A transform unit 1420T receives the sum signal s(t) from the sum unit and applies a transformation to the sum signal s(t) to obtain a transformed signal u(t). (Well known operational amplifier circuitry may be used to implement the transformation unit.) The transformation may be an affine transformation of the form u(t)=m*s(t)+b, where m and b are real constants. For example, in one embodiment, the transformation has the form u(t)=(½)*(3−s(t)). However, a wide variety of other forms are contemplated for the transformation. A digitizer 1420D (i.e., analog-to-digital converter) receives the transformed signal u(t) and captures a digital sample of the transformed signal at time $t_S$ to obtain the estimate $\hat{B}_j$ for the group of n bits corresponding to the current symbol. The digitizer may capture the sample in response to an active edge (e.g., a rising edge, or alternatively, a falling edge) of the measurement clock as described above. The digitizer 1020D may be an n-bit analog-to-digital converter (ADC). In some embodiments, the transform unit 1420T may be omitted, and thus, the digitizer 1420D may operate on the sum signal s(t) directly.

In some embodiments, the peak time $t_p$ is selected so that $\alpha_{min} t_p$ is greater than or equal to three, where $\alpha_{min}$ is the minimum element of the set $$A\{\alpha_0, \alpha_1, \ldots, \alpha_{N-1}\}.$$

In one embodiment, the elements of the set are ordered so that $$0 < \alpha_0 < \alpha_1 < \ldots < \alpha_{N-1}.$$

In this case, $\alpha_{min} = \alpha_0$.

In some embodiments, the time $t_p$ is within the last 5% or the last 10% or the last 20% or the last 30% of the symbol period T. However, in other embodiments, other ranges are possible, e.g., as described above in connection with communication system 800.

In some embodiments, the decision unit 1420 may be configured to generate for each symbol $\hat{x}_j(t)$ the estimate $\hat{B}_1$ of the corresponding n-bit group $B_j$ by: summing the N output signals $y_0(t), y_1(t), \ldots, y_{N-1}(t)$ to obtain a sum signal; and accessing a lookup table based on the value of the sum signal at sampling time $t_S$ within the leading edge of the symbol to obtain the estimate $\hat{B}_j$. The sampling time $t_S$ may be at or near (e.g., slightly before) the peak time $t_p$. As shown in FIG. 16, a lookup table 1420L may be configured to receive the sum signal s(t). The value $s(t_p)$ of the sum signal s(t) at time $t_p$ may be used to select a particular row from the lookup table. That row stores the n bits of the group $\hat{B}_j$. The measurement clock may be used to control the sampling time.

In some embodiments, the decision unit 1420 may be configured to generate for each symbol the estimate $\hat{B}_j$ of the corresponding n-bit group $B_j$ by: summing the N output signals to obtain a sum signal; comparing the sum signal to a set of N−1 distinct threshold values at a time $t=t_S$ within the leading edge of the symbol; and determining the estimate $\hat{B}_j$ based on results of the N−1 comparisons. The time $t_S$ may be at or near time $t_p$, e.g., as variously described above. As shown in FIG. 17, the decision unit 1420 may include a comparison unit 1420C and a mapping unit 1420M. The comparison unit 1420C may receive the sum signal s(t) from the sum unit 1420S and compare the sum value $s(t_p)$ to thresholds $T_1, T_2, \ldots, T_{N-1}$, where $$T_1 < T_2 < \ldots < T_{N-1}.$$

Thus, the comparison unit 1420C may include a bank of a N−1 comparator circuits, each of which compares the sum value $s(t_p)$ to a corresponding one of the thresholds $T_k$. Each comparator circuit saturates at one of two levels depending on the result of its comparison. Thus, the output of each comparator circuit is essentially a binary value. The mapping unit 1420M generates the estimate $\hat{B}_j$ based on the vector v of N−1 binary values generated respectively by the N−1 comparator circuits.

In some embodiments, the transmitter 1360 may be configured to generate the communication signal $\hat{x}(t)$ so that for each symbol $\hat{x}_j(t)$, $$D_j \exp\{\alpha_j t_p\} = C,$$

where C is a non-zero constant that is the same for all symbols of the sequence of symbols, and $t_p$ is a value of the intrasymbol time t that is preferably the same for all symbols of the sequence of symbols. FIG. 14B shows an example where C=1.0 volts and $t_p$=180 picoseconds.

In some embodiments, the transmitter 1360 may be configured to generate the communication signal $\hat{x}(t)$ so that for each symbol $\hat{x}_j(t)$, $$D_j \exp\{\alpha_j t_p\} = C,$$

where C is a value selected from a finite set of non-zero values $\{C_0, C_1, \ldots, C_M\}$. The constant $M=2^m$, where m is greater than or equal to one. Each successive group of n+m bits from the stream of information bits determines the selection of C and the selection of $\alpha_j$ for a corresponding one of the symbols. An m-bit subset of the group of n+m bits is used to select the value C. The above-described group $B_j$ of n bits that determines the selection of $\alpha_j$ is also a subset of the group the n+m bits. The value $t_p$ is a value of the intrasymbol time t that is preferably the same for all symbols of the sequence of symbols. In these embodiments, the receiver 1400 may include an amplitude discrimination circuit configured to receive the communication signal $\hat{x}(t)$ from the input port, to sample the amplitude of the communication signal at or near time $t_p$ (e.g., slightly before time $t_p$) in each symbol period, and to generate an estimate of the m-bit subset based on the sampled amplitude value. For example, the amplitude discrimination circuit may include an analog-to-digital converter.

Figure 17B:
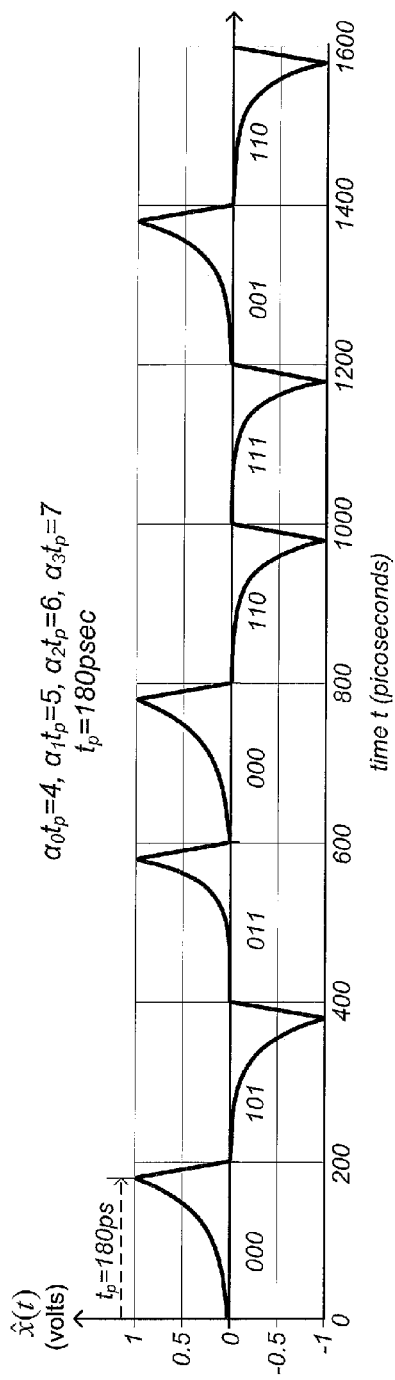
FIG. 17B illustrates one embodiment of the communication signal where two bits per symbol are used to select the exponential coefficient α from a set of four possibilities, and one bit per symbols is used to control sign.

FIG. 17B shows an example of the communication signal $\hat{x}(t)$ in the case where N=4, A={$\alpha_0, \alpha_1, \alpha_2, \alpha_3$}, M=2, $C_0$=1.0 volts, $C_1$=−1.0 volts, $t_p$=180 picoseconds, T=200 picoseconds, $\alpha_0 t_p$=4, $\alpha_1 t_p$=5, $\alpha_2 t_p$=6, $\alpha_3 t_p$=7. The eight successive symbols correspond respectively to the following bit groups:

000, 101, 011, 000, 110, 111, 001, 110. The mapping between bit groups and pairs of the form $(C_k, \alpha_j)$ is given by:

000→(+1,$\alpha_0$) 100→(−1,$\alpha_0$)
001→(+1,$\alpha_1$) 101→(−1,$\alpha_1$)
010→(+1,$\alpha_2$) 110→(−1,$\alpha_2$)
011→(+1,$\alpha_3$) 111→(−1,$\alpha_3$)

For example, the second of the eight symbols corresponds to the bit group 101, and thus, has negative sign ($C_1 = -1$) and shape parameter value $\alpha_1$.

In some embodiments, the transmitter 1360 may be configured to generate the communication signal $\hat{x}(t)$ so that for each symbol $\hat{x}_j(t)$, $$D_j \exp\{\alpha_j t_p\} = C,$$

where C is a value selected from the set $\{+1, -1\}$, or more generally, the set $\{+V, -V\}$, where V is a positive constant. Each successive group of n+1 bits from the stream of information bits determines the selection of C and the selection of $\alpha_j$ for a corresponding one of the symbols. One of the bits of the group determines the selection of C (i.e., the selection of sign—plus or minus) of the symbol, and the remaining n bits determine the selection of $\alpha_j$ from the set $A = \{\alpha_0, \alpha_1, \ldots, \alpha_{N-1}\}$. (The above-described group $B_j$ of n bits that determine the selection of $\alpha_j$ is a subset of the group of n+1 bits.) Thus, in addition to the $\alpha$-detection mechanisms variously described herein, the receiver 1400 may include a sign detector. The sign detector may receive the communication signal $\hat{x}(t)$ from the input port 1410 and output an estimate for the sign-controlling bit for each symbol. For example, the sign detector may integrate the amplitude of a symbol over the symbol period (or some portion of the symbol period) and then compare the integrate amplitude to zero to distinguished between positive sign and negative sign.

The Four Alpha Case

Figure 18:
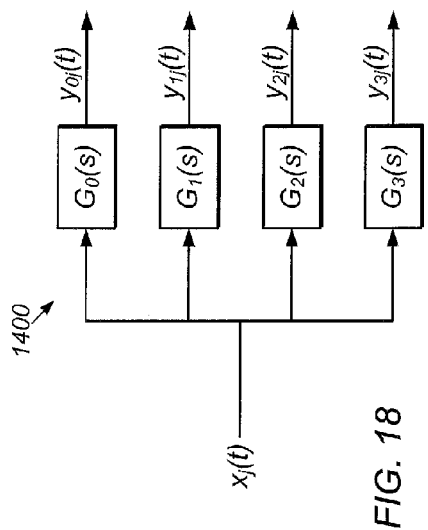
FIG. 18 illustrates the generic symbol $x_j(t)$ being supplied as input to the filters $G_0$, $G_1$, $G_2$ and $G_3$ in one embodiment of the receiver system 1400, and the filters responsively producing the outputs $y_{0j}(t)$, $y_{1j}(t)$, $y_{2j}(t)$ and $y_{3j}(t)$.

In some embodiments, the number N of filters $G_0, G_1, \ldots, G_{N-1}$ is four, as shown in FIG. 18, and the set $A = \{\alpha_0, \alpha_1, \alpha_2, \alpha_3\}$. The transfer functions of the four filters are given by $G_0(s) = K_0 H_0(s)$
$G_1(s) = K_1 H_1(s)$
$G_2(s) = K_2 H_2(s)$
$G_3(s) = K_3 H_3(s)$.

The transfer functions $H_k(s)$, k=0, 1, 2, 3, are given by $$H_k(s) = \frac{\alpha_k - s}{\alpha_k + s}.$$

For example, $$H_0(s) = \frac{\alpha_0 - s}{\alpha_0 + s}.$$

In some embodiments, the values $\alpha_0, \alpha_1, \alpha_2, \alpha_3$ and the time $t_p$ are selected so that $\alpha_0 t_p = 4$,
$\alpha_1 t_p = 5$,
$\alpha_2 t_p = 6$,
$\alpha_3 t_p = 7$.

Following the same process as described above in the two alpha case, $$L^{-1}\{H_0(s)\} = 2\alpha_0 \exp(-\alpha_0 t) - \delta(t)$$

Thus, the response $y_{0j}(t)$ of the filter $G_0$ to the symbol $x_j(t) = D_j \exp(\alpha_j t)$ is $$y_{0j}(t) = \frac{K_0 2\alpha_0 D_j}{\alpha_0 + \alpha_j}[e^{\alpha_j t} - e^{-\alpha_0 t}] - K_0 D_j e^{\alpha_j t}.$$

Since $\alpha_0 t_p = 4$, it follows that $\exp(-\alpha_0 t_p) = \exp(-4) \approx 0$. Thus, $$y_{0j}(t_p) = K_0 D_j \left[\frac{\alpha_0 - \alpha_j}{\alpha_0 + \alpha_j}\right] \exp(\alpha_j t_p).$$

Furthermore, since $D_j \exp\{\alpha_j t_p\} = 1$ and $\alpha_0 t_p = 4$, it follows that $$y_{0j}(t_p) = K_0 \frac{(\alpha_0 - \alpha_j)t_p}{(\alpha_0 + \alpha_j)t_p} = K_0 \frac{4 - \alpha_j t_p}{4 + \alpha_j t_p}.$$

In recognition that the transmitter generates the symbol $x_j(t)$ with noise on the coefficient $\alpha_j$, the above expression generalizes to:

$$y_{0j}(t_p) = K_0 \frac{(\alpha_0 - \hat{\alpha}_j)t_p}{(\alpha_0 + \hat{\alpha}_j)t_p} = K_0 \frac{4 - \hat{\alpha}_j t_p}{4 + \hat{\alpha}_j t_p},$$

where $\hat{\alpha}_j = \alpha_j + \Delta\alpha$, where $\Delta\alpha$ is a noise value associated with the symbol.

Similarly, for the other three filters $G_1$, $G_2$ and $G_3$:

$$y_{1j}(t_p) = K_1 \frac{(\alpha_1 - \hat{\alpha}_j)t_p}{(\alpha_1 + \hat{\alpha}_j)t_p} = K_1 \frac{5 - \hat{\alpha}_j t_p}{5 + \hat{\alpha}_j t_p}$$

$$y_{2j}(t_p) = K_2 \frac{(\alpha_2 - \hat{\alpha}_j)t_p}{(\alpha_2 + \hat{\alpha}_j)t_p} = K_2 \frac{6 - \hat{\alpha}_j t_p}{6 + \hat{\alpha}_j t_p}$$

$$y_{3j}(t_p) = K_3 \frac{(\alpha_3 - \hat{\alpha}_j)t_p}{(\alpha_3 + \hat{\alpha}_j)t_p} = K_3 \frac{7 - \hat{\alpha}_j t_p}{7 + \hat{\alpha}_j t_p}.$$

FIG. 19 is a table showing the values of $y_{0j}(t_p)/K_0$, $y_{1j}(t_p)/K_1$, $y_{2j}(t_p)/K_2$ and $y_{3j}(t_p)/K_3$ for $\hat{\alpha}_j t_1 = 4, 5, 6$ and 7. FIG. 20 is a table showing the values of $y_{0j}(t_p)$, $y_{1j}(t_p)$, $y_{2j}(t_p)$ and $y_{3j}(t_p)$ for $\hat{\alpha}_j t_p = 4, 5, 6$ and 7 under the assumption $K_0 = K_1 = K_2 = K_3 = 13$.

In some embodiments, the filters $G_0$, $G_1$, $G_2$ and $G_3$ are configured so that their outputs have an upper saturation level and a lower saturation level. These saturation levels may be determined by the supply voltage and the ground voltage of the filters. FIG. 21 shows the values of $y_{0j}(t_p)$, $y_{1j}(t_p)$, $y_{2j}(t_p)$ and $y_{3j}(t_p)$ with upper saturation at +1 volt and lower saturation at −1 volt, again under the assumption that $K_0 = K_1 = K_2 = K_3 = 13$. FIG. 22 replicates the contents of FIG. 21, and also shows: in the first column, the 2-bit word that corresponds to each value of the index j; in the second-to-last column, the sum $s(t_p)$ of the outputs of the four filters at time $t_p$; and in the last column, the result of applying the transformation $$s(t_p) \rightarrow (3 - s(t_p))/2$$

to the sum value $s(t_p)$. Observe that the transformed values in the last column correspond to the 2-bit binary values in the first column. In other words, the transformed value is an indicator of the value of the 2-bit word. In some embodiments, the transformed value $u(t_p)=(3-s(t_p))/2$ is sampled by a 2-bit analog-to-digital converter (ADC) to obtain a 2-bit sample for each symbol. The 2-bit sample comprises an estimate for the 2-bit word underlying the symbol.

Figure 23:
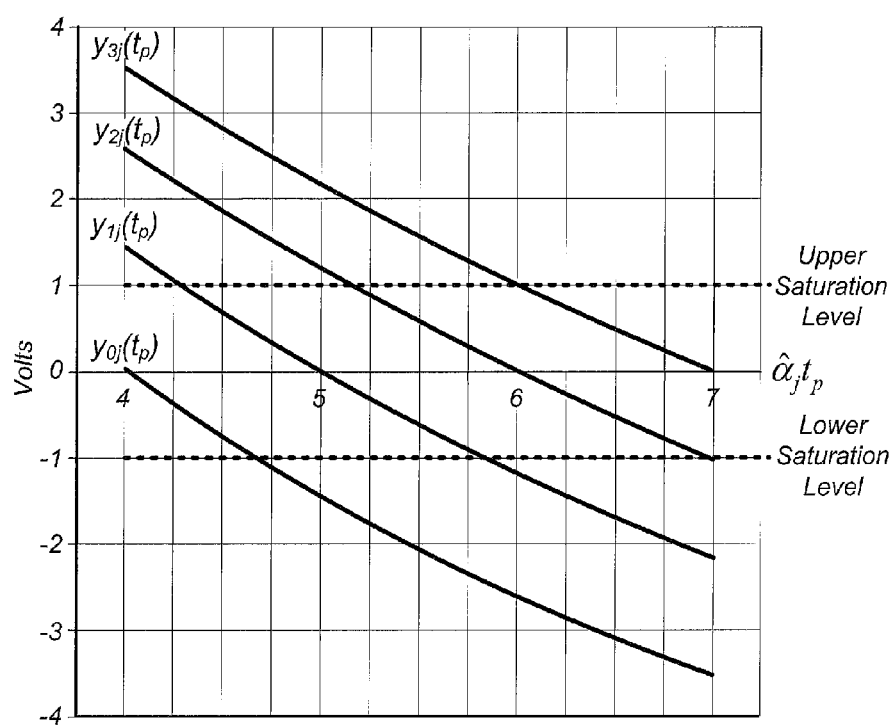
FIG. 23 shows plots of $y_{0j}(t_p)$, $y_{1j}(t_p)$, $y_{2j}(t_p)$ and $y_{3j}(t_p)$ as a function of $\hat{\alpha}_j t_p$, where $y_{0j}(t_p)$, $y_{1j}(t_p)$, $y_{2j}(t_p)$ and $y_{3j}(t_p)$ are respectively the output of the filters $G_0$, $G_1$, $G_2$ and $G_3$ at time $t=t_p$ in response to a symbol whose leading edge is of the form $D_j \exp(\hat{\alpha}_j t)$.

FIG. 23 presents graphs of $y_{0j}(t_p)$, $y_{1j}(t_p)$, $y_{2j}(t_p)$ and $y_{3j}(t_p)$ as a function of $\hat{\alpha}_1 t_p$ over the interval [4,7]. The graphs are computed based on the expressions $$y_{0j}(t_p) = 13\frac{4 - \hat{\alpha}_j t_p}{4 + \hat{\alpha}_j t_p},$$

$$y_{1j}(t_p) = 13\frac{5 - \hat{\alpha}_j t_p}{5 + \hat{\alpha}_j t_p},$$

$$y_{2j}(t_p) = 13\frac{6 - \hat{\alpha}_j t_p}{6 + \hat{\alpha}_j t_p},$$

$$y_{3j}(t_p) = 13\frac{7 - \hat{\alpha}_j t_p}{7 + \hat{\alpha}_j t_p}.$$

The saturation levels at +1 volt and −1 volt are indicated with dashed lines.

Figure 24:
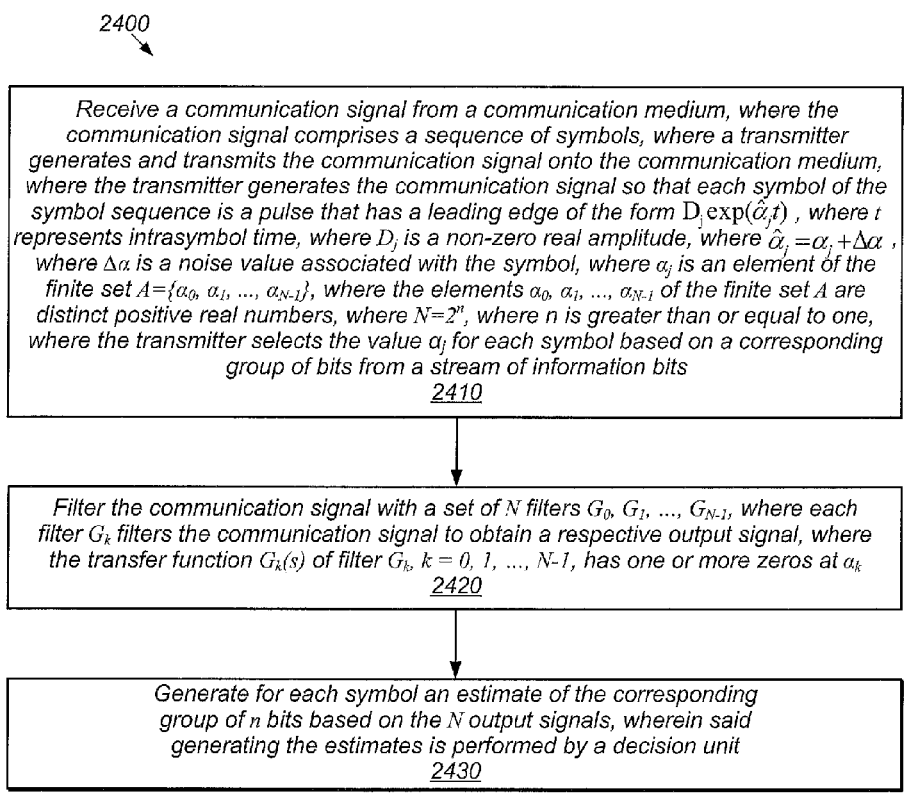
FIG. 24 illustrates one embodiment of a method for operating a receiver to facilitate recovery of information from a communication signal, where the method includes filtering the communication signal with a set of filters.

In one set of embodiments, a method 2400 for operating a receiver may include the operations shown in FIG. 24. The method 2400 may be performed in order to facilitate the decoding of a communication signal. (Furthermore, the method 2400 may include any subset of the features, elements and embodiments described above in connection with receiver 1000, method 1300 and receiver 1400.)

At 2410, the communication signal is received from a communication medium. The communication signal comprises a sequence of symbols. A transmitter generates and transmits the communication signal onto the communication medium. In particular, the transmitter generates the communication signal so that each symbol of the symbol sequence is an analog pulse that has a leading edge of the form $D_j \exp\{\hat{\alpha}_j t\}$, where t represents intrasymbol time, where $D_j$ is a non-zero real amplitude, where $$\hat{\alpha}_j = \alpha_j + \Delta\alpha$$

$\Delta\alpha$ is a noise value (e.g., a random noise value or systematic noise value) associated with the symbol. The value $\alpha_j$ is an element of the finite set $A=\{\alpha_0, \alpha_1, \ldots, \alpha_{N-1}\}$. The elements $\alpha_0, \alpha_1, \ldots, \alpha_{N-1}$ of the finite set A are distinct positive real numbers, where $N=2^n$, where n is greater than or equal to one. The transmitter selects the value $\alpha_j$ for each symbol based on a corresponding group of n bits from a stream of information bits.

At 2420, the communication signal may be filtered with a set of N filters $G_0, G_1, \ldots, G_{N-1}$, e.g., as variously described above. Each filter $G_k$ filters the communication signal to obtain a respective output signal. The transfer function $G_k(s)$ of filter $G_k$, $k=0, 1, \ldots, N-1$, has one or more zeros at $\alpha_k$.

As indicated at 2430, for each symbol, an estimate of the corresponding group of n bits may be generated based on the N output signals. This action of generating the estimates may be performed by a decision unit, e.g., as variously described above in connection with receiver 1000, method 1300 and receiver 1400.

The communication medium may be any desired transmission medium, e.g., as variously described above in connection with communication medium 950.

In some embodiments, the N filters are first order all-pass filters.

In some embodiments, the transfer function $G_k(s)$, $k=0, 1, \ldots, N-1$, has a number $n_p(k)$ of poles in the left half of the s plane that is greater than or equal to the number $n_z(k)$ of zeros at $\alpha_k$.

In some embodiments, the action of generating the estimate of the group of n bits for each symbol includes: summing the N output signals to obtain a sum signal; applying a linear transformation to the sum signal to obtain a transformed signal; and sampling the transformed signal at a time $t=t_S$ within the leading edge of the symbol in order to obtain the estimate for the corresponding group of n bits. The time $t_S$ may be at or near (e.g., slightly before) the peak time $t_p$, as variously described above.

In some embodiments, the action of generating the estimate of the group of n bits for each symbol includes: summing the N output signals to obtain a sum signal; and accessing a lookup table based on a value of the sum signal at a time $t=t_S$ within the leading edge of the symbol to obtain the estimate for the corresponding group of n bits. The time $t_S$ may be at or near (e.g., slightly before) the peak time $t_p$, as variously described above.

In some embodiments, the action of generating the estimate of the group of n bits for each symbol includes: summing the N output signals to obtain a sum signal; comparing the sum signal to a set of N−1 distinct threshold values at a time $t=t_S$ within the leading edge of the symbol; and determining the estimate for the group of n bits based on results of the N−1 comparisons. The time $t_S$ may be at or near (e.g., slightly before) the peak time $t_p$, as variously described above.

Communication Using Exponential Symbols and Zero Symbols

Figure 25A:
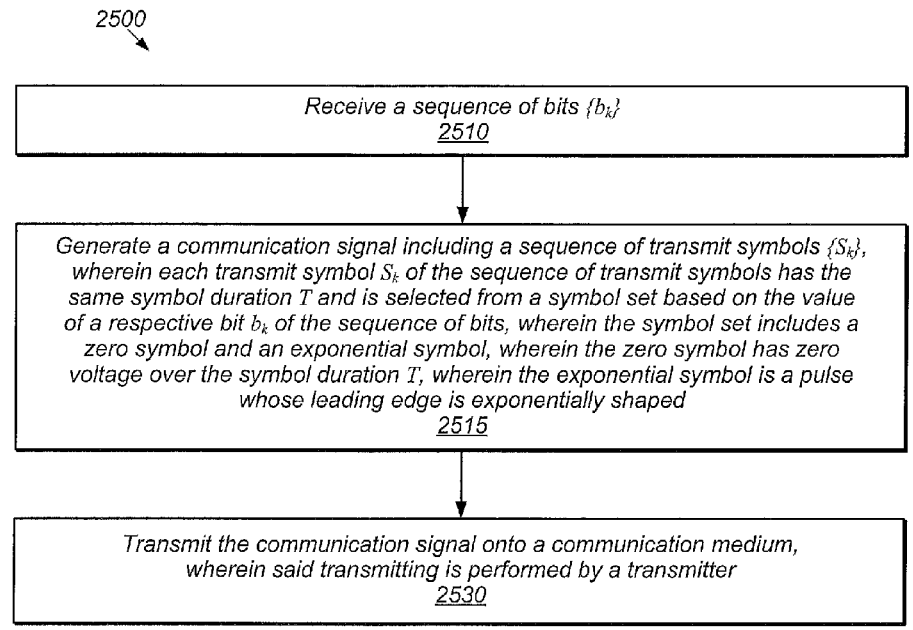
FIG. 25A illustrates one embodiment of a method for transmitting information using exponential symbols and zero symbols.

In one set of embodiments, a method 2500 for transmitting information may include the operations shown in FIG. 25A. (The method 2500 may also include any subset of the features, elements and embodiments described above.)

At 2510, a sequence of bits $\{b_k\}$ may be received, e.g., from any desired information source. The index k may be interpreted as a discrete time index or a sequence index.

At 2515, a communication signal may be generated, where the communication signal includes a sequence of transmit symbols $\{S_k\}$. Each transmit symbol $S_k$ of the sequence of transmit symbols is selected from a symbol set G based on the value of a respective bit $b_k$ from the sequence of bits. Furthermore, each symbol $S_k$ is preferably of the same symbol duration T. The symbol set includes a zero symbol and an exponential symbol. The zero symbol has zero voltage over the symbol duration T. The exponential symbol is an analog pulse whose leading edge is exponentially shaped. The leading edge may be modeled by the expression $x(t)=D^*\exp(\alpha t)$, where D is a non-zero constant and $\alpha$ is a positive constant. (In some embodiments, the same value of D and a may be used for all instances of the exponential symbol in the communication signal.) The trailing edge may have any of a wide variety of forms, e.g., linear, polynomial, half-period sinusoid, Gaussian, etc. For example, in one embodiment, the trailing edge may be a linear ramp that returns to zero voltage at the end of the symbol interval.

At 2520, the communication signal may be transmitted onto a communication medium, e.g., a communication medium as variously described above. The action of transmitting the communication medium may be performed by a transmitter conforming to any known transmitter technology.

In some embodiments, the leading edge of the exponential symbol persists for time duration $t_p$ so that the product $\alpha t_p$ is approximately equal to 2π (or approximately equal to six). This constraint may be imposed to allow the leading edge of the exponential symbol to attain a steady state condition. For example, in one embodiment, $αt_p$ is a value in the range [6.0, 6.3]. In another embodiment, $αt_p$ is a value in the range [5.5, 6.5]. In yet another embodiment, $αt_p$ is a value in the range [5.0, 7.0].

The communication medium may be any desired communication medium. The communication medium may be a lossy communication medium or a lossless communication medium. In some embodiments, the communication medium may include one or more of the following: a solid, a liquid, a gas, a plasma and a layered medium (e.g., as variously described above).

In some embodiments, the communication medium may include one or more of the following: an electrical cable (e.g., a USB cable, a twisted wire pair, a twin axial cable, etc.), the atmosphere, free space, an optical fiber, a portion of the earth's subsurface, a lake or sea or ocean, a well logging cable such as those used in the petroleum industry, a wired pipe channel as described above, a conductive trace on a circuit board or an integrated circuit. However, a wide variety of other possibilities are contemplated.

In some embodiments, the communication medium may include a serial combination of two or more of the communication media described above. If the serial combination includes different types of communication media, appropriate transducers may be used to convert the signal from one type of communication medium to another, wherever necessary.

Figure 25B:
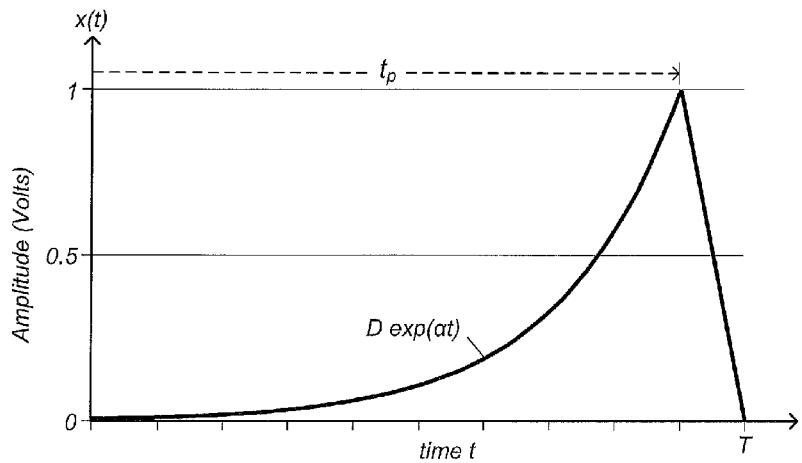
FIG. 25B illustrates one embodiment of the exponential symbol.

FIG. 25B illustrates one embodiment of the exponential symbol, where the leading edge persists from time t=0 to time $t=t_p$, where t represents intrasymbol time, where the trailing edge is a ramp that linearly returns to zero at time t=T. As described above, the leading edge has the form x(t)=D*exp (αt). In the illustrated example, D and α have been chosen so that the voltage $x(t_p)$ at the peak time $t_p$ is one. However, that feature is not an essential principle of the invention. Indeed, the exponential symbol may be configured to achieve any desired voltage at time $t_p$. In some embodiments, the value of D and/or the value of α are programmable.

Figure 26:
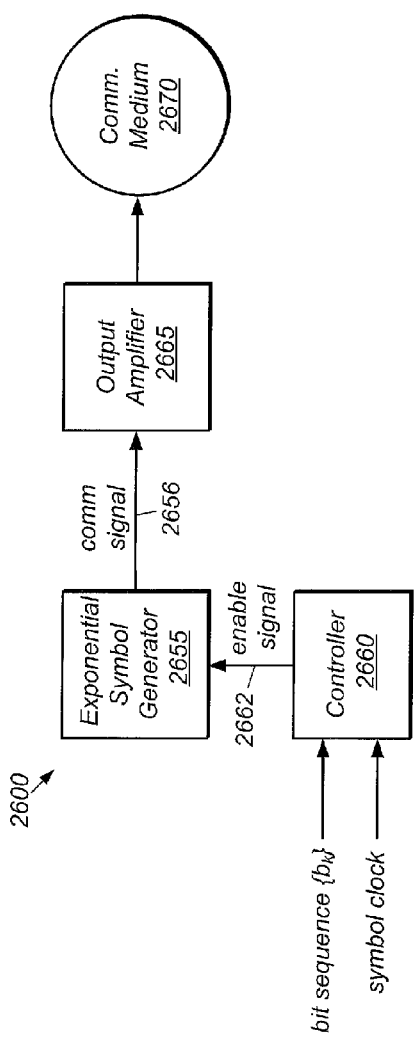
FIG. 26 illustrates one embodiment of a transmitter configured to implement the transmission method of FIG. 25A.

FIG. 26 illustrates one embodiment of a system 2600 configured to implement the transmission method 2500 described above. The system 2600 may include an exponential symbol generator 2655, a controller 2660 and an output amplifier. The exponential symbol generator 2655 may be configured to output an instance of the exponential symbol in each symbol interval where the enable signal 2662 is asserted by the controller 2660. The exponential symbol generator may remain quiescent in each symbol interval where the enable signal is not asserted. Thus, the above-described communication signal appears at the output of the exponential signal generator. See communication signal 2656 in FIG. 26.

The controller 2660 may receive the bit sequence $\{b_k\}$, and assert the enable signal in each symbol interval where the corresponding bit $b_k$ is equal to one (or in an alternative embodiment, equal to zero). Moreover, the controller may receive a symbol clock signal so that its assertions of the enable signal are synchronized with the symbol clock. The output amplifier 2665 may be configured to amplify the communication signal 2656 for transmission onto the communication medium 2670, e.g., any of the communication media described above.

The exponential signal generator 2655 may be implemented in a wide variety of ways. In some embodiments, the exponential signal generator is implemented in analog circuitry (e.g., using bipolar analog IC technology or CMOS analog IC technology). (IC is an acronym for "Integrated Circuit". CMOS is an acronym for Complementary Metal-Oxide Semiconductor.) In other embodiments, the exponential signal generator may include a memory and a digital-to-analog converter. The memory stores samples of the exponential symbol, and the digital-to-analog converter converts the samples into analog form in response to an assertion of the enable signal.

Figure 27A:
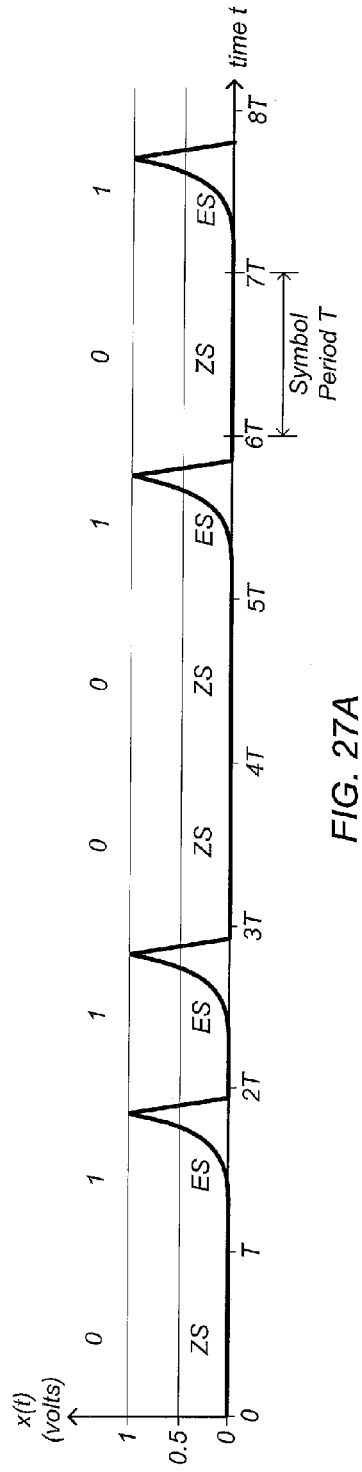
FIG. 27A illustrates an example of the communication signal generated by the transmission method of FIG. 25A.

FIG. 27A illustrates an example of the communication signal over a window in time comprising eight symbol durations. A transmitter implementing the method 2500 may generate the illustrated communication signal in response to the bit sequence {0, 1, 1, 0, 0, 1, 0, 1}. Each zero bit in the bit sequence corresponds to an instance of zero symbol (denoted ZS), and each one bit in the bit sequence corresponds to an instance of the exponential symbol (denoted ES). It should be understood that the choice of mapping the zero bit to ZS and the one bit to ES is arbitrary, and could just as well be reversed.

Figure 27B:
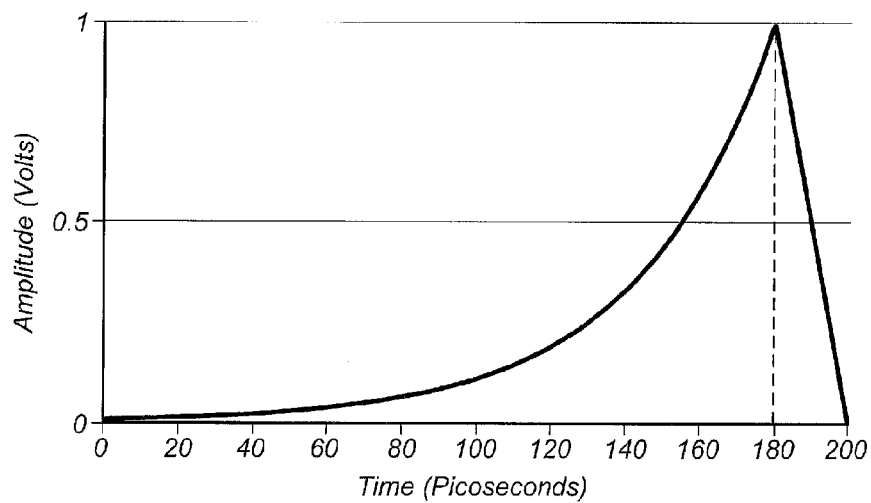
FIG. 27B illustrates an example of the exponential signal that may be useful for 5 Gb/sec communication.
Figure 27C:
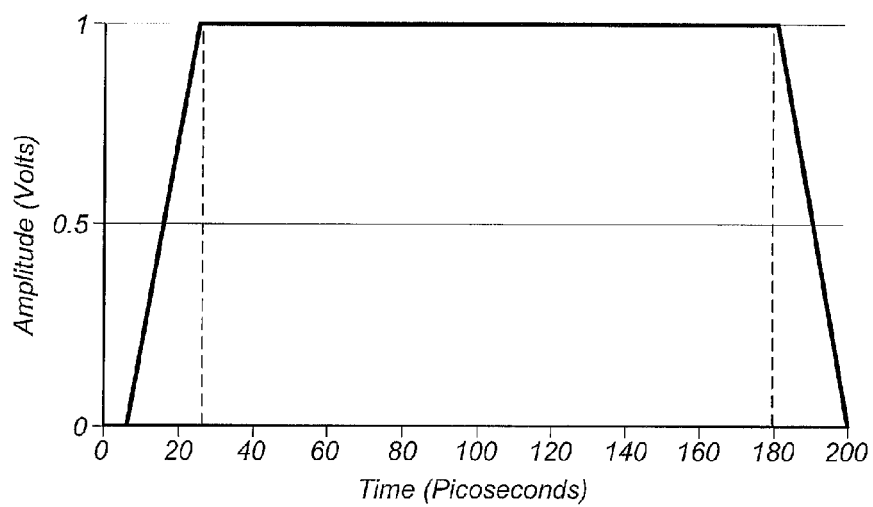
FIG. 27C shows an example of a rectangular pulse that may be used for 5 Gb/sec communication in the prior art.

In some applications, it may be desirable to communicate information at 5 Gigabits per second, in which case the above-described communication signal has a symbol period T equal to 200 picoseconds (ps). (Recall, according to the SI standard, a Gigabit is $10^9$ bits.) In one such embodiment, the exponential symbol may be configured so that its leading edge occupies the first 180 ps of the 200 ps symbol duration, as shown in FIG. 27B. Thus, the trailing edge occupies the last 20 ps of the 200 ps symbol duration. Part of the motivation for these numbers comes from the field of digital communication where information is sometimes transmitted using rectangular pulses, e.g., as illustrated in FIG. 27C. According to one rule of thumb, the first 10% of the pulse duration is allocated to the leading edge of the pulse, and the last 10% of the pulse duration is allocated to the trailing edge of the pulse. Thus, for a pulse duration of 200 ps, the leading edge and trailing edge would each occupy 20 ps. However, since the exponential symbol may immediately transition from leading edge to trailing edge with no intervening plateau, the leading edge of the exponential symbol may consume the first 90% of the symbol duration. FIG. 27D illustrates this feature by superimposing the exponential symbol (shown in solid line) and the rectangular pulse (shown in dotted line). It should be understood that the specific numbers discussed in this 5 Gbit/s example are not meant to be limiting to the scope of the inventions generally described in this patent. Even within the 5 Gbit/s example, the exponential symbol may use a wide variety of other values for the leading edge percentage and the trailing edge percentage.

In one set of embodiments, a method 2800 for receiving information may involve the operations shown in FIG. 28. (The method 2800 may also include any subset of the features, elements and embodiments described above.)

At 2810, a signal y(t) may be received from a communication medium (e.g., any of the communication media described above) in response to a transmission of a communication signal x(t) onto the communication medium by a transmitter (e.g., a transmitter as variously described above). The communication signal x(t) includes a sequence of symbols $\{S_k\}$. Each symbol $S_k$ of the sequence of symbols has been selected from a symbol set based on the value of a respective bit $b_k$ of a sequence of bits $\{b_k\}$. Furthermore, each symbol $S_k$ preferably has the same symbol duration T. The symbol set includes a zero symbol and an exponential symbol. The zero symbol has zero voltage over the symbol duration T. The exponential symbol is an analog pulse whose leading edge is exponentially shaped, e.g., as variously described above. The leading edge may be of the form D*exp ($\alpha t$), where $\alpha$ is a positive constant, where D is a non-zero constant, where t is intrasymbol time.

The action 2810 of receiving the communication signal may be performed by a receiver conforming to any known receiver technology, e.g., a receiver consistent with the type of the communication medium and the type of signal transmission being used to transmit the communication signal through the communication medium.

For each symbol $S_k$ of the sequence of symbols $\{S_k\}$, threshold detection may be applied to the received signal y(t) in order to obtain an estimate of the respective bit $b_k$, as indicated at step 2815. For example, the received signal y(t) may be compared to a threshold level $V_{TH}$ at a comparison time $t_C$ equal to or near the peak time $t_p$ of the symbol $S_k$. (The peak time $t_p$ may be the best time within the symbol duration to perform the comparison. The receiver may include a peak detection unit to determine an estimate of the peak time $t_p$.) If the value $y(t_C)$ is less than the threshold $V_{TH}$, the received symbol is declared to be a zero symbol and the corresponding value of the bit $b_k$ may be asserted as output. Conversely, if the value $y(t_C)$ is greater than or equal to the threshold $V_{TH}$, the received symbol is declared to be an exponential symbol and the corresponding value of the bit $b_k$ is asserted as output.

In some embodiments, the value of threshold level $V_{TH}$ and/or the value of comparison time $t_C$ are programmable.

In some embodiments, a high speed comparator circuit may be used to perform the threshold comparison operation.

In some embodiments, the communication medium is lossless, and thus, each exponential symbol in the received signal y(t) has the same shape as the corresponding transmitted exponential symbol. (In a lossless medium, all transmitted waveforms preserve their shape during propagation.)

In other embodiments, the communication medium is a lossy communication medium. In these embodiments, only the leading edge of each exponential symbol preserves its shape during propagation. This shape preservation is a consequence of the leading edge being of the form $D^*\exp(\alpha t)$. However, the trailing edge of each exponential symbol experiences dispersion during propagation, and at least partially spreads into a next symbol duration.

Figure 29:
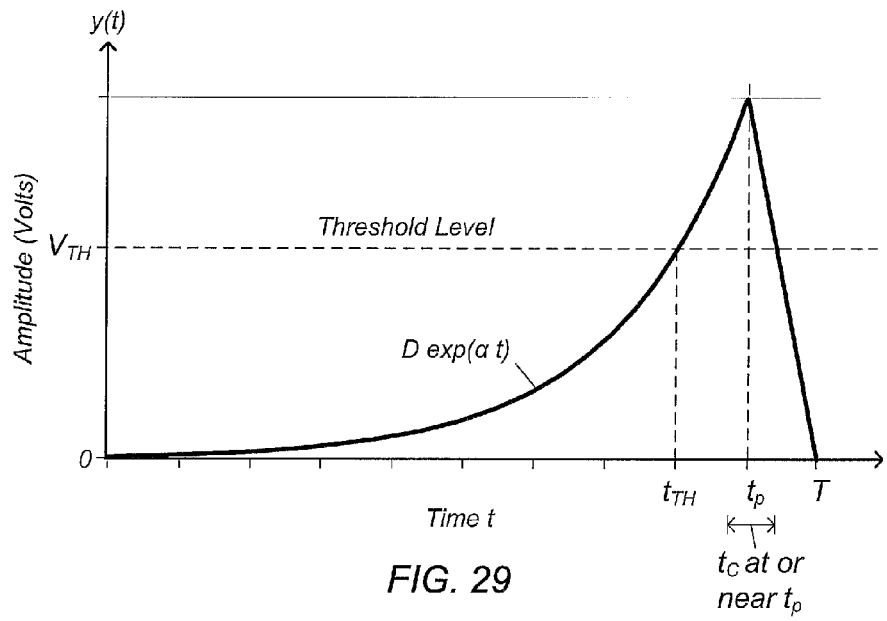
FIG. 29 illustrates one embodiment of a threshold-detection process acting on an exponential symbol.

FIG. 29 illustrates the threshold detection process acting upon an example of the exponential symbol. (FIG. 29 assumes that the communication medium is lossless, and thus, the received exponential symbol shown in FIG. 29 has the same shape as the transmitted exponential symbol shown in FIG. 25B.) The comparison time $t_C$ may be equal to or near the peak time $t_p$, and greater than the time $t_{TH}$ at which the exponential symbol is expected to achieve the threshold value $V_{TH}$. The threshold level $V_{TH}$ may be set to a value above the receiver's noise floor, to avoid false positives due to noise. The transmitter may adjust the amplitude of the communication signal so that the peak voltage $y(t_p)$ of the exponential signal at the receiver is greater than (e.g., significantly greater than) the receiver's noise floor.

Figure 30:
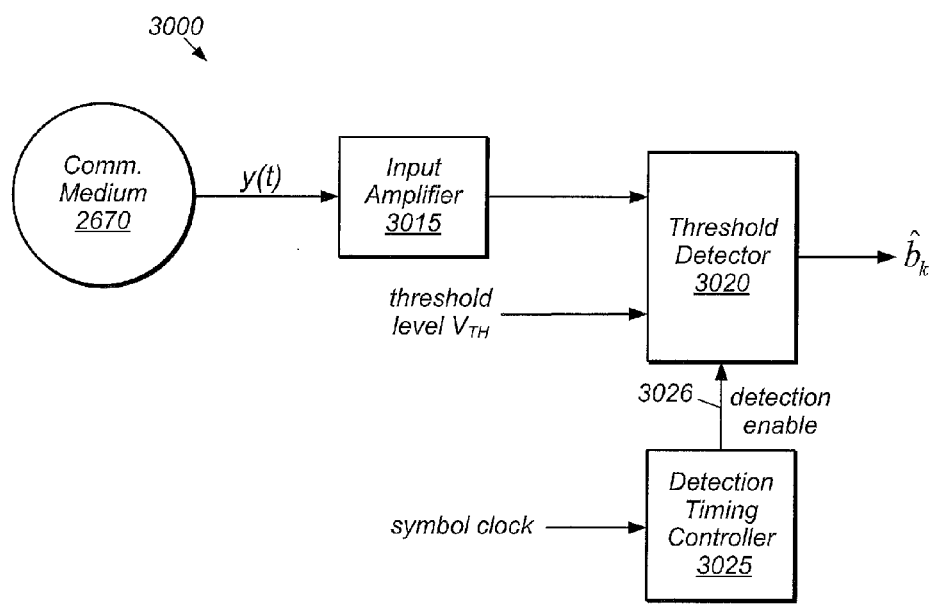
FIG. 30 illustrates one embodiment of a receiver 3000 configured to implement the reception method of FIG. 28.

FIG. 30 illustrates one embodiment of a receiver 3000 configured to implement the reception method 2800 described above. The receiver 3000 may include a threshold detector 3020 and a detection-timing controller 3025. The receiver 3000 receives the above-described signal y(t) from the communication medium 2670, and operates on the signal y(t) to recover an estimate $\hat{b}_k$ for each bit $b_k$ of the transmitted bit sequence $\{b_k\}$.

The threshold detector 3020 may be configured to apply threshold detection to each received symbol of the signal y(t), e.g., as described above. The threshold detector 3020 may be implemented using any known circuitry for performing threshold detection. (In some embodiments, the receiver 3000 may also include an input amplifier 3015 to amplify the signal y(t) prior to threshold detector 3020.) The threshold detector 3020 may apply threshold detection to each received symbol when the detection enable signal 3026 is asserted by detection timing controller 3025. The threshold detector may receive the threshold level $V_{TH}$ as an input. The threshold level $V_{TH}$ may be generated by programmable hardware, e.g., by a digital-to-analog converter, which is fed with a digital value stored in a programmable register.

The detection timing controller 3025 may assert the detection enable signal at a comparison time $t_C$ within each symbol, e.g., as described above in connection with FIG. 29. Detection timing controller 3025 may receive a symbol clock that is synchronized with the symbol timing of the communication signal x(t). (The symbol clock may be derived from the received signal y(t) using any known technique for clock recovery.) In one embodiment, the detection timing controller may apply a time delay of amount $t_C$ (or an equivalent phase delay) to the symbol clock in order to generate the detection enable signal.

In some embodiments, a transceiver may be configured to include both an instance of the transmitter 2600 and an instance of the receiver 3000. Thus, the transceiver may transmit and receive over the communication medium.

Communication with Device Deployed in a Well

In one set of embodiments, any of the above-described transceivers (or transmitters or receivers) may be deployed into a well on a carrier line that includes an electrical cable. For example, the transceiver may couple to a down-hole end of the electrical cable. The transceiver may communicate through the electrical cable with a second transceiver (or receiver or transmitter), e.g., a transceiver located at or near the earth's surface or the sea surface. The second transceiver may couple to the top end of the electrical cable, i.e., the end opposite the down-hole end. The carrier line may be provided on a spool, and the action of deploying the transceiver into the well may include unwinding the carrier line such that a segment of the carrier line is deployed into the well.

System for Distance and Radial Velocity Measurement

Figure 31:
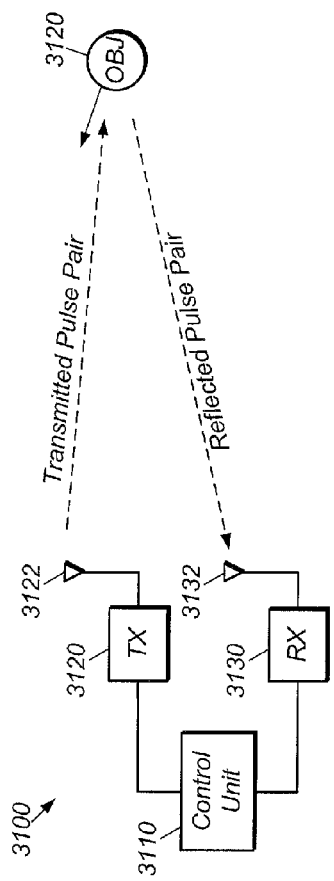
FIG. 31 illustrates one embodiment of a system 2500 configured for measuring the radial velocity of an object using transmitted pulse sequences, where the analog pulses of the pulses sequences have exponentially-shaped leading edges.
Figure 32:
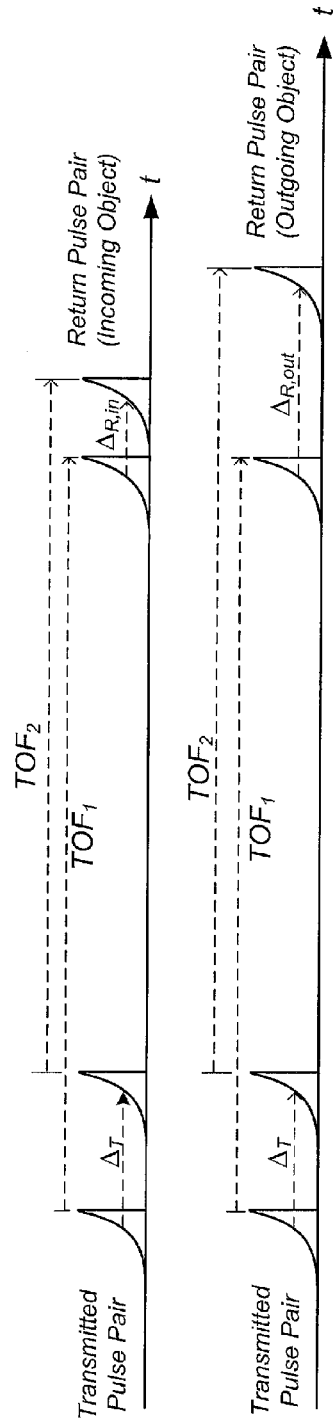
FIG. 32 illustrates an example of a timing measurement used to determine the radial velocity of a moving object, according to one embodiment.

In one set of embodiments, a system 3100 may be configured to measure the distance and radial velocity of a moving object, e.g., as shown in FIG. 31. The system 3100 may include a control unit 3110, a transmitter 3120 and a receiver 3130. The transmitter 3120 transmits a pair of analog pulses with known interpulse time separation $\Delta_T$. See FIG. 32. Each analog pulse of the pulse pair has a leading edge of the form $D^*\exp(\alpha t)$, where $\alpha$ is a positive constant. The same value of the coefficient $\alpha$ may be used for both analog pulses of the pulse pair.

In one embodiment, the transmitter 3120 may include an arbitrary waveform generator configured to generate an analog waveform consistent with a sequence of samples supplied as input. The control unit 3110 may generate the sequence of samples, e.g., based on the expression $D^*\exp(\alpha t)$, the time separation value $\Delta_T$, the coefficient value $\alpha$ and the amplitude value D. The values $\Delta_T$, $\alpha$ and D may be user-controllable parameters. (For example, the system 3100 may include a user interface through which the user may adjust the values of each parameter.) The sample sequence represents the pulse pair to be transmitted. The digital circuitry supplies the sample sequence to the arbitrary waveform generator for digital-to-analog conversion (and, perhaps also amplification).

In another embodiment, the transmitter 3120 may include a signal generator circuit that is custom designed for generating an analog pulse with leading edge of the form $D^*\exp(\alpha t)$. The signal generator circuit may generate the analog pulse in response to a trigger signal. The trigger signal may be asserted twice in succession, with time $\Delta_T$ separating the first and second assertions, thereby causing the signal generator circuit is generate the above-described pulse pair. The transmitter may include a high-resolution timer to control the temporal spacing of the second trigger signal assertion relative to the first assertion. The timer may be loaded with an initial value corresponding to the time $\Delta_T$.

In yet another embodiment, the transmitter 3120 may include a pair of signal generator circuits, each custom designed to generate a corresponding one of the analog pulses of the transmitted pulse pair. The first signal generator circuit generates the first analog pulse of the pulse pair. The second signal generator circuit generates the second analog pulse of the pulse pair. Each signal generator circuit may be configured as variously described in U.S. Pat. No. 6,441,695 (filed Mar. 7, 2000, issued Aug. 27, 2002). The transmitter 3120 may delay the activation of the second signal generator circuit by time $\Delta_T$ relative to the activation of the first signal generator circuit. The transmitter 3120 may include an analog sum circuit to add the outputs of the two signal generator circuits, in order to generate the signal to be transmitted.

The transmitter 3120 may transmit the pulse pair onto a transmission medium using an interface 3122. The interface may be an antenna or any of various kinds of transducer, depending on the type of the transmission medium. For example, for transmission through the atmosphere, the interface may be an antenna. For transmission through a body of seawater, the interface may be an electrical-to-acoustic transducer (e.g., a sonar transducer). For transmission through a portion of the earth's subsurface, the interface may be electrical-to-seismic transducer.

The pulse pair propagates within the transmission medium and is reflected by a moving object 3120. The reflected pulse pair (comprising a first reflected analog pulse and a second reflected analog pulse) propagates back through the transmission medium to the system 3100. The receiver 3130 receives the reflected pulse pair through the interface 3132. The interface 3132 may be an antenna or any of various kinds of transducer, again depending on the type of the transmission medium. (In one alternative embodiment, the transmitter and receiver share the same interface, in which case the system may include circuitry to decouple the receiver input from the interface whenever the transmitter is transmitting. For example, the system may include a conventional duplexer that couples to the interface, the transmitter output and the receiver input.)

The transmission medium may be any desired type of medium, e.g., as variously described above in connection with communication medium 950. The transmission medium may be a lossless medium. Furthermore, the transmission medium may be homogeneous and isotropic. Thus, signal propagation within the transmission medium may be modeled by the expression $$V(r,t)=S(r)g(r-vt),$$

where r is the radial distance from the point of transmission, where V(r,t) represents signal amplitude at radial distance r and time t, where g(t) is the boundary condition given by V(0,t)=g(t), where v is the propagation velocity of the transmission medium. The function S(r) accounts for the spreading out of the signal energy in space. For example, in a three-dimensional (3D) medium, the function S(r) may have the form $S(r)=C/r^2$, where C is a constant. In a two-dimensional medium, the function S(r) may have the form $S(r)=C/r$.

In some embodiments, the pulse pair may be modulated onto a sinusoidal carrier, and the modulated carrier is transmitted onto the transmission medium. In these embodiments, the transmitter includes modulation circuitry, and the receiver includes demodulator circuitry (e.g., envelope detection circuitry) to recover the reflected pulse pair. For example, modulation may be used when the transmission medium is the atmosphere or free space.

Due to the interaction with the moving object, the reflected pulse pair will in general have a different interpulse time separation than the transmitted pulse pair. See FIG. 32. When the object is moving with negative radial velocity relative to the system 3100, the interpulse time separation $\Delta_R$ of the reflected pulse pair will be smaller than the interpulse time separation $\Delta_T$ of the transmitted pulse pair. Conversely, when the object is moving with positive radial velocity relative to the system 3100, the interpulse time separation $\Delta_R$ of the reflected pulse pair will be larger than the interpulse time separation $\Delta_T$ of the transmitted pulse pair. The extent of change $\Delta_R$ relative to $\Delta_T$ is greatly exaggerated in FIG. 26, for the sake of illustration.

The control unit 3110 may compute the object's radial velocity u based on the reflected interpulse separation time $\Delta_R$, the transmitted interpulse separation time $\Delta_T$ and the propagation velocity v. In one embodiment, the object's radial velocity u may be computed based on the equation:

$$\Delta_R/\Delta_T=(v+u)/(v-u).$$

For example, the object's radial velocity u may be computed based on the expression:

$$u = \frac{(\Delta_R/\Delta_T)-1}{(\Delta_R/\Delta_T)+1}v.$$

Figure 33:
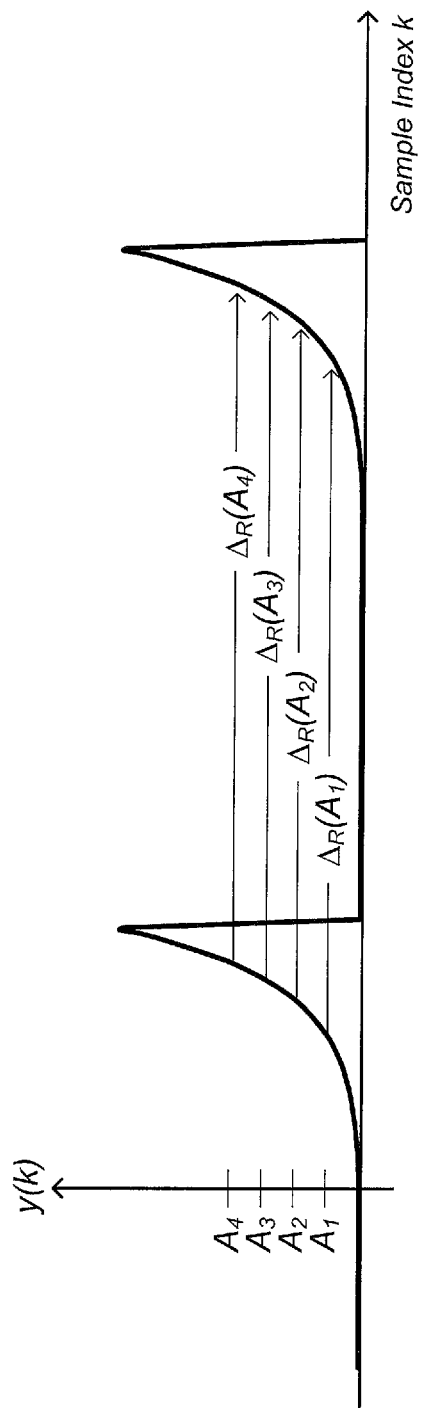
FIG. 33 illustrates one embodiment of a method for measuring an interpulse time separation based on an average of amplitude-specific time separation values.

In some embodiments, the receiver 3130 samples the received pulse pair with an analog-to-digital converter to obtain a sample sequence $\{y(k)\}$. The receiver 3130 (or alternatively, the control unit 3110) may then analyze the sample sequence $\{y(k)\}$ to determine the reflected interpulse separation $\Delta_R$. In one embodiment, the receiver may compute a correlation between the leading edge of the first pulse and the leading edge of the second pulse within the sample sequence $\{y(k)\}$, and determine the time separation that maximizes the correlation. In another embodiment, the receiver may compute a time separation value $\Delta_R(A_i)$ for each amplitude $A_i$ in a set of amplitudes $$\{A_i: i=1,2,\ldots,N\},$$

e.g., as shown in FIG. 33. Each separation value $\Delta_R(A_i)$ is a computed measure of the time separation between the two leading edges at amplitude $A_i$. Because the second leading edge has the same shape as the first leading edge, the time separation values $\Delta_R(A_i)$, i=1, 2, ..., N, are nominally equal except for noise variations. Thus, a more accurate estimate of the separation $\Delta_R$ may be determined by averaging the computed separation values $\Delta_R(A_i)$, i=1, 2, ..., N.

In one embodiment, the receiver 3120 may also sample the transmitted pulse pair to obtain a sample sequence $\{x(k)\}$. The receiver (or alternatively, the control unit 3110) may compute time-of-flight values between the pulses of the transmitted pulse pair and the pulses of the reflected pulse pair based on the transmitted signal samples $\{x(k)\}$ and the received signal samples $\{y(k)\}$. For example, the receiver may compute the time-of-flight value $TOF_1$ between the first transmitted pulse and the first received pulse, and the time-of-flight value $TOF_2$ between the second transmitted pulse and the second received pulse. See FIG. 32. The time-of-flight value $TOF_1$ may be computed by averaging a plurality of amplitude-specific time-of-flight values as described above. The time-of-flight value $TOF_2$ may be similarly computed. A mean time-of-flight value $TOF_M$ may be determined by averaging $TOF_1$ and $TOF_2$.

The control unit 3110 may compute an estimate r for the radial distance to the moving object based on the mean time of flight value $TOF_M$ and the propagation velocity v, e.g., based on the expression:

$r=2v/TOF_M$.

Given the radial distance estimate r, the control unit 3110 may apply an amplitude correction to the received sample sequence $\{y(k)\}$ based on the expression:

$z(k)=y(k)/S(2r)$.

After the amplitude correction, the time-of-flight values $TOF_1$, $TOF_2$ and $TOF_M$ may be recomputed based on the transmitted sample sequence x(k) and the received sample sequence z(k). The recomputed value of $TOF_M$ may be used to recompute the radial distance estimate r. The recomputed radial distance estimate may be more accurate than the initial estimate, and may be used to apply an improved amplitude correction to the sample sequence $\{y(k)\}$, and so forth. Thus, a final radial distance estimate may be determined by iteratively cycling through the above-described steps until the radial distance estimate converges.

While the above-described mechanisms for measuring the radial velocity and radial distance of a moving object used a pair of transmitted analog pulses, that mechanism naturally generalizes to any number of transmitted analog pulses greater than one. Thus, the transmitter may generate an output signal comprising a temporal sequence of two or more analog pulses. Each of the analog pulses of the output signal has a leading edge of the form $D*\exp(\alpha t)$. All of the analog pulses of the transmit signal may use the same value of the coefficient $\alpha$ and the same value of amplitude factor D. One or more of the interpulse time separations between the analog pulses of the output signal are known. (In one embodiment, the one or more time separations are known by measurement. In another embodiment, they are known by virtue of having intentionally generated the analog pulses to have those one or more time separations.) The transmitter transmits the output signal onto a transmission medium. A receiver receives a return signal comprising a temporal sequence of two or more reflected analog pulses from the transmission medium. The return signal is generated by reflection of the transmitted output signal from a moving object. A control unit may determine one or more interpulse time separations between the analog pulses of the return signal. The control unit may compute a radial velocity u of the moving object based on data including the one or more interpulse time separations of the output signal, the one or more interpulse time separations of the return signal, and a velocity v of signal propagation in the transmission medium.

Additional Embodiments

Additional embodiments are disclosed in the following numbered paragraphs. (Any of the embodiments described below may be freely combined with any subset of the features, elements and embodiments described above.)

1. A receiver system for decoding a communication signal, the receiver system comprising:

an input port configured to receive the communication signal from a communication medium, wherein the communication signal comprises a sequence of symbols, wherein each symbol of the symbol sequence is an analog pulse that has a leading edge of exponential shape, wherein the exponential shape has an exponential growth parameter value that has been selected from the values $\alpha_0, \alpha_1, \ldots, \alpha_{N-1}$, which are distinct positive values, wherein N is greater than one, wherein, for each symbol of the symbol sequence, the exponential growth parameter for the leading edge of the symbol has been selected based on a corresponding group of one or more bits from a stream of information bits;

a set of N filters, wherein each filter of the N filters is configured to receive the communication signal from the input port and to filter the communication signal to obtain a respective output signal, wherein each filter of the N filters has a corresponding transfer function with one or more zeros located at a corresponding one of the values $\alpha_0, \alpha_1, \ldots, \alpha_{N-1}$;

a decision unit configured to generate for each symbol an estimate of the corresponding group of one or more bits using the N output signals.

2. The receiver system of paragraph 1, wherein the communication medium is a lossy communication medium.

3. The receiver system of paragraph 1, wherein the communication medium includes one or more of the following: a coaxial cable; a twinaxial cable; an electromagnetic core (EMC) cable; a well logging cable; a universal serial bus (USB) cable; an Ethernet cable; a twisted wire pair; an untwisted wire pair; an optical fiber; a portion of the atmosphere; a body of fluid; a body of solid material; a wired pipe channel including a series of sections of drill pipe, wherein each of the sections includes: an electrical conductor, a first inductive coupler at a first end of the section, and a second inductive coupler at a second end of the section.

4. The receiver system of paragraph 1, wherein the N filters are first order all-pass filters.

5. The receiver system of paragraph 1, wherein, for each of the N filters, the transfer function of the filter has a number of poles in the left half of the s plane that is greater than or equal to the number of zeros at the corresponding one of the values $\alpha_0, \alpha_1, \ldots, \alpha_{N-1}$.

6. A receiver system for decoding a communication signal, the receiver system comprising:

an input port configured to receive the communication signal from a communication medium, wherein the communication signal comprises a sequence of symbols, wherein a transmitter is configured to generate and transmit the communication signal onto the communication medium, wherein the transmitter is configured to generate the communication signal so that each symbol of the symbol sequence is an analog pulse that has a leading edge of the form $D_j\exp\{\hat{\alpha}_j t\}$, wherein t represents intrasymbol time, wherein $D_j$ is a non-zero real amplitude, wherein $\hat{\alpha}_j=\alpha_j+\Delta\alpha$, wherein $\Delta\alpha$ is a noise value associated with the symbol, wherein $\alpha_j$ is an element of the finite set $A=\{\alpha_0, \alpha_1\}$, wherein the elements $\alpha_0$ and $\alpha_1$ of the finite set A are distinct positive real numbers, wherein the transmitter selects the value $\alpha_j$ for each symbol based on a corresponding bit from a stream of information bits;

a first filter configured to receive the communication signal from the input port and to filter the communication signal to obtain a first output signal, wherein a transfer function of the first filter has one or more zeros at $\alpha_0$.

7. The receiver system of paragraph 6, wherein the communication medium is a lossy communication medium.

8. The receiver system of paragraph 6, wherein the communication medium includes one or more of the following: a coaxial cable; a twinaxial cable; an electromagnetic core (EMC) cable; a well logging cable; a USB cable; an Ethernet cable; a twisted wire pair; an untwisted wire pair; an optical fiber; a portion of the atmosphere; a body of fluid; a body of solid material; a wired pipe channel including a series of sections of drill pipe, wherein each of the sections includes: an electrical conductor, a first inductive coupler at a first end of the section, and a second inductive coupler at a second end of the section.

9. The receiver system of paragraph 6, wherein the communication signal propagates through the communication medium as an electromagnetic signal or an acoustic signal.

10. The receiver system of paragraph 6, wherein the transfer function of the first filter also has a number of poles in the left half of the s plane that is greater than or equal to the number of zeros of the transfer function at $\alpha_0$.

11. The receiver system of paragraph 6, wherein the first filter is a first order all-pass filter.

12. The receiver system of paragraph 6, wherein the first output signal represents an estimate of the stream of information bits.

13. The receiver system of paragraph 6, further comprising:
a flip flop circuit configured to receive the first output signal and to sample the first output signal at a time $t=t_S$ within the leading edge of each symbol, wherein a digital output signal of the flip flop circuit represents the stream of information bits.

14. The receiver system of paragraph 13, wherein the time $t_S$ is equal to or near a time $t_p$ at which the leading edge reaches its maximum, wherein $t_p$ is selected so that $\alpha_{min} t_p$ is greater than or equal to three, wherein $\alpha_{min}$ is the minimum of $\alpha_0$ and $\alpha_1$.

15. The receiver system of paragraph 14, wherein each symbol of the symbol sequence is associated with a corresponding symbol interval, wherein the time $t_p$ is within the last 20% of the symbol interval of each symbol.

16. The receiver system of paragraph 6, further comprising:
a second filter configured to receive the communication signal from the input port and to filter the communication signal to obtain a second output signal, wherein a transfer function of the second filter has one or more zeros at $\alpha_1$.

17. The receiver system of paragraph 16, wherein the transfer function of the first filter also has a number of poles in the left half of the s plane that is greater than or equal to the number of zeros at $\alpha_0$, wherein the transfer function of the second filter also has a number of poles in the left half of the s plane that is greater than or equal to the number of zeros at $\alpha_1$.

18. The receiver of paragraph 16, wherein the first filter and the second filter are first order all-pass filters.

19. The receiver system of paragraph 16, further comprising:
a digital circuit configured to receive the first output signal and the second output signal and generate a digital output signal, wherein the digital circuit is triggered by a measurement clock signal so that the digital circuit samples the first output signal and the second output signal at time $t=t_S$ within the leading edge of each symbol, wherein the digital output signal represents the stream of information bits.

20. The receiver system of paragraph 19, wherein the digital circuit includes a lookup table.

21. The receiver system of paragraph 19, wherein the time $t_p$ is equal to or near a time $t_p$ at which the leading edge reaches its maximum, wherein the time $t_p$ is selected so that $\alpha_{min} t_p$ is greater than or equal to three, wherein $\alpha_{min}$ is the minimum of $\alpha_0$ and $\alpha_1$.

22. The receiver system of paragraph 21, wherein each symbol of the symbol sequence is associated with a corresponding symbol interval, wherein the time $t_p$ is within the last 20% of the symbol interval of each symbol.

23. The receiver system of paragraph 6, wherein the transmitter is configured to generate the communication signal so that for each symbol, $$D_j \exp\{\alpha_j t_p\} = C,$$

wherein C is a non-zero constant that is the same for all symbols of the sequence of symbols, wherein $t_p$ is a value of the intrasymbol time t that is the same for all symbols of the sequence of symbols.

24. The receiver system of paragraph 6, wherein the transmitter is configured to generate the communication signal so that for each symbol, $$D_j \exp\{\alpha_j t_p\} = C,$$

wherein C is a value selected from a finite set of non-zero values $\{C_0, C_1\}$, wherein each successive pair of bits from the stream of information bits determines the selection of C and the selection of $\alpha_j$ for a corresponding one of the symbols, wherein $t_p$ is a value of the intrasymbol time t that is the same for all symbols of the sequence of symbols.

25. The receiver system of paragraph 6, wherein the transmitter is configured to generate the communication signal so that for each symbol, $$D_j \exp\{\alpha_j t_p\} = C,$$

wherein C is a value selected from a finite set of non-zero values $\{C_0, C_1, \ldots, C_M\}$, wherein $M=2^m$, wherein m is greater than or equal to one, wherein each successive group of m+1 bits from the stream of information bits determines the selection of C and the selection of $\alpha_j$ for a corresponding one of the symbols, wherein $t_p$ is a value of the intrasymbol time t that is the same for all symbols of the sequence of symbols.

26. A method for operating a receiver to facilitate decoding of a communication signal, the method comprising:
receiving the communication signal from a communication medium, wherein the communication signal comprises a sequence of symbols, wherein a transmitter generates and transmits the communication signal onto the communication medium, wherein the transmitter generates the communication signal so that each symbol of the symbol sequence is an analog pulse that has a leading edge of the form $D_j \exp\{\hat{\alpha}_j t\}$, wherein t represents intrasymbol time, wherein $D_j$ is a non-zero real amplitude, wherein $\hat{\alpha}_j = \alpha_j + \Delta\alpha$ wherein $\Delta\alpha$ is a noise value associated with the symbol, wherein $\alpha_j$ is an element of the finite set $A=\{\alpha_0, \alpha_1\}$, wherein the elements $\alpha_0$ and $\alpha_1$ of the finite set A are distinct positive real numbers, wherein the transmitter selects the value $\alpha_j$ for each symbol based on a corresponding bit from a stream of information bits;
filtering the communication signal with a first filter to obtain a first output signal, wherein a transfer function of the first filter has one or more zeros at $\alpha_0$.

27. The method of paragraph 26, wherein the communication medium is a lossy communication medium.

28. The method of paragraph 26, wherein the communication medium includes one or more of the following: a coaxial cable; a twinaxial cable; an electromagnetic core (EMC) cable; a well logging cable; a USB cable; an Ethernet cable; a twisted wire pair; an untwisted wire pair; an optical fiber; a portion of the atmosphere; a body of fluid; a body of solid material; a wired pipe channel including a series of sections of drill pipe, wherein each of the sections includes: an electrical conductor, a first inductive coupler at a first end of the section, and a second inductive coupler at a second end of the section.

29. The method of paragraph 26, wherein the communication signal propagates through the communication medium as an electromagnetic signal or an acoustic signal.

30. The method of paragraph 26, wherein the transfer function of the first filter also has a number of poles in the left half of the s plane that is greater than or equal to the number of zeros of the transfer function at $\alpha_0$.

31. The method of paragraph 26, wherein the first filter is a first order all-pass filter.

32. The method of paragraph 26, further comprising:
sampling the first output signal at a time $t=t_S$ within the leading edge of each symbol, wherein the sampling is performed by a flip flop circuit, wherein a digital output signal of the flip flop circuit represents the stream of information bits.

33. The method of paragraph 26, further comprising:
filtering the communication signal with a second filter to obtain a second output signal, wherein a transfer function of the second filter has one or more zeros at $\alpha_1$.

34. The method of paragraph 33, wherein the transfer function of the first filter also has a number of poles in the left half of the s plane that is greater than or equal to the number of zeros at $\alpha_0$, wherein the transfer function of the second filter also has a number of poles in the left half of the s plane that is greater than or equal to the number of zeros at $\alpha_1$.

35. The method of paragraph 33, wherein the first filter and the second filter are first order all-pass filters.

36. The method of paragraph 33, further comprising:
supplying the first output signal and the second output signal to a digital circuit;
and triggering the digital circuit with a measurement clock signal so that the digital circuit samples the first output signal and the second output signal at time $t=t_S$ within the leading edge of each symbol, wherein a digital output signal generated by the digital circuit represents the stream of information bits.

37. A receiver system for decoding a communication signal, the receiver system comprising:
an input port configured to receive the communication signal from a communication medium, wherein the communication signal comprises a sequence of symbols, wherein a transmitter is configured to generate and transmit the communication signal onto the communication medium, wherein the transmitter is configured to generate the communication signal so that each symbol of the symbol sequence is an analog pulse that has a leading edge of the form $D_j \exp\{\hat{\alpha}_j t\}$, wherein t represents intrasymbol time, wherein $D_j$ is a non-zero real amplitude, wherein $\hat{\alpha}_j = \alpha_j + \Delta\alpha$, wherein $\Delta\alpha$ is a noise value associated with the symbol, wherein $\alpha_j$ is an element of the finite set $A=\{\alpha_0, \alpha_1, \ldots, \alpha_{N-1}\}$, wherein the elements $\alpha_0, \alpha_1, \ldots, \alpha_{N-1}$ of the finite set A are distinct positive real numbers, wherein $N=2^n$, where n is greater than or equal to one, wherein the transmitter selects the value $\alpha_j$ for each symbol based on a corresponding group of n bits from a stream of information bits;
a set of N filters $G_0, G_1, \ldots, G_{N-1}$, wherein each filter $G_k$ of the N filters is configured to receive the communication signal from the input port and to filter the communication signal to obtain a respective output signal, wherein the transfer function $G_k(s)$ of filter $G_k$, $k=0, 1, \ldots, N-1$, has one or more zeros at $\alpha_k$;
a decision unit configured to generate for each symbol an estimate of the corresponding group of n bits using the N output signals.

38. The receiver system of paragraph 37, wherein the communication medium is a lossy communication medium.

39. The receiver system of paragraph 37, wherein the communication medium includes one or more of the following: a coaxial cable; a twinaxial cable; an electromagnetic core (EMC) cable; a well logging cable; a universal serial bus (USB) cable; an Ethernet cable; a twisted wire pair; an untwisted wire pair; an optical fiber; a portion of the atmosphere; a body of fluid; a body of solid material; a wired pipe channel including a series of sections of drill pipe, wherein each of the sections includes: an electrical conductor, a first inductive coupler at a first end of the section, and a second inductive coupler at a second end of the section.

40. The receiver system of paragraph 37, wherein the communication signal propagates through the communication medium as an electromagnetic signal or an acoustic signal.

41. The receiver system of paragraph 37, wherein the N filters are first order all-pass filters.

42. The receiver system of paragraph 37, wherein the transfer function $G_k(s)$, $k=0, 1, \ldots, N-1$, has a number $n_p(k)$ of poles in the left half of the s plane that is greater than or equal to the number $n_z(k)$ of zeros at $\alpha_k$.

43. The receiver system of paragraph 37, wherein the decision unit is configured to generate for each symbol the estimate of the corresponding group of n bits by:
summing the N output signals to obtain a sum signal;
applying a linear transformation to the sum signal to obtain a transformed signal; and
sampling the transformed signal at a time $t=t_S$ within the leading edge of the symbol to obtain the estimate for the corresponding group of n bits.

44. The receiver system of paragraph 43, wherein the decision unit includes an n-bit digitizer circuit that is configured to perform said sampling of the transformed signal.

45. The receiver system of paragraph 43, wherein the time $t_S$ is equal to or near a time $t_p$ at which the leading edge reaches its maximum, wherein the time $t_p$ is selected so that $\alpha_{min} t_p$ is greater than or equal to three, wherein $\alpha_{min}$ is the minimum element of the set $A=\{\alpha_0, \alpha_1, \ldots, \alpha_{N-1}\}$.

46. The receiver system of paragraph 45, wherein each symbol of the symbol sequence is associated with a corresponding symbol interval, wherein the time $t_p$ is within the last 20% of the symbol interval of each symbol.

47. The receiver system of paragraph 37, wherein the decision unit is configured to generate for each symbol the estimate of the corresponding group of n bits by:
summing the N output signals to obtain a sum signal;
accessing a lookup table based on a value of the sum signal at a time $t=t_S$ within the leading edge of the symbol to obtain the estimate for the corresponding group of n bits.

48. The receiver system of paragraph 37, wherein the decision unit is configured to generate for each symbol the estimate of the corresponding group of n bits by:
summing the N output signals to obtain a sum signal;
comparing the sum signal to a set of N−1 distinct threshold values at a time $t=t_S$ within the leading edge of the symbol; and
determining the estimate for the group of n bits based on results of the N−1 comparisons.

49. The receiver system of paragraph 37, wherein the transmitter is configured to generate the communication signal so that for each symbol $$D_j \exp\{\alpha_j t_p\} = C,$$

wherein C is a non-zero constant that is the same for all symbols of the sequence of symbols, wherein $t_p$ is a value of the intrasymbol time t that is the same for all symbols of the sequence of symbols.

50. The receiver system of paragraph 37, wherein the transmitter is configured to generate the communication signal so that for each symbol $$D_j \exp\{\alpha_j t_p\} = C,$$

wherein C is a value selected from a finite set of non-zero values $\{C_0, C_1, \ldots, C_M\}$, wherein $M=2^m$, wherein m is greater than or equal to one, wherein each successive group of n+m bits from the stream of information bits determines the selection of C and the selection of $\alpha_j$ for a corresponding one of the symbols, wherein $t_p$ is a value of the intrasymbol time t that is the same for all symbols of the sequence of symbols.

51. A method for operating a receiver system in order to facilitate decoding of a communication signal, the method comprising:

receiving the communication signal from a communication medium, wherein the communication signal comprises a sequence of symbols, wherein a transmitter is generates and transmits the communication signal onto the communication medium, wherein the transmitter generates the communication signal so that each symbol of the symbol sequence is an analog pulse that has a leading edge of the form $D_j \exp\{\hat{\alpha}_j t\}$, wherein t represents intrasymbol time, wherein $D_j$ is a non-zero real amplitude, wherein $\hat{\alpha}_j = \alpha_j + \Delta\alpha$, wherein $\Delta\alpha$ is a noise value associated with the symbol, wherein $\alpha_j$ is an element of the finite set $A = \{\alpha_0, \alpha_1, \ldots, \alpha_{N-1}\}$, wherein the elements $\alpha_0, \alpha_1, \ldots, \alpha_{N-1}$ of the finite set A are distinct positive real numbers, wherein $N=2^n$, where n is greater than or equal to one, wherein the transmitter selects the value $\alpha_j$ for each symbol based on a corresponding group of n bits from a stream of information bits;

filtering the communication signal with a set of N filters $G_0, G_1, \ldots, G_{N-1}$, wherein each filter $G_k$ filters the communication signal to obtain a respective output signal, wherein the transfer function $G_k(s)$ of filter $G_k$, $k=0, 1, \ldots, N-1$, has one or more zeros at $\alpha_k$;

generating for each symbol an estimate of the corresponding group of n bits based on the N output signals, wherein said generating the estimates is performed by a decision unit.

52. The method of paragraph 51, wherein the communication medium is a lossy communication medium.

53. The method of paragraph 51, wherein the communication medium includes one or more of the following: a coaxial cable; a twinaxial cable; an electromagnetic core (EMC) cable; a well logging cable; a USB cable; an Ethernet cable; a twisted wire pair; an untwisted wire pair; an optical fiber; a portion of the atmosphere; a body of fluid; a body of solid material; a wired pipe channel including a series of sections of drill pipe, wherein each of the sections includes: an electrical conductor, a first inductive coupler at a first end of the section, and a second inductive coupler at a second end of the section.

54. The method of paragraph 51, wherein the communication signal propagates through the communication medium as an electromagnetic signal or an acoustic signal.

55. The method of paragraph 51, wherein the N filters are first order all-pass filters.

56. The method of paragraph 51, wherein the transfer function $G_k(s)$, $k=0, 1, \ldots, N-1$, has a number $n_p(k)$ of poles in the left half of the s plane that is greater than or equal to the number $n_z(k)$ of zeros at $\alpha_k$.

57. The method of paragraph 51, wherein said generating for each symbol the estimate of the corresponding group of n bits includes:

summing the N output signals to obtain a sum signal;
applying a linear transformation to the sum signal to obtain a transformed signal; and
sampling the transformed signal at a time $t=t_S$ within the leading edge of the symbol to obtain the estimate for the corresponding group of n bits.

58. The method of paragraph 51, wherein said generating for each symbol the estimate of the corresponding group of n bits includes:

summing the N output signals to obtain a sum signal;
accessing a lookup table based on a value of the sum signal at a time $t=t_S$ within the leading edge of the symbol to obtain the estimate for the corresponding group of n bits.

59. The method of paragraph 51, wherein said generating for each symbol the estimate of the corresponding group of n bits includes:

summing the N output signals to obtain a sum signal;
comparing the sum signal to a set of N−1 distinct threshold values at a time $t=t_S$ within the leading edge of the symbol; and
determining the estimate for the group of n bits based on results of the N−1 comparisons.

60. A method for transmitting information, the method comprising:

receiving a sequence of bits $\{b_k\}$;
generating a communication signal including a sequence of transmit symbols $\{S_k\}$, wherein each transmit symbol $S_k$ of the sequence of transmit symbols has the same symbol duration T and is selected from a symbol set based on the value of a respective bit $b_k$ of the sequence of bits, wherein the symbol set includes a zero symbol and an exponential symbol, wherein the zero symbol has zero voltage over the symbol duration T, wherein the exponential symbol is an analog pulse whose leading edge is of the form $D^*\exp(\alpha t)$, where a is a positive constant, where D is a non-zero constant, where t is intrasymbol time, wherein said generating is performed by a signal generator circuit; and transmitting the communication signal onto a communication medium, wherein said transmitting is performed by a transmitter.

61. The method of paragraph 60, wherein the communication medium is lossy, wherein said analog pulse having the leading edge of the form $D^*\exp(\alpha^* t)$ is unique among closed pulses of finite amplitude and finite temporal extent in the sense that the leading edge of said analog pulse does not disperse during propagation through the lossy communication medium.

62. The method of paragraph 61, wherein the lossy communication medium has constant homogeneous parameters, wherein said analog pulse propagates with constant velocity through the lossy communication medium.

63. The method of paragraph 60, wherein the leading edge of the exponential symbol persists for time duration $t_p$ so that $\alpha t_p$ is approximately equal to $2\pi$.

64. The method of paragraph 60, wherein the leading edge of the exponential symbol persists for time duration $t_p$ so that $\alpha t_p$ is in the range [5.5, 6.5].

65. The method of paragraph 60, wherein the communication medium is a lossy communication medium.

66. The method of paragraph 60, wherein the communication medium includes one or more of the following: an electrical cable; the atmosphere; free space; an optical fiber; a body of liquid; a portion of the earth's subsurface; a well logging cable; a solid; a plasma; a conductive trace of a circuit board or an integrated circuit; a wired pipe channel including a series of sections of drill pipe, wherein each of the sections includes: an electrical conductor, a first inductive coupler at a first end of the section, and a second inductive coupler at a second end of the section.

67. A method for receiving information, the method comprising:

receiving a first signal from a communication medium in response to a transmission of a communication signal onto the communication medium by a transmitter, wherein the communication signal includes a sequence of symbols $\{S_k\}$, wherein each symbol $S_k$ of the sequence of symbols has the same symbol duration T and has been selected from a symbol set based on the value of a respective bit $b_k$ of a sequence of bits $\{b_k\}$, wherein the symbol set includes a zero symbol and an exponential symbol, wherein the zero symbol has zero voltage over the symbol duration T, wherein the exponential symbol is an analog pulse whose leading edge is of the form $D*\exp(\alpha t)$, where a is a positive constant, where D is a non-zero constant, where t is intrasymbol time; and for each symbol $S_k$ of the sequence of symbols $\{S_k\}$, applying threshold detection to the first signal in order to obtain an estimate of the respective bit $b_k$.

68. The method of paragraph 67, wherein the communication medium is lossy, wherein said analog pulse having the leading edge of the form $D*\exp(\alpha*t)$ is unique among closed pulses of finite amplitude and finite temporal extent in the sense that the leading edge of said analog pulse does not disperse during propagation through the lossy communication medium.

69. The method of paragraph 68, wherein the lossy communication medium has constant homogeneous parameters, wherein said analog pulse propagates with constant velocity through the lossy communication medium.

70. The method of paragraph 67, wherein the leading edge of the exponential symbol persists for time duration $t_p$ so that $\alpha t_p$ is approximately equal to $2\pi$.

71. The method of paragraph 67, wherein the leading edge of the exponential symbol persists for time duration $t_p$ so that $\alpha t_p$ is in the range [5.5, 6.5].

72. The method of paragraph 67, wherein the communication medium includes one or more of the following: an electrical cable; the atmosphere; free space; an optical fiber; a body of liquid; a portion of the earth's subsurface; a well logging cable; a solid; a plasma; a conductive trace of a circuit board or an integrated circuit; a wired pipe channel including a series of sections of drill pipe, wherein each of the sections includes: an electrical conductor, a first inductive coupler at a first end of the section, and a second inductive coupler at a second end of the section.

73. The method of paragraph 67, wherein the communication medium is a lossy communication medium, wherein the leading edge of each exponential symbol in the communication signal preserves its shape during propagation through the lossy communication medium, wherein a trailing edge of each exponential symbol in the communication signal experiences dispersion during propagation through the lossy communication medium and at least partially spreads into a next symbol duration.

74. A method comprising:

generating an output signal comprising a temporal sequence of two or more analog pulses, wherein each of the analog pulses of the output signal has a leading edge of the form $D*\exp(\alpha t)$, wherein all of the analog pulses of the output signal use the same value of the coefficient $\alpha$, wherein one or more interpulse time separations between the analog pulses of the output signal are known;

transmitting the output signal onto a transmission medium;

receiving a return signal comprising a temporal sequence of two or more reflected analog pulses from the transmission medium, wherein the return signal is generated by reflection of the transmitted output signal from a moving object;

determining one or more interpulse time separations between the analog pulses of the return signal;

computing a radial velocity of the moving object based on data including (a) the one or more interpulse time separations between the analog pulses of the output signal, (b) the one or more interpulse time separations between the analog pulses of the return signal, and (c) a known velocity of signal propagation in the transmission medium.

75. The method of paragraph 74, wherein the transmission medium is a lossy transmission medium.

Additional embodiments are disclosed in the following numbered paragraphs.

1. A method for transmitting information, the method comprising:

receiving a sequence of bits;

generating a communication signal including a sequence of transmit symbols, wherein each transmit symbol of the sequence of transmit symbols has a symbol duration and is selected from a symbol set based on the value of a respective bit of the sequence of bits, wherein the symbol set includes a zero symbol and an exponential symbol, wherein the zero symbol has zero voltage over the symbol duration, wherein the exponential symbol is an analog pulse whose leading edge is of exponential shape with exponential growth parameter being positive, wherein said generating is performed by a signal generator circuit; and transmitting the communication signal onto a communication medium, wherein said transmitting is performed by a transmitter.

2. The method of paragraph 1, wherein a denotes the exponential growth parameter, wherein the leading edge of the exponential symbol persists for time duration tp so that $\alpha t_p$ is approximately equal to $2\pi$.

3. The method of paragraph 1, wherein $\alpha$ denotes the exponential growth parameter, wherein the leading edge of the exponential symbol persists for time duration tp so that $\alpha t_p$ is in the range [5.5, 6.5].

4. The method of paragraph 1, wherein the communication medium is a lossy communication medium.

5. The method of paragraph 4, wherein said analog pulse having the leading edge of exponential shape is unique among closed pulses of finite amplitude and finite temporal extent in the sense that the leading edge of said analog pulse does not disperse during propagation through the lossy communication medium.

6. The method of paragraph 5, wherein the lossy communication medium has constant homogeneous parameters, wherein said analog pulse propagates with constant velocity through the lossy communication medium.

7. The method of paragraph 1, wherein the communication medium includes one or more of the following: an electrical cable; the atmosphere; free space; an optical fiber; a body of liquid; a portion of the earth's subsurface; a well logging cable; a solid; a plasma; a conductive trace of a circuit board or an integrated circuit; a wired pipe channel including a series of sections of drill pipe, wherein each of the sections includes: an electrical conductor, a first inductive coupler at a first end of the section, and a second inductive coupler at a second end of the section.

8. The method of paragraph 1, further comprising:

receiving the communication signal from the communication medium; and applying threshold detection to each symbol of the received communication signal in order to produce an estimate of the respective bit, wherein said receiving the communication signal and said applying the threshold detection are performed by a receiver system.

9. A method for receiving information, the method comprising:

receiving a communication signal from a communication medium, wherein the communication signal includes a sequence of symbols, wherein each symbol of the sequence of symbols has a symbol duration and has been selected from a symbol set based on the value of a respective bit of a sequence of bits, wherein the symbol set includes a zero symbol and an exponential symbol, wherein the zero symbol has zero voltage (or nominally zero voltage) over the symbol duration, wherein the exponential symbol is an analog pulse whose leading edge is of exponential shape with exponential growth parameter being positive; and for each symbol of the sequence of symbols, applying threshold detection to the communication signal in order to obtain an estimate of the respective bit.

10. The method of paragraph 9, wherein $\alpha$ denotes the exponential growth parameter, wherein the leading edge of the exponential symbol persists for time duration tp so that $\alpha t_p$ is approximately equal to $2\pi$.

11. The method of paragraph 9, wherein $\alpha$ denotes the exponential growth parameter, wherein the leading edge of the exponential symbol persists for time duration tp so that $\alpha t_p$ is in the range [5.5, 6.5].

12. The method of paragraph 9, wherein the communication medium is a lossy communication medium.

13. The method of paragraph 12, wherein said analog pulse having the leading edge of exponential shape is unique among closed pulses of finite amplitude and finite temporal extent in the sense that the leading edge of said analog pulse does not disperse during propagation through the lossy communication medium.

14. The method of paragraph 13, wherein the lossy communication medium has constant homogeneous parameters, wherein said analog pulse propagates with constant velocity through the lossy communication medium.

15. The method of paragraph 9, wherein the communication medium includes one or more of the following: an electrical cable; the atmosphere; free space; an optical fiber; a body of liquid; a portion of the earth's subsurface; a well logging cable; a solid; a plasma; a conductive trace of a circuit board or an integrated circuit; a wired pipe channel including a series of sections of drill pipe, wherein each of the sections includes: an electrical conductor, a first inductive coupler at a first end of the section, and a second inductive coupler at a second end of the section.

16. The method of paragraph 9, wherein the communication medium is a lossy communication medium, wherein the leading edge of each exponential symbol in the communication signal preserves its shape during propagation through the lossy communication medium, wherein a trailing edge of each exponential symbol in the communication signal experiences dispersion during propagation through the lossy communication medium and at least partially spreads into a next symbol duration.

17. The method of paragraph 9, further comprising: generating and transmitting the communication signal onto the communication medium, wherein said generating and transmitting are performed by a transmitter.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for decoding a communication signal, the system comprising:

an input port configured to receive the communication signal from a communication medium, wherein the communication signal comprises a sequence of symbols, wherein each symbol of the symbol sequence is an analog pulse that has a leading edge of exponential shape, wherein the exponential shape has an exponential growth parameter value that has been selected from values $\alpha_0$ and $\alpha_1$, which are distinct positive values, wherein, for each symbol of the symbol sequence, the exponential growth parameter value for the leading edge of the symbol has been selected based on a corresponding bit from a stream of information bits;

a first filter configured to receive the communication signal from the input port and to filter the communication signal to obtain a first output signal, wherein a transfer function of the first filter has one or more zeros at $\alpha_0$.

2. The system of claim 1, wherein the communication medium is a lossy communication medium.

3. The system of claim 1, wherein the communication medium includes one or more of the following:

a coaxial cable;
a twinaxial cable;
an electromagnetic core (EMC) cable;
a well logging cable; a USB cable;
an Ethernet cable;
a twisted wire pair;
an untwisted wire pair;
an optical fiber;
a portion of an atmosphere;
a body of fluid;
a body of solid material;
a wired pipe channel including a series of sections of drill pipe, wherein each of the sections includes an electrical conductor, a first inductive coupler at a first end of the section, and a second inductive coupler at a second end of the section.

4. The system of claim 1, wherein the communication signal propagates through the communication medium as an electromagnetic signal or an acoustic signal.

5. The system of claim 1, wherein the transfer function of the first filter has a number of poles in a left half of an s plane that is greater than or equal to the number of zeros of the transfer function at $\alpha_0$.

6. The system of claim 1, wherein the first filter is a first order all-pass filter.

7. The system of claim 1, wherein the first output signal represents an estimate of the stream of information bits.

8. The system of claim 1, further comprising:

a flip flop circuit configured to receive the first output signal and to sample the first output signal at a time $t=t_S$ within the leading edge of each symbol, wherein a digital output signal of the flip flop circuit represents the stream of information bits.

9. The system of claim 8, wherein the time $t_S$ is equal to or near a time $t_p$ at which the leading edge reaches its maximum, wherein $t_p$ is selected so that $\alpha_{min} t_p$ is greater than or equal to three, wherein $\alpha_{min}$ is the minimum of $\alpha_0$ and $\alpha_1$.

10. The system of claim 9, wherein each symbol of the symbol sequence is associated with a corresponding symbol interval, wherein the time $t_p$ is within the last 20% of the symbol interval of each symbol.

11. The system of claim 1, further comprising:

a second filter configured to receive the communication signal from the input port and to filter the communication signal to obtain a second output signal, wherein a transfer function of the second filter has one or more zeros at $\alpha_1$.

12. The system of claim 11, wherein the transfer function of the first filter has a number of poles in a left half of an s plane that is greater than or equal to the number of zeros at $\alpha_0$, wherein the transfer function of the second filter has a number of poles in the left half of the s plane that is greater than or equal to the number of zeros at $\alpha_1$.

13. The of claim 11, wherein the first filter and the second filter are first order all-pass filters.

14. The system of claim 11, further comprising:
a digital circuit configured to receive the first output signal and the second output signal and generate a digital output signal, wherein the digital circuit is triggered by a measurement clock signal so that the digital circuit samples the first output signal and the second output signal at time $t=t_S$ within the leading edge of each symbol, wherein the digital output signal represents the stream of information bits.

15. The system of claim 14, wherein the digital circuit includes a lookup table.

16. The system of claim 14, wherein the time $t_S$ is equal to or near a time $t_p$ at which the leading edge reaches its maximum, wherein the time $t_p$ is selected so that $\alpha_{min} t_p$ is greater than or equal to three, wherein $\alpha_{min}$ is the minimum of $\alpha_0$ and $\alpha_1$.

17. The system of claim 1, wherein a transmitter is configured to generate the communication signal so that for each symbol, the leading edge conforms to $$D_1 \exp\{\alpha_j t_p\} = C,$$

wherein $\alpha_j$ is the exponential growth parameter value for the symbol, wherein C is a non-zero constant that is the same for all symbols of the sequence of symbols, wherein $t_p$ is a value of the intrasymbol time t that is the same for all symbols of the sequence of symbols.

18. The system of claim 1, wherein a transmitter is configured to generate the communication signal so that for each symbol, the leading edge conforms to $$D_j \exp\{\alpha_j t_p\} = C,$$

wherein $\alpha_j$ is the exponential growth parameter value for the symbol, wherein C is a value selected from a finite set of non-zero values $\{C_0, C_1\}$, wherein each successive pair of bits from the stream of information bits determines the selection of C and the selection of $\alpha_j$ for a corresponding one of the symbols, wherein $t_p$ is a value of the intrasymbol time t that is the same for all symbols of the sequence of symbols.

19. The system of claim 1, wherein a transmitter is configured to generate the communication signal so that for each symbol, the leading edge conforms to $$D_j \exp\{\alpha_j t_p\} = C,$$

wherein $\alpha_j$ is the exponential growth parameter value for the symbol, wherein C is a value selected from a finite set of non-zero values $\{C_0, C_1, \ldots, C_M\}$, wherein $M=2^m$, wherein m is greater than or equal to one, wherein each successive group of m+1 bits from the stream of information bits determines the selection of C and the selection of $\alpha_j$ for a corresponding one of the symbols, wherein $t_p$ is a value of the intrasymbol time t that is the same for all symbols of the sequence of symbols.

20. A method for operating a receiver to facilitate decoding of a communication signal, the method comprising:
receiving the communication signal from a communication medium, wherein the communication signal comprises a sequence of symbols, wherein each symbol of the symbol sequence is an analog pulse that has a leading edge of exponential shape, wherein the exponential shape has an exponential growth parameter value that has been selected from values $\alpha_0$ and $\alpha_1$, which are distinct positive values, wherein, for each symbol of the symbol sequence, the exponential growth parameter value for the leading edge of the symbol has been selected based on a corresponding bit from a stream of information bits;
filtering the communication signal with a first filter to obtain a first output signal, wherein a transfer function of the first filter has one or more zeros at $\alpha_0$.

21. The method of claim 20, wherein the communication medium is a lossy communication medium.

22. The method of claim 20, wherein the communication medium includes one or more of the following:
a coaxial cable;
a twinaxial cable;
an electromagnetic core (EMC) cable;
a well logging cable; a USB cable;
an Ethernet cable;
a twisted wire pair;
an untwisted wire pair;
an optical fiber;
a portion of an atmosphere;
a body of fluid;
a body of solid material;
a wired pipe channel including a series of sections of drill pipe, wherein each of the sections includes: an electrical conductor, a first inductive coupler at a first end of the section, and a second inductive coupler at a second end of the section.

23. The method of claim 20, wherein the communication signal propagates through the communication medium as an electromagnetic signal or an acoustic signal.

24. The method of claim 20, wherein the transfer function of the first filter has a number of poles in a left half of an s plane that is greater than or equal to the number of zeros of the transfer function at $\alpha_0$.

25. The method of claim 20, wherein the first filter is a first order all-pass filter.

26. The method of claim 20, further comprising:
sampling the first output signal at a time $t=t_S$ within the leading edge of each symbol, wherein the sampling is performed by a flip flop circuit, wherein a digital output signal of the flip flop circuit represents the stream of information bits.

27. The method of claim 20, further comprising:
filtering the communication signal with a second filter to obtain a second output signal, wherein a transfer function of the second filter has one or more zeros at $\alpha_1$.

28. The method of claim 27, wherein the transfer function of the first filter has a number of poles in a left half of an s plane that is greater than or equal to the number of zeros at $\alpha_0$, wherein the transfer function of the second filter has a number of poles in the left half of the s plane that is greater than or equal to the number of zeros at $\alpha_1$.

29. The method of claim 27, wherein the first filter and the second filter are first order all-pass filters.

30. The method of claim 27, further comprising:
supplying the first output signal and the second output signal to a digital circuit; and
triggering the digital circuit with a measurement clock signal so that the digital circuit samples the first output signal and the second output signal at time $t=t_S$ within the leading edge of each symbol, wherein a digital output signal generated by the digital circuit represents the stream of information bits.

* * * * *